US008482698B2

(12) United States Patent
Atkins

(10) Patent No.: US 8,482,698 B2
(45) Date of Patent: Jul. 9, 2013

(54) HIGH DYNAMIC RANGE DISPLAY USING LED BACKLIGHTING, STACKED OPTICAL FILMS, AND LCD DRIVE SIGNALS BASED ON A LOW RESOLUTION LIGHT FIELD SIMULATION

(71) Applicant: Dolby Laboratories Licensing Corporation, San Francisco, CA (US)

(72) Inventor: Robin Atkins, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/684,862

(22) Filed: Nov. 26, 2012

(65) Prior Publication Data

US 2013/0120234 A1 May 16, 2013

Related U.S. Application Data

(63) Continuation of application No. 12/491,857, filed on Jun. 25, 2009, now abandoned.

(60) Provisional application No. 61/105,642, filed on Oct. 15, 2008, provisional application No. 61/075,443, filed on Jun. 25, 2008.

(51) Int. Cl.
*G02F 1/1335* (2006.01)
*F21V 29/00* (2006.01)
*G09G 5/00* (2006.01)

(52) U.S. Cl.
USPC ................ 349/61; 349/62; 362/294; 345/690

(58) Field of Classification Search
USPC ........................ 349/61, 62; 362/294; 345/690
See application file for complete search history.

(56) References Cited

U.S. PATENT DOCUMENTS

| | | | |
|---|---|---|---|
| 4,170,771 | A | 10/1979 | Bly |
| 4,229,095 | A | 10/1980 | Mir |
| 4,316,196 | A | 2/1982 | Jacobs |
| 4,364,039 | A | 12/1982 | Penz |
| 4,374,397 | A | 2/1983 | Mir |
| 4,378,568 | A | 3/1983 | Mir |
| 4,441,791 | A | 4/1984 | Hornbeck |

(Continued)

FOREIGN PATENT DOCUMENTS

| | | |
|---|---|---|
| CA | 2025104 | 3/1991 |
| CA | 1315426 | 3/1993 |

(Continued)

OTHER PUBLICATIONS

Funamoto et al., “High-Picture-Quality Technique for LCD Televisions: LCD-A1”, Proc. Sid, International Display Workshop (IDW ’00), Nov. 2000, p. 1157-1158.

(Continued)

*Primary Examiner* — Mike Qi

(57) ABSTRACT

An HDR display is a combination of technologies including, for example, a dual modulation architecture incorporating algorithms for artifact reduction, selection of individual components, and a design process for the display and/or pipeline for preserving the visual dynamic range from capture to display of an image or images. In one embodiment, the dual modulation architecture includes a backlight with an array of RGB LEDs and a combination of a heat sink and thermally conductive vias for maintaining a desired operating temperature.

18 Claims, 35 Drawing Sheets

U.S. PATENT DOCUMENTS 4,559,480 A 12/1985 Nobs
4,580,877 A 4/1986 Washo
4,637,150 A 1/1987 Geluk
4,726,663 A 2/1988 Buzak
4,801,194 A 1/1989 Agostinelli et al.
4,853,824 A 8/1989 Tsuzurahara
4,868,668 A 9/1989 Tavernetti
4,933,754 A 6/1990 Reed et al.
4,954,789 A 9/1990 Sampsell
4,987,410 A 1/1991 Berman et al.
4,995,719 A 2/1991 Shanks
5,029,967 A 7/1991 Livezey et al.
5,075,789 A 12/1991 Jones et al.
5,103,328 A 4/1992 Numao
5,122,791 A 6/1992 Gibbons et al.
5,143,433 A 9/1992 Farrell
5,144,292 A 9/1992 Shiraishi et al.
5,247,366 A 9/1993 Ginosar et al.
5,359,345 A 10/1994 Hunter
5,386,253 A 1/1995 Fielding
5,422,691 A 6/1995 Ninomiya et al.
5,504,504 A 4/1996 Markandey et al.
5,537,233 A 7/1996 Miura et al.
5,537,256 A 7/1996 Fergason
5,572,341 A 11/1996 Fergason
5,592,193 A 1/1997 Chen
5,639,158 A 6/1997 Sato
5,646,702 A 7/1997 Akinwande et al.
5,652,672 A 7/1997 Huignard et al.
5,666,226 A 9/1997 Ezra et al.
5,684,354 A 11/1997 Gleckman
5,715,029 A 2/1998 Fergason
5,717,422 A 2/1998 Fergason
5,724,062 A 3/1998 Hunter
5,729,242 A 3/1998 Margerum et al.
5,748,828 A 5/1998 Steiner et al.
5,784,181 A 7/1998 Loiseaux et al.
5,809,215 A 9/1998 Heydinger et al.
5,815,303 A 9/1998 Berlin
5,883,914 A * 3/1999 Kinoshita .................... 372/50.1
5,889,567 A 3/1999 Swanson et al.
5,892,325 A 4/1999 Gleckman
5,926,239 A 7/1999 Kumar et al.
5,959,777 A 9/1999 Whitehead
5,978,142 A 11/1999 Blackham et al.
5,986,628 A 11/1999 Tuenge et al.
6,043,591 A 3/2000 Gleckman
6,111,559 A 8/2000 Motomura et al.
6,111,560 A 8/2000 May
6,120,588 A 9/2000 Jacobson
6,120,839 A 9/2000 Comiskey et al.
6,144,162 A 11/2000 Smith
6,163,621 A 12/2000 Paik et al.
6,172,798 B1 1/2001 Albert et al.
6,184,969 B1 2/2001 Fergason
6,215,920 B1 4/2001 Whitehead et al.
6,229,558 B1 5/2001 Saigo et al.
6,229,588 B1 5/2001 Abileah et al.
6,243,055 B1 6/2001 Fergason
6,243,068 B1 6/2001 Evanicky et al.
6,276,801 B1 8/2001 Fielding
6,282,311 B1 8/2001 McCarthy et al.
6,282,312 B1 8/2001 McCarthy et al.
6,282,313 B1 8/2001 McCarthy et al.
6,285,784 B1 9/2001 Spaulding et al.
6,300,932 B1 10/2001 Albert
6,301,393 B1 10/2001 Spaulding et al.
6,323,989 B1 11/2001 Jacobson et al.
6,327,072 B1 12/2001 Comiskey et al.
6,335,983 B1 1/2002 McCarthy et al.
6,381,372 B1 4/2002 Loce
6,404,131 B1 6/2002 Kawano et al.
6,414,661 B1 7/2002 Shen et al.
6,421,103 B2 7/2002 Yamaguchi
6,428,189 B1 8/2002 Hochstein
6,435,691 B1 8/2002 Macey et al.
6,437,769 B1 8/2002 Kobayashi et al.
6,439,731 B1 8/2002 Johnson et al.
6,448,951 B1 9/2002 Sakaguchi et al.
6,448,955 B1 9/2002 Evanicky et al.
6,483,643 B1 11/2002 Zuchowski
6,517,914 B1 2/2003 Hiraishi
6,520,646 B2 2/2003 Rodriguez, Jr. et al.
6,559,826 B1 5/2003 Mendelson et al.
6,590,561 B1 7/2003 Kabel et al.
6,608,614 B1 8/2003 Johnson
6,618,115 B1 9/2003 Hiroki
6,621,482 B2 9/2003 Fuller
6,631,995 B2 10/2003 Stanton et al.
6,644,832 B2 11/2003 Yoshida et al.
6,654,156 B1 11/2003 Crossland et al.
6,657,607 B1 12/2003 Evanicky et al.
6,671,008 B1 12/2003 Li et al.
6,680,834 B2 1/2004 Williams
6,683,657 B1 1/2004 Miyawaki
6,728,023 B1 4/2004 Alioshin et al.
6,748,106 B1 6/2004 Bryant et al.
6,753,661 B2 6/2004 Muthu et al.
6,754,384 B1 6/2004 Spaulding et al.
6,775,407 B1 8/2004 Gindele et al.
6,795,585 B1 9/2004 Parada et al.
6,796,658 B2 9/2004 Hubel et al.
6,803,901 B1 10/2004 Numao
6,816,141 B1 11/2004 Fergason
6,817,717 B2 11/2004 Childers et al.
6,822,760 B1 11/2004 Spaulding et al.
6,831,624 B1 12/2004 Harrold
6,831,711 B2 12/2004 Choi et al.
6,832,037 B2 12/2004 Aylward et al.
6,863,401 B2 3/2005 Penn
6,888,663 B2 5/2005 Bourdelais et al.
6,891,672 B2 5/2005 Whitehead et al.
6,917,396 B2 7/2005 Hiraishi et al.
6,952,195 B2 10/2005 Arakawa
6,980,176 B2 12/2005 Matsumoto et al.
6,980,195 B2 12/2005 Lonoce et al.
6,985,272 B2 1/2006 Bridgwater et al.
7,002,533 B2 2/2006 Sayag
7,018,046 B2 3/2006 Childers et al.
7,050,122 B2 5/2006 Gibbon et al.
7,050,219 B2 5/2006 Kimura
7,052,152 B2 * 5/2006 Harbers et al. .................. 362/30
7,053,881 B2 5/2006 Itoh
7,064,740 B2 6/2006 Daly
7,071,907 B1 7/2006 Duboc, Jr. et al.
7,106,505 B2 9/2006 Whitehead
7,118,225 B2 10/2006 Penn
7,172,297 B2 2/2007 Whitehead
7,175,281 B1 2/2007 Berman
7,370,979 B2 5/2008 Whitehead
7,377,652 B2 5/2008 Whitehead
7,403,332 B2 7/2008 Whitehead
7,413,307 B2 8/2008 Whitehead
7,413,309 B2 8/2008 Whitehead
7,419,267 B2 9/2008 Whitehead
7,532,192 B2 5/2009 Feng et al.
7,581,837 B2 9/2009 Whitehead
7,583,331 B2 * 9/2009 Whitehead ...................... 349/64
7,777,945 B2 8/2010 Seetzen
7,800,822 B2 9/2010 Seetzen
7,942,531 B2 5/2011 Whitehead
7,956,377 B2 * 6/2011 Tanaka et al. ................... 257/99
7,972,881 B2 * 7/2011 Shi ................................. 438/30
7,973,878 B2 7/2011 Whitehead
8,059,110 B2 11/2011 Seetzen
8,125,425 B2 2/2012 Seetzen
8,172,401 B2 5/2012 Whitehead
8,207,931 B2 * 6/2012 Zhang et al. .................. 345/102
2001/0019390 A1 9/2001 Itoh
2001/0035853 A1 11/2001 Hoelen
2001/0043179 A1 11/2001 Yoshinaga
2002/0003522 A1 1/2002 Baba
2002/0050957 A1 5/2002 Nagano
2002/0050958 A1 5/2002 Matthies
2002/0057238 A1 5/2002 Nitta
2002/0057253 A1 5/2002 Lim
2002/0097578 A1 7/2002 Greiner

| | | | | |
|---|---|---|---|---|
| 2002/0135553 | A1 | 9/2002 | Nagai | |
| 2002/0159002 | A1 | 10/2002 | Chang | |
| 2002/0163606 | A1 | 11/2002 | Kitai | |
| 2002/0171617 | A1 | 11/2002 | Fuller | |
| 2003/0002153 | A1 | 1/2003 | Hiraishi | |
| 2003/0048393 | A1 | 3/2003 | Sayag | |
| 2003/0085857 | A1 | 5/2003 | Ramanujan | |
| 2003/0090455 | A1 | 5/2003 | Daly | |
| 2003/0137501 | A1 | 7/2003 | Richards | |
| 2003/0151569 | A1 | 8/2003 | Lee | |
| 2003/0206245 | A1 | 11/2003 | Lin | |
| 2003/0235050 | A1 | 12/2003 | West | |
| 2004/0012551 | A1 | 1/2004 | Ishii | |
| 2004/0057017 | A1 | 3/2004 | Childers | |
| 2004/0218388 | A1 | 11/2004 | Suzuki | |
| 2005/0083295 | A1 | 4/2005 | Daly | |
| 2005/0083296 | A1 | 4/2005 | Daly | |
| 2005/0152146 | A1* | 7/2005 | Owen et al. | 362/294 |
| 2005/0248554 | A1 | 11/2005 | Feng | |
| 2005/0285841 | A1 | 12/2005 | Lin | |
| 2006/0028156 | A1 | 2/2006 | Jungwirth | |
| 2006/0092183 | A1 | 5/2006 | Malmberg | |
| 2006/0125745 | A1 | 6/2006 | Evanicky | |
| 2006/0227085 | A1 | 10/2006 | Boldt, Jr. | |
| 2006/0232969 | A1 | 10/2006 | Bogner | |
| 2007/0024576 | A1 | 2/2007 | Hasan | |
| 2007/0035706 | A1 | 2/2007 | Margulis | |
| 2007/0126992 | A1 | 6/2007 | Penn | |
| 2007/0189042 | A1* | 8/2007 | Pai et al. | 362/632 |
| 2007/0247833 | A1 | 10/2007 | Lee | |
| 2008/0030449 | A1 | 2/2008 | Lee | |
| 2008/0055931 | A1* | 3/2008 | Verstraete et al. | 362/612 |
| 2008/0074060 | A1 | 3/2008 | Ye | |
| 2008/0150878 | A1 | 6/2008 | Kang | |
| 2008/0150879 | A1 | 6/2008 | Kang | |
| 2009/0195559 | A1* | 8/2009 | Verstraete et al. | 345/690 |
| 2012/0120131 | A1 | 5/2012 | Whitehead | |
| 2012/0133689 | A1 | 5/2012 | Kwong | |
| 2012/0229495 | A1 | 9/2012 | Longhurst | |

FOREIGN PATENT DOCUMENTS

| | | |
|---|---|---|
| CN | 1378653 | 11/2002 |
| CN | 1474201 | 2/2004 |
| EP | 0684423 | 11/1995 |
| EP | 0730371 | 9/1996 |
| EP | 0829747 | 3/1998 |
| EP | 1003064 | 5/2000 |
| EP | 1098291 | 5/2001 |
| EP | 1136874 | 9/2001 |
| EP | 1202244 | 5/2002 |
| EP | 1431653 | 6/2004 |
| EP | 1521235 | 4/2005 |
| FR | 2702299 | 9/1994 |
| JP | 6-054120 | 4/1985 |
| JP | 6-054174 | 4/1985 |
| JP | 62-234133 | 10/1987 |
| JP | 62-234185 | 10/1987 |
| JP | 2-162389 | 6/1990 |
| JP | 3-71131 | 3/1991 |
| JP | 3-711111 | 3/1991 |
| JP | 3-198026 | 8/1991 |
| JP | 04-204591 | 7/1992 |
| JP | 07-121120 | 5/1995 |
| JP | 8-111545 | 4/1996 |
| JP | 8-297282 | 11/1996 |
| JP | 8-334742 | 12/1996 |
| JP | 9-189893 | 7/1997 |
| JP | 10-269802 | 10/1998 |
| JP | 11-052412 | 2/1999 |
| JP | 11-064820 | 3/1999 |
| JP | 11-326610 | 11/1999 |
| JP | 2000-035576 | 2/2000 |
| JP | 2000-214827 | 8/2000 |
| JP | 2000-275595 | 10/2000 |
| JP | 2000-338311 | 12/2000 |
| JP | 2001-053341 | 2/2001 |
| JP | 2001-100689 | 4/2001 |
| JP | 2002-040213 | 2/2002 |
| JP | 2002-091385 | 3/2002 |
| JP | 2002-099250 | 4/2002 |
| JP | 2002-140338 | 5/2002 |
| JP | 2002-214412 | 7/2002 |
| JP | 2002-231037 | 8/2002 |
| JP | 4348457 | 7/2005 |
| JP | 2009-053370 | 3/2009 |
| JP | 2005-115372 | 4/2009 |
| WO | 9115843 | 10/1991 |
| WO | 9633483 | 10/1996 |
| WO | 99/19767 | 4/1999 |
| WO | 0023831 | 4/2000 |
| WO | 0040018 | 7/2000 |
| WO | 0075720 | 12/2000 |
| WO | 01/14790 | 3/2001 |
| WO | 0127663 | 4/2001 |
| WO | 0169584 | 9/2001 |
| WO | 0169941 | 9/2001 |
| WO | 0203687 | 1/2002 |
| WO | 02/069030 | 9/2002 |
| WO | 02/79862 | 9/2002 |
| WO | 03/077013 | 9/2003 |
| WO | 2004031844 | 4/2004 |
| WO | 2005/101309 | 10/2005 |
| WO | 2006/010244 | 2/2006 |
| WO | 2006107369 | 10/2006 |
| WO | 2006109271 | 10/2006 |
| WO | 2006115852 | 11/2006 |
| WO | 2011/163114 | 12/2011 |

OTHER PUBLICATIONS

Endo, N., "Transmissive Type Liquid Crystal Display Device", Toshiba Technology Publication Collection, 1996.

Ward, Greg, "A Wide-Field Stereoscopic High Dynamic Range Viewer", Mar. 30, 2001.

Funamoto, T. et al., "Technology for LCD Televisions with High Image Quality", Matsushita Technical Journal, 2000 vol. 46(3).

Ward, Greg, "A Wide Field, High Dynamic Range, Stereographic Viewer", 2003.

Ohara, A., "Backlight for Liquid Crystal Displays", J. Illum. Institute of Japan, 1989, vol. 73(12).

International Search Report and Written Opinion for PCT/US07/02788 filed Jan. 31, 2007.

Mitsuhashi, Y. "Regarding LED Backlight Systems for LCDs", Television Technology Institute Reports, 1986.

Suzuki, Y., "Liquid Crystal Applications", Television Technology Institute Reports, 1983.

Seetzen, H., "A High Dynamic Range Display Using Low and High Resolution Modulators", SID 03 DIGST, 2003, pp. 1450-1453.

Spaulding, Kevin E. et al., "Extending the Color Gamut and Dynamic Range of an sRGB Image Using a Residual Image", Color research and application, vol. 28, No. 4, Aug. 2003, pp. 251-266.

Spaulding, Kevin E. et al., "Using a Residual Image to Extend the Color Gamut and Dynamic Range of an sRGB Image", Kodak Professional Technical Overview, Eastman Kodak Company, 2003, pp. 1-9.

International Search Report for International Application No. PCT/CA2005/000807, International Searching Authority, Sep. 29, 2005.

International Search Report for PCT Application No. PCT/CA2004/002200, International Searching Authority, Sep. 26, 2005.

Suzuki, Y., Liquid Crystal Applications, Television Technology Institute Reports, 1983.

Mitsuhasi, Y. Regarding LED Backlight Systems for LCD's, Television Technology Institute Reports, 1996.

Ohara, A. Backlight for Liquid Crystal Displays, J. Illum. Institute of Japan, 1989, vol. 73(12).

* cited by examiner

1300

HIGH DYNAMIC RANGE DISPLAY USING LED BACKLIGHTING, STACKED OPTICAL FILMS, AND LCD DRIVE SIGNALS BASED ON A LOW RESOLUTION LIGHT FIELD SIMULATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is a continuation of, and claims the benefit of priority to, U.S. patent application Ser. No. 12/491,857 filed on Jun. 25, 2009, which claims the benefit of the filing date of U.S. Provisional Patent Application Ser. No. 61/105,642 filed on Oct. 15, 2008 and Ser. No. 61/075,443 filed on Jun. 25, 2009, all of which are hereby incorporated by reference in their entirety.

BACKGROUND OF THE INVENTION

1. Field of Invention

The present invention relates to image display.

2. Discussion of Background

A goal of display systems is to present images that extend to the limit of the human visual system. Conventional display technologies (LCD, CRT, and plasma, for example) have achieved part of that goal by introducing both spatial resolution and refresh rates that are beyond the visual acuity of a human viewer. However, even the highest quality displays available today are incapable of showing the true luminance (brightness) range that we perceive in real life. Every day light sources encountered in the natural environment are several orders of magnitude brighter and of higher contrast than in any conventional display. Dolby® HDR display technologies enhance image quality and realism far beyond that of conventional displays.

SUMMARY OF THE INVENTION

The present disclosure encompasses many individual parts, features, and combinations thereof including design guidelines and recommendations that have been invented and developed to facilitate implementation of High Dynamic Range (HDR) Displays. Any one or more of the technologies described in this disclosure may be referred to herein as Dolby® HDR (e.g., Dolby® HDR display, Dolby® HDR Core algorithm, Dolby® HDR Core video processing algorithm), and possibly other nomenclature that will be apparent upon reading this document. The invention includes design requirements and various potential trade-offs, specifically related to modulated LED backlights, and as such, makes some assumptions about the audience. It is assumed that the reader is familiar with LCD and LED technologies, as well as general electronic, mechanical, thermal, optical, and product design.

This disclosure does not provide all possible design scenarios. However, it does contain examples invented and developed to assist in illustrating various design and configuration options. The examples include Implementation kit materials and details, a Design Process, a Multimedia Controller, LCD Panel and Timing Controller, and HDR Controller, Input Video, Output Video, Backlight Drive Values, Housekeeping (including Temperature Monitoring), Memory Requirements, Processing Requirements, Programming, Backlight Tiles, Backlight Control Schemes, parallel Routing, Serial Routing, thermal design, electrical design, Sensors, Mounting, LED drive techniques, constant current, Pulse Width Modulation (PWM), Pulse Code Modulation (PCM), Pulse Density Modulation (PDM), LED Drivers, Number of Outputs, Output Current, Output Skew, Clock Rate, Diagnostics, Communications, Feedback, Size and Placement, Timing & Synchronization, Video Level Synchronization, Frame Level Synchronization, Timing measurements, Power Requirements, Voltage Matching, Cables & Connectors, Shielding, Termination, Optics, Light Spread Function, LEDs, Selecting LED properties, Luminous Efficacy, Total lumens, Light Distribution, Luminous Flux Binning, Color Binning, Thermal Performance, Physical Package, LED Lifetime, LED Spacing, Reflecting Optics, Optical Films, Bulk Diffusers, Thin Holographic Diffusers, Brightness Enhancement Films, LCDs, Cavity Height, Edge Reflectors, Color Space, White Point, Artifacts, Parallax, Collimation, Diffusion, Combination, Veiling Luminance and Halos, Measurements, Video Processing, Core Algorithm, Unintended Halos, Motion Artifacts, White Point Corrections, Core Algorithm Details, LED drive generation, Light Field Simulation, LCD Pipeline, and Configuration Parameters.

These examples are generally design recommendations (and generally are not requirements), and they should not be considered as limiting the scope of any claims made to any part, feature, or embodiment of the invention unless specifically recited as such in that claim. Further, various quantities and/or materials may be noted or implied as being required, but should generally be read as recommended quantities, materials, etc, that will typically result in quality HDR display results.

The present invention may be embodied as, for example, a device or a method. Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
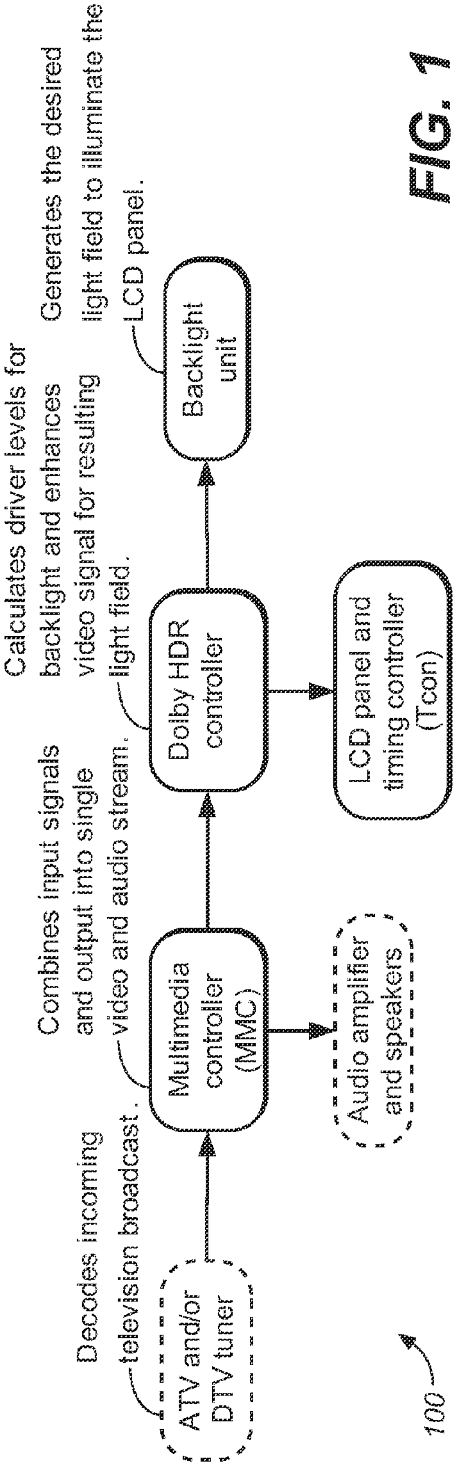
FIG. 1 is a block diagram of a Dolby HDR Electrical Architecture according to an embodiment of the present invention.

One of the ultimate goals of display systems is to present images that extend to the limit of the human visual system. For example, a Visual Dynamic Range (VDR) pipeline that captures and maintains the full dynamic range of the human visual system from image capture, through post-production and distribution, to display. Conventional display technologies (LCD, CRT, plasma, and so on) have achieved part of that goal by introducing both spatial resolution and refresh rates that are beyond the visual acuity of a human viewer. However, even the highest quality displays available today are incapable of showing the true luminance (brightness) range that we perceive in real life. Every day we encounter light sources in our natural environment that are several orders of magnitude brighter and of higher contrast than in any conventional display. Dolby® HDR technology enhances image quality and realism far beyond that of conventional displays.

A typical fluorescent light fixture has a luminance of approximately 2,000 cd/m2. Objects illuminated by the sun can easily have luminance values up to 10,000 cd/m2. Current LCD displays only can display images of such subjects to a maximum luminance of approximately 650 cd/m2. It is not easy to reproduce the high luminance levels observed in daily life. Limitations include the efficiencies of the electrical components as well as power requirements. As electrical efficiencies improve, it will be possible to achieve higher brightness displays without expensive thermal solutions. At the same time, the industry is responding to market pressures to lower power requirements, the result of environmental and economic considerations. The combination of increasing electrical efficiencies and lower power requirements mean that future display technologies are likely to become more energy-efficient, but unlikely to become bright enough to display real-world luminance levels.

In addition to high luminance levels, the human visual system is capable of perceiving roughly five orders of magnitude (100,000:1) of simultaneous contrast. However, conventional displays commonly produce less than a 2,000:1 contrast ratio.

The current standard practice for LCD displays uses a backlight unit (BLU) that produces a uniform light field, commonly generated by cold cathode fluorescent tubes (CCFL) or light-emitting diodes (LEDs) illuminating LCD pixels. Maximum pixel brightness is determined by the luminance of the backlight and how well the LCD can transmit light.

Minimum pixel brightness is determined by how well the LCD can block light. The ratio between these two values is the native contrast ratio of the LCD panel. This means that portions of an image that should be very dark instead appear as gray.

To overcome the dynamic range limitation of conventional displays, Dolby HDR technology replaces the uniform backlight with an actively modulated array of LEDs. The LEDs constitute a very low resolution display. The low-resolution image of the LED array is then projected through a conventional LCD, which displays a similar, but high-resolution, version of the image. This double modulation produces a dynamic range in the display that greatly exceeds the native contrast ratio of the LCD panel.

LEDs provide great opportunities in display backlighting, because they can be turned on and off virtually instantaneously. Their small physical size permits precision control of where the light strikes the LCD. In a Dolby HDR display LEDs are controlled to produce the required intensity of light on the pixels positioned in front of them. Since each LED may be either very bright or completely dark, the resultant dynamic range is orders of magnitude greater than current practice, resulting in a far more realistic and compelling image.

With LEDs rapidly surpassing the efficiencies of CCFL lighting and swiftly decreasing in price as they are adopted by the massive lighting industry, Dolby HDR technology is able to offer superior image quality at competitive cost and power requirements. This power savings is further increased by the ability to turn off areas of the backlight where little or no light is required, as in dark regions of the image. This results in typical power savings of 20 percent or more for a Dolby HDR display when compared to a uniformly lit backlight.

The description of the invention, in various embodiments and forms includes design guidelines and recommendations to facilitate implementation of Dolby HDR technology. The document focuses on design requirements and provides potential trade-offs, specifically related to modulated LED backlights, and as such, makes some assumptions about the audience. It is assumed that the reader is familiar with LCD and LED technologies, as well as general electronic, mechanical, thermal, optical, and product design.

The invention does not provide all design scenarios for manufacturers. However, it does contain examples to assist in illustrating various design and configuration options. These examples do not necessarily constitute design recommendations.

Implementation Kit Materials. The following materials are included with the Dolby HDR Implementation Kit: Dolby HDR Implementation Manual, Test Procedure, Test Results Form, Test signals, Dolby HDR source code, Dolby HDR Configuration Tool.

Some benefits of the Dolby HDR enabled LCD display include: a Minimum of 2× native LCD panel contrast ratio (for example, if the native static contrast ratio is 1,500:1, then Dolby HDR should measure a minimum of 3000:1 static contrast ratio), Enhanced black levels and detail, Cost differential relative to CCFL to support product/brand premium price positioning, at least 20 percent average power savings when compared to traditional CCFL static backlighting at the same brightness level with standard television content.

A typical design process for a Dolby HDR display is provided in this section. This design is for illustration purposes only; much iteration is required and the order of steps can be changed depending upon the requirements of the product as well as the experience of the design team.

| | |
|---|---|
| Choose LCD panel | 47" 16:9; 1,920 × 1,080; 1,500:1 native contrast |
| Specify target luminance | 500 cd/m2 |
| Select LED type | White, 150 mW max, 50 lm/W |
| Calculate required number of LEDs | 1,276 LEDs |
| Select LED driver | 16 outputs @ 120 mA max |
| Calculate required number of drivers | 120 drivers |
| Select LED drive control scheme | BLM TDM bus |
| Design backlight | 8 tiles × 15 drivers/tile; 160 LEDs/tile |
| Design optics | Flat rear reflector; no BEF |
| Design controller | FPGA; 8 MB SRAM |

Referring now to the drawings, wherein like reference numerals designate identical or corresponding parts, and more particularly to FIG. 1 thereof, there is illustrated a block diagram of electronics 100 comprising a Dolby® HDR display, which can be separated into four primary components with two optional modules, which interact as shown.

In addition to the four primary components listed, many displays include a television tuner, which decodes a standard- and/or a high-definition digital or analog television signal, as well as the audio signal. These modules are common across all types of displays and do not affect the performance of a Dolby HDR display.

A fundamental difference between a Dolby HDR display and a conventional display is the modulation of the backlight (which depends upon the input image) and the enhancement of the video signal to the LCD to take full advantage of the backlight modulation. In a conventional display, the LCD image is displayed with a uniform backlight, typically driven by multiple CCFLs (cold cathode fluorescent lamps). Such a backlight can only be globally modulated so that the overall luminance output is adjustable based on the ratio of dark versus bright of the incoming video signal. This method is commonly referred to as global dimming. CCFL backlight units cannot be completely turned off during operation due to the extended time necessary to turn them back on. Most global dimming CCFL backlights can modulate only between 20 percent to 100 percent of their full luminance range. Dolby HDR is able to achieve a wider range of luminance modulation, from completely off to fully on, while also allowing local modulation. An array of LEDs enables local modulation, which controls both the luminance and region of light where the image requires illumination.

Without knowledge of the light field of the backlight, the extent to which local dimming can be applied without introducing image artifacts is limited. Dolby HDR instead uses an internal model of the backlight to simulate the light field that is produced by the individually modulated backlight elements to achieve much greater modulation of the backlight while minimizing artifacts.

An important electrical component of a Dolby HDR display is therefore the Dolby HDR controller, which not only controls the backlight but also adjusts the LCD image. The controller can be implemented either as a stand-alone hardware module, or integrated into the existing multimedia controller (MMC). The advantage of integration is mainly lower cost, as many of the image processing operations and memory interfaces required for Dolby HDR are performed onboard, reducing additional memory and processing requirements. The main advantage of implementing Dolby HDR control onto a stand-alone hardware platform is the speed and ease of integration with existing system designs. The choice of the implementation of the Dolby HDR controller is up to the manufacturer. For clarity this document describes the controller as a separate module to the MMC.

Multimedia Controller (MMC)

The MMC selects from multiple video and audio formats, according to the input channel selected by the user, and performs the required scaling, de-interlacing, color correction, film rate detection, enhancements, and a variety of other conversion processes. The MMC then outputs a single audio stream to the amplifier and a single video stream to the Dolby HDR controller, ensuring that the two streams are fully synchronized.

The MMC also typically performs some image processing tasks to adjust the input video according to the viewers' preferences. This typically includes contrast, brightness, saturation, hue, and color temperature adjustments.

It will also serve other ancillary functions such as providing the onscreen display (OSD) overlays, closed captioning overlays, picture-in-picture, power management, and other user interfaces.

LCD Panel and Timing Controller

The function of the timing controller (TCon) is to interpret the incoming video stream from the Dolby HDR processor and to drive the LCD panel. The TCon is usually paired with a specific panel and is programmed during manufacturing with optimal settings according to panel characteristics. The timing controller drives the LCD panel to display the image by updating the individual LCD pixels in a specific update pattern. This is discussed in more detail in Timing and Synchronization. Depending on the panel, the timing controller may employ techniques such as temporal dithering to increase apparent bit depth of the panel, and to choose optimal drive targets for the LCD pixels to reduce motion blur and color artifacts.

The timing controller also adjusts the image for best display on the panel, typically with multiple gamma adjustments, color adjustments, and sharpening or smoothing filters. For best performance, the TCon used for a Dolby HDR implementation should perform very few, if any, of these functions because the correct LCD image generated by the Dolby HDR controller could become distorted. Alternatively, detailed information about the image adjustments made by the TCon is required so that the Dolby HDR controller can compensate for these adjustments before the image signal is passed to the TCon.

Dolby HDR Controller

The Dolby HDR controller is the core of a Dolby HDR display and accepts a video signal from the MMC as its input. The controller outputs LED drive values to the backlight and an enhanced video signal to the timing controller. Processing is completed using the Dolby HDR algorithm described in Chapter 6. Included in the Dolby HDR license package is an example algorithm written in C.

The actual processing in a display application can be done as:

The C model implemented on a very fast processor

A modified C model implemented on a GPU

A modified C model implemented on a very fast DSP

An equivalent RTL model targeted at either FPGA or ASIC implementation

Each implementation option has its own unique cost and complexity trade-offs, and is left to the discretion of the licensee.

Figure 2:
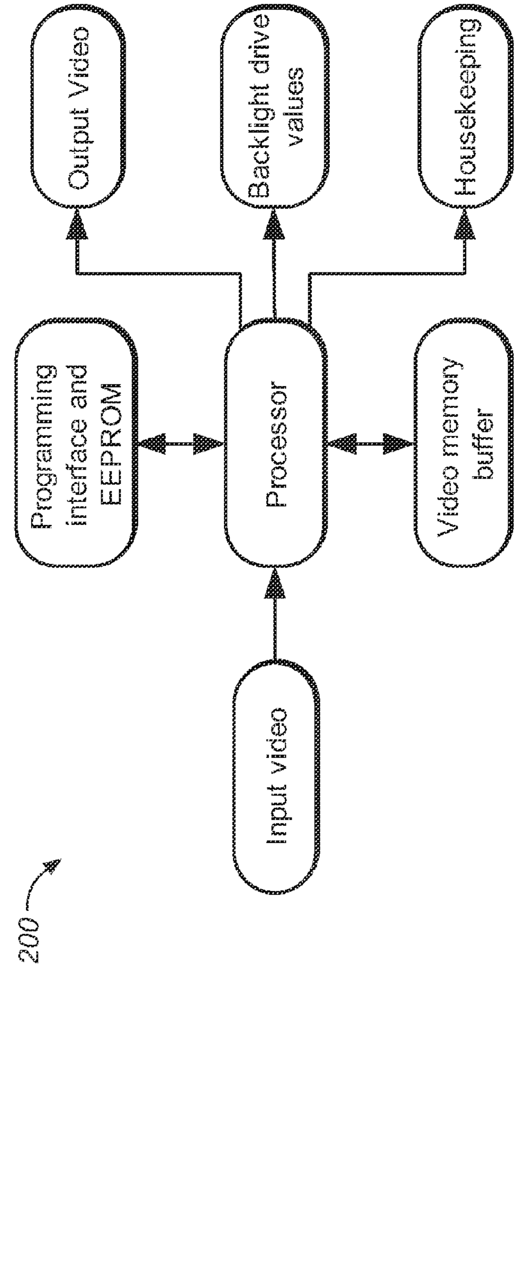
FIG. 2 is a diagram of a Dolby HDR Controller according to an embodiment of the present invention.

Regardless of the specific hardware implementation, the controller requires a particular quantity and type of video buffer memory, as well as a programming interface and non-volatile memory like EEPROM. These parameters 200 are illustrated in FIG. 2.

Input Video

Input video to the Dolby HDR controller is a high-definition stream, running typically at a resolution of 1,920×1,080×3×8-10 bit, and at a speed of 60 to 120 Hz. The interface is typically dual pixel LVDS, depending on the placement of the controller and the TCon interface.

Output Video

The format of output video from the controller is identical to the input video stream, to correctly interface with the rest of the system. Panels further specify their input format as openLDI or Panellink. However, the data has been enhanced for the Dolby HDR backlight levels and array control, as discussed elsewhere herein.

Backlight Drive Values

The LED drive values are calculated and sent to the LED board at the required update speed. Since there is flexibility on the communications interface from the LED controller, the requirements of this signal depend primarily on the selected LED driver, ranging from serial data output to every driver on the LED board to a large parallel set of PWM signals to every LED driver.

Housekeeping

Housekeeping refers to various sensors, diagnostics, and controllers that are intermittently polled for updates. Typically a Dolby HDR display monitors the LED board temperatures for possible thermal runaway conditions or unsuitable display operating conditions, voltage supplies for indications of power supply failure or decreased output, as well as the status of the drivers for possible problems with the LEDs.

Housekeeping also encompasses any implemented sensors for optical feedback for maintaining LED stability. A system of sensors can be employed to monitor the output of each LED for output drift due to thermal or aging effects. The data from these sensors can then be used in the Dolby HDR controller to compensate for the variation in output.

For a Dolby HDR display we recommend separating the housekeeping from the backlight drive signals. This will increase the signal integrity of the control signal while allowing the choice of interface to the LED driver. We have packet header for housekeeping and packet data for BLU.

Memory

The memory required by the LED controller depends on the hardware and specific implementation of the Dolby HDR algorithm. The largest memory requirement is used for buffering the video stream for Dolby HDR video processing. In general, the memory required for buffering the video stream is determined by the ratio of the LCD and the LED vertical resolutions, LCDV and LEDV. The light spread function LSFV from each LED is measured by the number of LEDs in the vertical direction that contribute light to a single pixel. Below shows the relationship. For the example used in the introduction with 192 backlight elements, the memory requirement would be about 25 Megabits.

$$M = \frac{LCD_V}{LED_V} \times LCD_H \times B_{depth} \times 3 \times LSF_V$$

The video buffering also places specific requirements on the type and speed of the memory, and most importantly the I/O bandwidth IOBW as calculated from below, depending on the bit depth $B_{depth}$ and pixel clock rate of the LCD. The result is multiplied by two for a bidirectional interface and increased by 10 percent to account for overhead. The bus overhead is variable and dependant on the memory technology used. The pixel clock rate is given approximately by below, depending on the vertical and horizontal resolution of the incoming video stream as well as the incoming video frame rate f, and does not account for image framing, which may further increase or decrease the requirements. A typical implementation of Dolby HDR requires on the order of 8 Gbps of memory I/O bandwidth.

$$IO_{BW} = (B_{depth} \times 3) \times \text{pixelclockrate} \times (2 \times 1.1)$$

where:

$$\text{pixelclockrate} = LCD_H \times LCD_V \times f$$

The combination of the memory size and the bandwidth determines the memory bus clock speed, width, and depth. The bus clock should be kept to a minimum to reduce design risks by maximizing the width of the memory bus.

In addition to the video buffer memory, some memory is required for storing calibration coefficients for each LED, as described in Chapter 5. This memory is written to upon completion of the calibration process with the LED coefficients. EEPROM is typically used for this memory. We keep measurements in the control processor NVRAM or in EEPROM of the LED drivers.

If implementing an optical feedback to generate additional coefficients to compensate for LED output drift, it is also necessary to store the sensor values. This is best accomplished with the use of additional memory. The frequency of the writes and the expected lifetime of the end product negates the use of any standard nonvolatile memory device. These devices typically specify a maximum number of write cycles. A better choice would be to use a SRAM technology with a nonvolatile memory backup. SRAM enables writing as often as every clock cycle without degradation. Upon detection of power loss, the system stores the data into NVRAM.

Processing

Dolby HDR processing functions can be broken down into three main tasks to generate a first rough approximation of the processing requirements.

LED drive levels: This step generates LED drive values from the linear luminance of the incoming image, and typically requires on the order of 3 mega-operations (MOP) per frame, depending on the number of backlight elements.

Backlight simulation: This step simulates the backlight from a model of the light spread function as described in Chapter 2. Depending on the light spread function of the system and the desired accuracy, this can typically require 467 MOP per frame.

LCD optimization: This step combines the incoming image with the simulated backlight to produce the LCD image that is optimized for the light field generated by the backlight. This step typically requires an additional 10 MOP per frame.

Taking the sum of these operations gives an estimate on the processing requirements of the Dolby HDR controller at approximately 500 MOP per frame, or roughly 30 GOP per second for a 60 Hz video input stream.

The following resource estimates include a micro-interface to configure the solution as well as physical interface logic to external memory, video input/output, and LED serial drive.

For an ASIC implementation, the resources are on the order of 500 k to 700 k gates and are dependent on the efficiency of the RTL code as well as on the external IP blocks required, such as the multipliers, adders, memory blocks, and DVI video interfaces.

For an FPGA implementation, the estimated resources are as follows: (at 400 MHz internal clock)

| Resources | Value | Comments |
|---|---|---|
| Registers | 25,000 | |
| LUT (Four inputs) | 17,800 | |
| Percentage of LUTs shared with registers | 10-15% | Device dependent |
| Built-in memory | 4,100 kbits | Requires the memory to be configured as DPRAM, SPRAM, and FIFOs |
| Number of clock modules | Four | PLLs, DCM, and so on |
| I/O speed | 200 to 333 MHz | Dependent on external memory BW requirements and incoming video |

Programming

The LED controller program is stored in display memory and loaded upon power up. To allow for programming updates, we recommend providing a serial RS-232, USB, or Ethernet interface for the microcontroller.

Backlight

The backlight of a Dolby HDR display is a collection of LEDs, LED drivers, and various sensors mounted to a printed circuit board (PCB). This section outlines some suggestions for the physical and electrical design of the LED board.

Backlight Tiles

Figure 3:
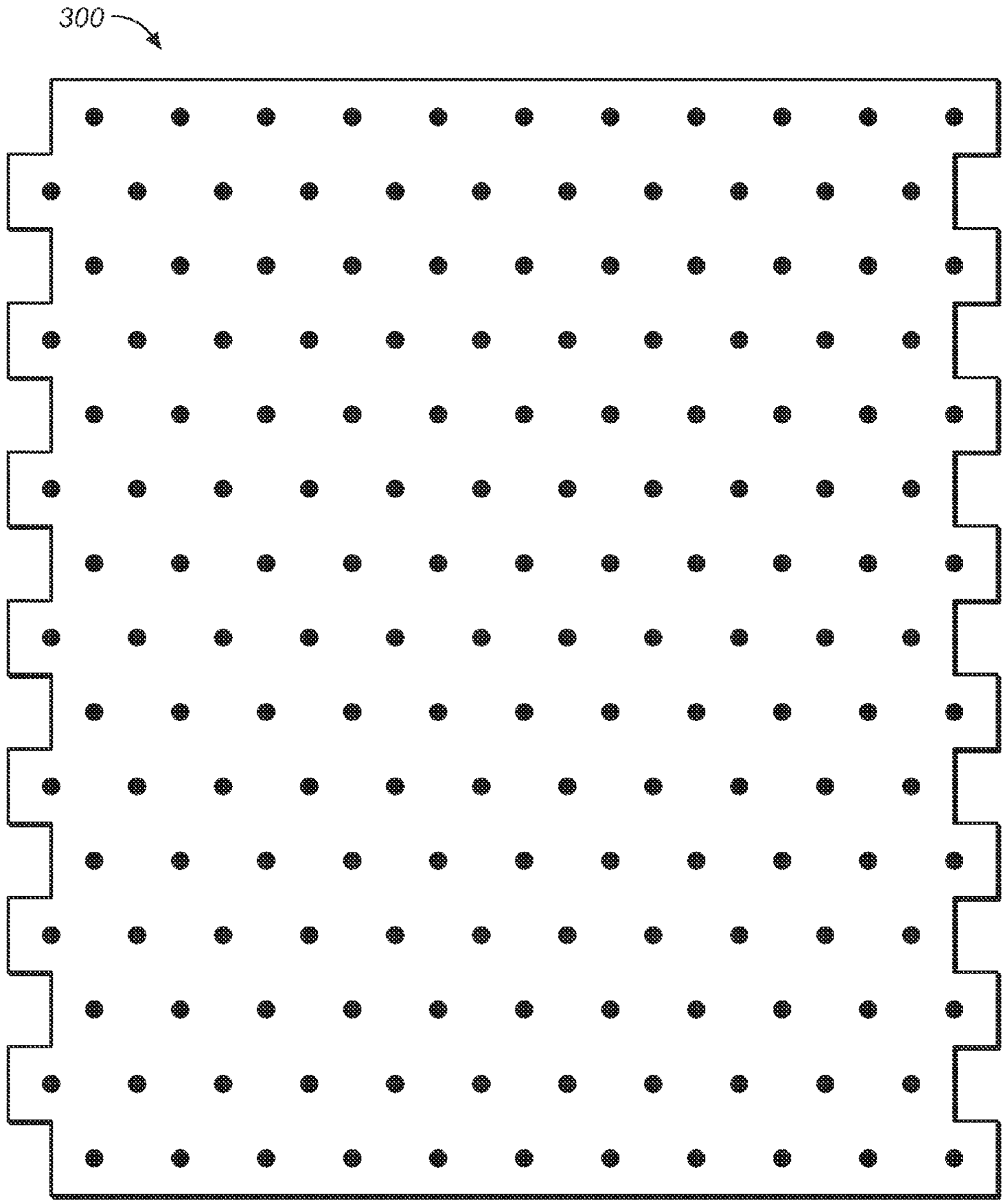
FIG. 3 is a diagram of an Individual Backlight Tile according to an embodiment of the present invention.

The backlight for a Dolby HDR display greater than or equal to a 25-inch diagonal is usually too large for fabrication on a single PCB. This requires segmenting the PCB into smaller tiles that satisfy manufacturing specifications while covering the entire backlight area with evenly spaced LEDs. Designs with very dense LED spacing present difficulties for the backlight tiling, as LEDs must be installed very close to the edges of the PCB tiles, further complicating electrical routing. In order to optimize light density, a hex pattern is used for led positioning where adjacent LEDs are equidistant. When tiling the backlight LED panel, a non rectangular PCB outline is required as shown in the following figure. FIG. 3 illustrates a backlight tile 300 with LEDs 310 in a hex pattern.

Backlight Control Schemes

The LED drive signals can be interfaced to the LED boards in various combinations of serial and parallel routines. Both types of controls are able to update any LED brightness at any time and in any order, facilitating synchronization between the backlight and LCD refresh patterns.

Parallel Routing

Figure 4:
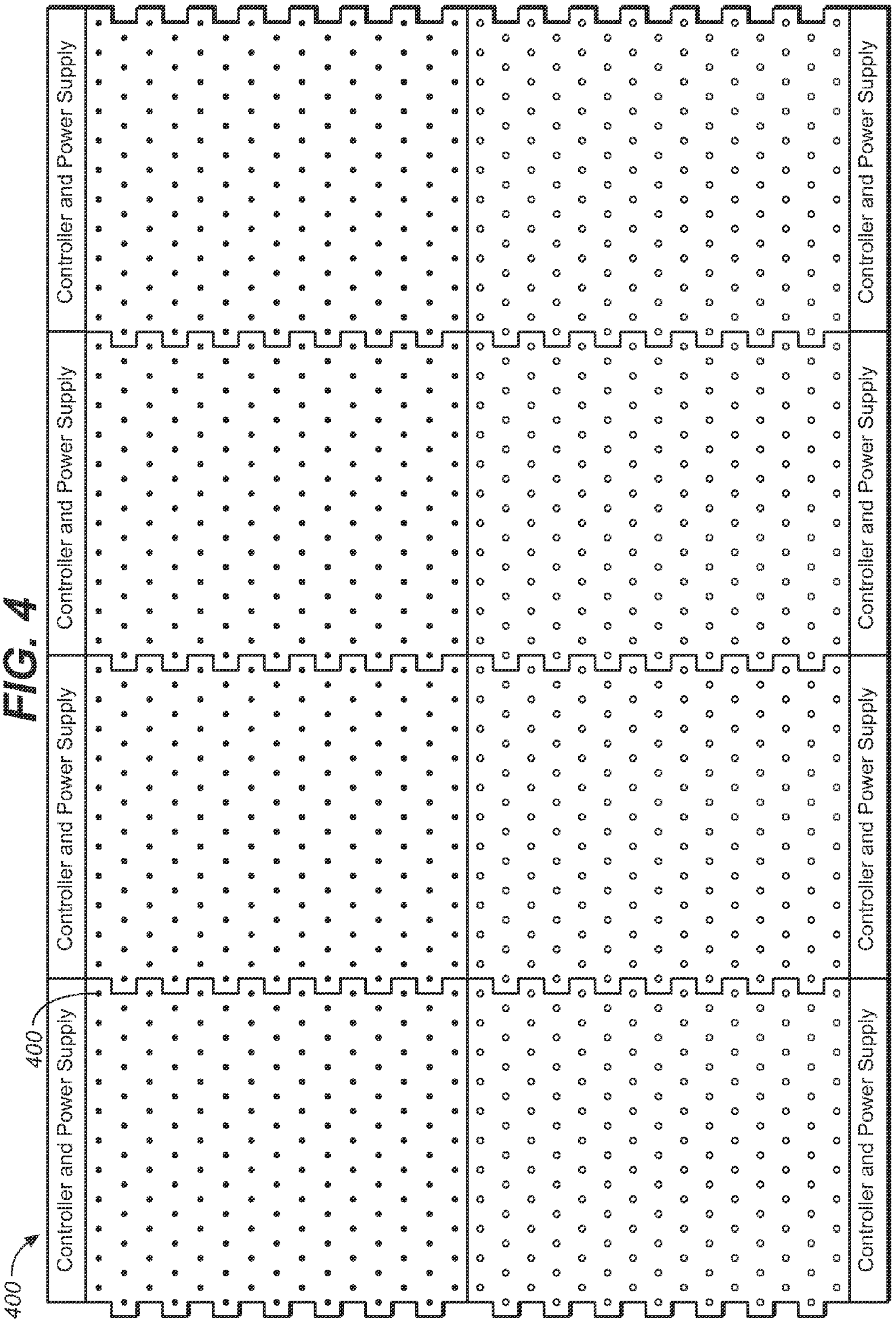
FIG. 4 is a diagram of all tiles assembled on the full panel according to an embodiment of the present invention.

FIG. 4 is a diagram of all tiles assembled on a full panel 400 according to an embodiment of the present invention. Parallel chains can be routed from the controller to each individual LED (e.g., LED 412) shown in FIG. 4. Depending on the number of LEDs, this can result in a significant number of connections. This method can be implemented either by supplying power for each LED directly from the Dolby HDR controller, and routing the power to the correct LED on the backlight, or by sending a digital drive signal to LED drivers on the backlight.

The advantage of the first choice is that no LED drivers would be required on the backlight, simplifying the layout. The disadvantage is that the LED power supply will be subject to the capacitance and inductance of the wire, which, depending on the length, can degrade the drive signal and require a higher current. Additional control of the power supply is required to compensate for this effect.

The second option involves routing a digital control signal such as PWM directly from the Dolby HDR controller to an LED driver on the backlight. The LED driver converts the drive signal from the controller and provides the correct power to the LED. The data speed between the controller and the backlight is also slower for parallel methods than for serial methods, as only a single drive value is transmitted for each video frame.

Serial Routing

In this implementation, either one serial data connection can be routed to each LED tile from the controller, or a single connection can be routed to the first tile and then from each tile to the next. In both cases, each serial chain will commonly consist of a two- to six-signal bus line, depending on the LED driver, which contains the clock, serial data, diagnostics, and synchronization signals.

A serial driver chain can be implemented in a number of ways. An addressing approach, such as I2C, can be used if the number of drivers/LEDs is suitably low. In this approach, each driver is assigned a unique address, and the controller can randomly access any driver at any time. With protocols such as I2C, care must be taken that the serial stream runs sufficiently fast to allow for both addressing and updating the entire chain.

An alternate approach is a daisy chain of drivers where a serial stream is transmitted along with a suitable serial clock. This functions very much like a wide shift register. The drivers continuously output the serial stream as it is presented to them, and only extract the relevant drive data when a specific control signal is asserted. The required clock frequency is dependent on the number of drivers in the chain and the number of LED drive bits required by each driver.

In both cases, it is possible to construct an LED array where multiple LEDs are controlled in parallel. This can decrease the required speed of the serial transmission, while increasing the number of control lines needed to connect the controller mechanism to the LED array.

The ordering of the drivers should mimic the LCD update pattern, typically in groups of horizontal rows, as shown in FIG. 4. In this method, the serial LED stream is distributed according to the LED horizontal and vertical index, so that LED updates can be synchronized with LCD refresh, as discussed in Timing and Synchronization. This can be challenging for certain tiling arrangements.

Compared to parallel driving of LEDs, this method requires far fewer connections between the controller and the backlight.

Thermal Design

The thermal design of the LED board serves two goals: to remove heat from each LED to lower its operating temperature, and to attempt to bring each LED to a uniform temperature.

The first goal serves to maximize LED output efficiency and lifetime, and the second to ensure uniform luminance and color across the backlight for increased image quality.

Passive Thermal Design

Figure 5:
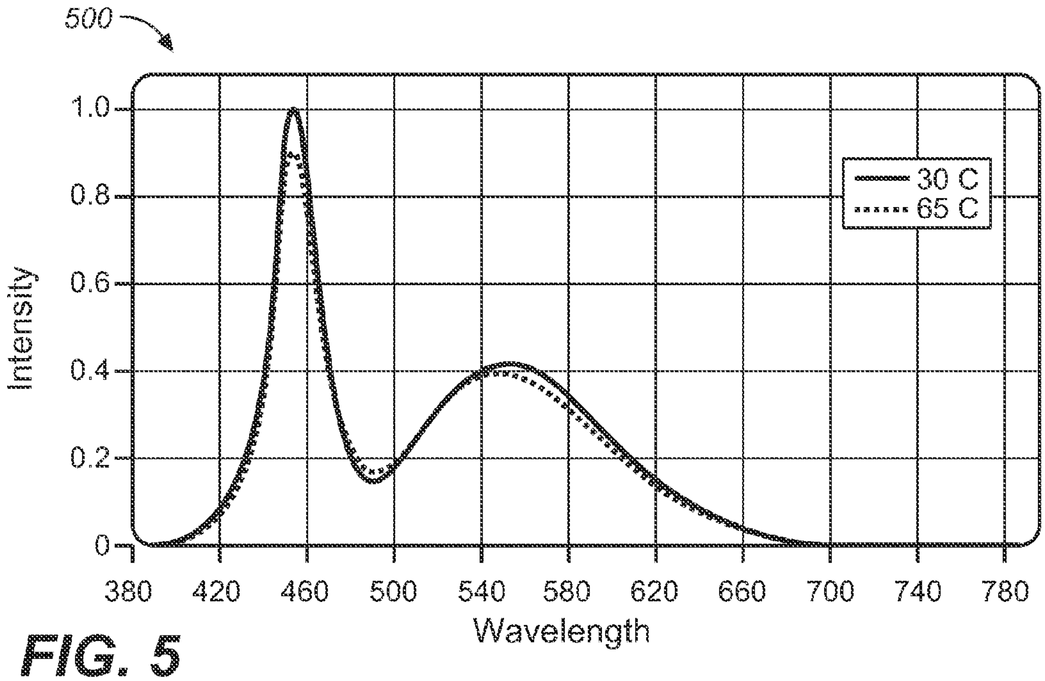
FIG. 5 is an illustration of an LED Spectrum Shift Versus Operating Temperature as described/used according to design criteria according to an embodiment of the present invention.

Both the luminance and dominant wavelength of an LED are dependent on the junction temperature Tj. As can be seen in FIG. 5, which is an illustration of an LED Spectrum Shift Versus Operating Temperature graph 500, changes in Tj by 60 (C) tend to cause the dominant emitted wavelength to increase by several nanometers (nm). Over the same range, light output can drop by 40 percent. To achieve the best image quality the thermal design of a display should maintain a uniform and steady junction temperature for all LEDs in the backlight. While this would not be a major concern for a backlight when LEDs are operated under steady-state conditions, as the output would be predictable and stable, Dolby HDR drives the LEDs under highly dynamic conditions, causing frequent and significant changes in junction temperature and hence in LED output and LED lifetime.

Figure 6:
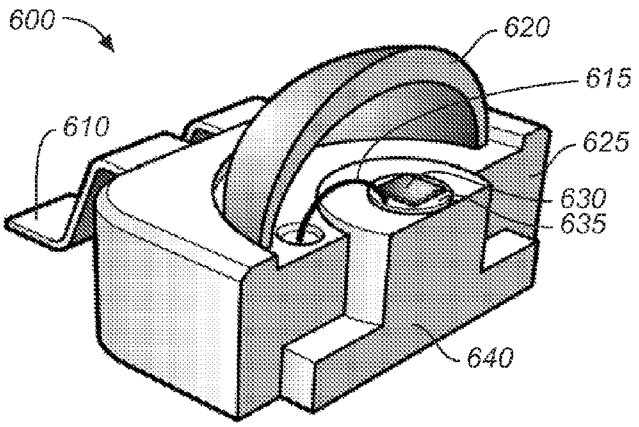
FIG. 6 is an illustration of an LED Package according to an embodiment of the present invention.

An LED is essentially a small wafer of layered semiconductor materials called a diode. These layers are crystalline, and their molecular structures change at their boundaries. Such discontinuities are called junctions. As electrons jump across the junction they adjust to different orbits and therefore emit light. The type of materials at the junction determines the wavelength of the emitted light. LED components are displayed in FIG. 6, and include Cathode lead 610, bond wire 615, lens 620, outer package 625, LED chip 630, silicon submount 635, and heat slug 640.

Because LEDs are not perfectly efficient, over 50 percent of this energy is converted into heat. This heat rapidly raises the temperature of the relatively small volume of the LED, changing its light-emitting characteristics. The amount of junction heating depends on the current applied to the LED, as well as the thermal resistance of the path between the LED junction and the substrate, commonly a printed circuit board (PCB) to which the LED is mounted. This thermal resistance—known as the junction-to-base thermal resistance, or Rj-b—is measured in ° C./W. When the thermal resistance is multiplied by the LED operating power, this gives an indication of the temperature difference between the LED junction and LED base.

A highly optimized thermal path passes heat directly through the LED package, creating a very low thermal gradient. A poor thermal path, however, results in a large thermal gradient across the package with a specific time constant. This thermal path can be modeled as an RC circuit, with the thermal resistance corresponding to the resistive element of the circuit, and the time constant corresponding to the capacitive element. The resultant temperature gradient can contribute to unstable operation of an LED, and requires specific drive conditions for optimal performance. The thermal path is fixed during diode fabrication, and is therefore included in the specifications of a particular LED. For backlight designs striving for optimal LED stability, the thermal resistance of the LED package is a useful criterion for LED selection.

The primary causes for LED instability in a Dolby HDR display are the varying junction temperature due to display warmup, varying image content, and pulse driving of LEDs.

Display Warmup

Display warmup is the initial rise in temperature when a display is first turned on. If a display has been in an off state for a sufficient period of time, typically several hours, all components are essentially at room ambient temperature. When the display is first turned on, its electrical components heat up, increasing the temperature of the PCB. The junction temperature of an LED then rises as heat is conducted through the PCB it is mounted on. This junction temperature rise affects the output of each LED. The display temperature rises quickly at first and gradually approach a steady state as the display reaches its operating temperature, usually within about 30 minutes.

Figure 7:
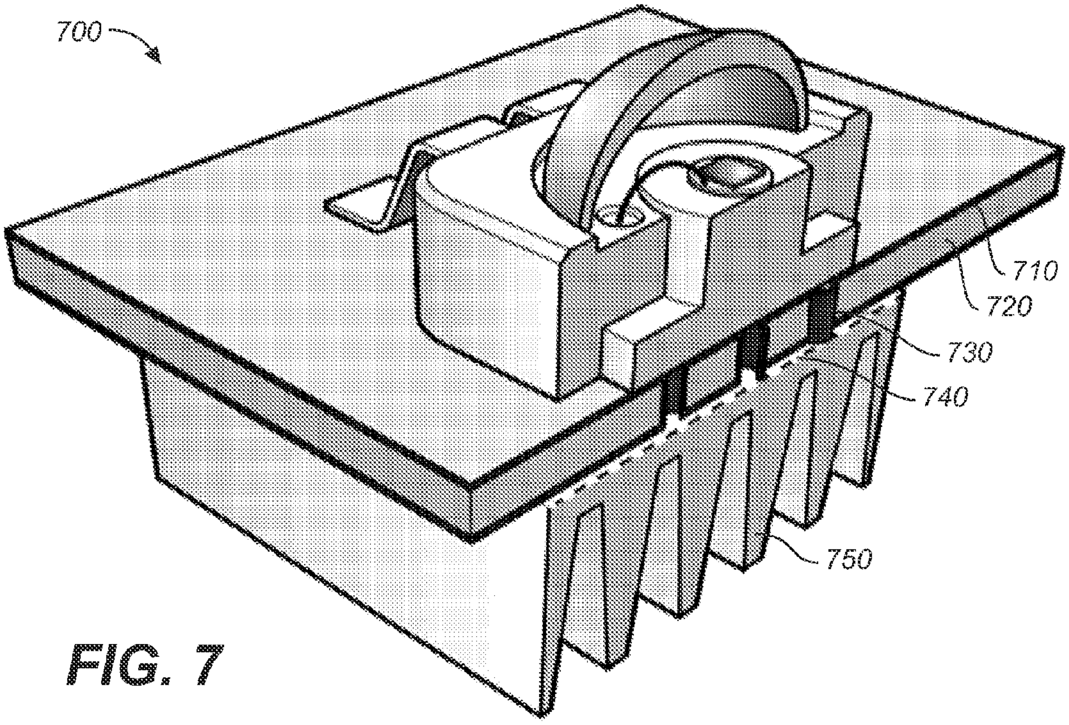
FIG. 7 is an illustration of a PCB Design for Thermal Conduction according to an embodiment of the present invention.

This initial temperature rise presents a challenge for maintaining LED output stability, as the LED junction temperature can vary by as much as 60 degrees (C.) over this time frame. The problem during display warmup can be mitigated by minimizing the resistance of the thermal path between the LED and the PCB with the effect of reducing the maximum temperature gradient and hence the junction temperature. This involves selecting an LED with a low thermal resistance, designing the PCB to transmit heat efficiently into the chassis, and designing for maximum airflow over the chassis using ambient air, even to the extent of employing a heat sink and fans to facilitate heat dissipation into the air, as illustrated in FIG. 7 which is an illustration of a PCB Design for Thermal Conduction 700 including Copper 710, Dielectric 720, via 730, TIM 740, and Heat Sink 750.

Heat is removed from the LEDs by maximizing the thermal conductivity of the PCB. Common printed circuit boards are manufactured from a glass epoxy designed for flame retardation and with a thermal coefficient matching copper. However, the glass epoxy is not a good heat conductor, with a typical thermal conductivity of only 0.25 W/m·K.

To increase thermal conduction through the PCB we recommend inserting thermal vias, which are small pipes less than 1 mm in diameter. The vias are made by drilling holes through the board, and then plating the holes with copper, with thermal conductivity close to 400 W/m·K. Depending on the number of vias, the thickness of the PCB, the thickness of the copper plating, and the size of the holes, thermal vias can greatly increase the through-plane thermal conductivity of the PCB. Vias are typically located directly under the LEDs for optimal performance.

Varying Image Content

Non-uniform temperatures across the backlight unit, due to non-uniform heating from LEDs for any given image content, presents a second challenge for maintaining stability of a display. LEDs that are producing more light than others will have a higher junction temperature. The non-uniformity of junction temperatures for the LEDs is most noticeable immediately following a switch from non-uniform image content to a uniform white screen. The LEDs that were driven at a low level in the previous frame will be driven at a high level in the uniform screen, but will be at a lower temperature. These cooler LEDs will rapidly warm up to match the LEDs that were on in the previous frame. This will occur on the order of tens of seconds. During this time, the user could notice a non-uniform intensity and color spread over the screen, which would gradually fade as the backlight returns to a uniform operating temperature. Though temporary, the effect is similar to image burn-in on older CRT monitors.

Figure 8:
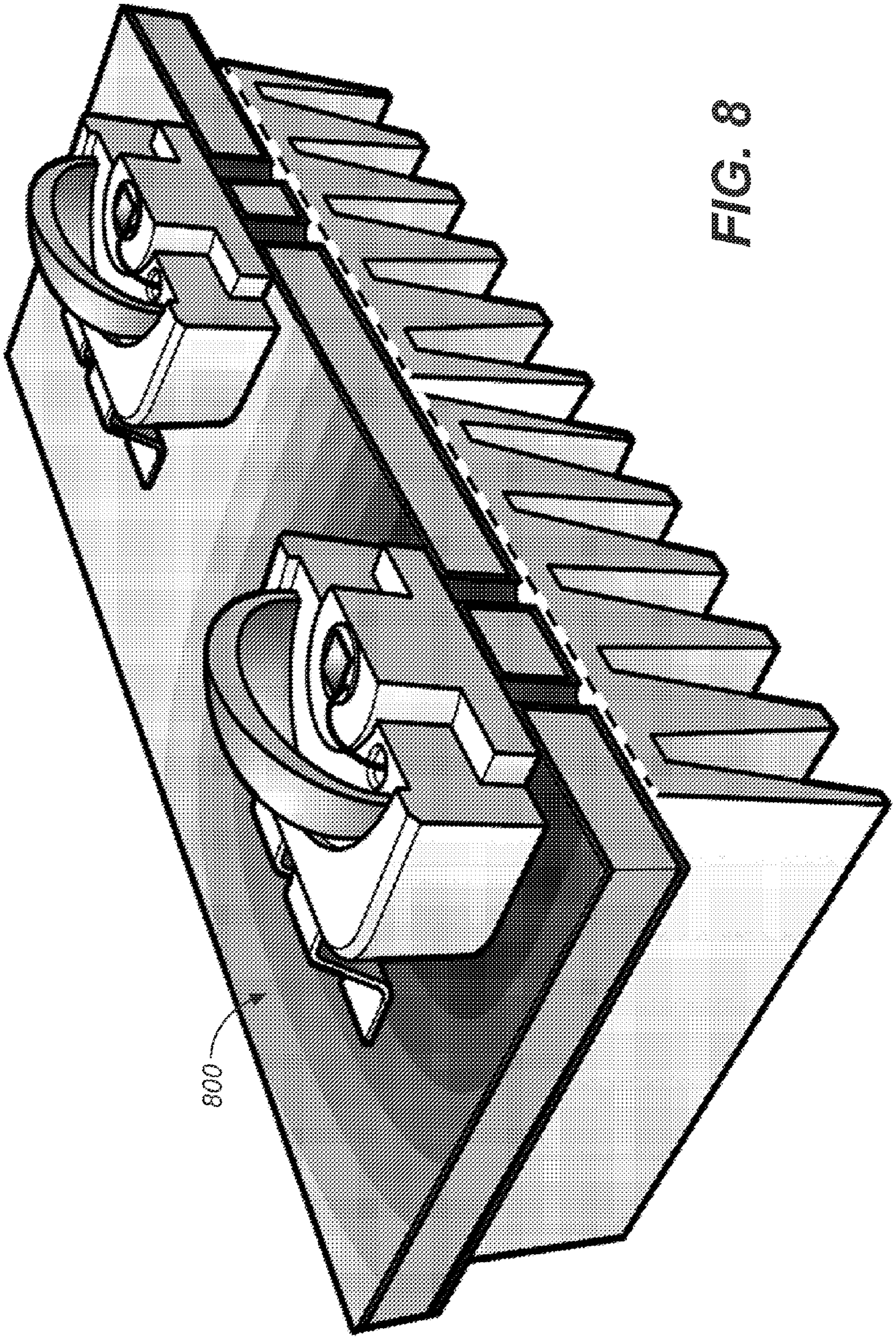
FIG. 8 provides an example of PCB Thermal Spreading as described and as may be utilized in designs according to an embodiment of the present invention.

Spreading heat between LEDs is accomplished by increasing the thermal conductivity 800 in the plane of the PCB, as shown in FIG. 8. One option is to take advantage of thick power and ground planes to conduct heat, or by integrating a highly conductive heat spreader to the PCB. A common heat spreader is a metal-core circuit board, which, instead of a glass epoxy dielectric, is made from coating an aluminum plate with a very thin dielectric, and then laminating copper layers or printing electrical traces directly onto a metal substrate. As an alternative to metal cores, graphite or ceramic cores can be used with the advantage of electrical insulation. While capable of excellent thermal conductivities, MCPCBs and other specialty PCB materials are significantly more expensive and require special manufacturing capabilities.

LED Pulse Driving

For precise control of the LED output it is desirable to rapidly turn the LED on and off with constant current pulses, typically at hundreds to thousands of pulses per second (Hz). Since these pulses have a much shorter duration than the integration time of the human visual system, they are not perceptible to the human eye, which instead integrates the light output into a perceived brightness. This results in a very linear and predictable control of the LED intensity when compared to drive techniques that rely on varying the current or voltage supply.

Figure 9:
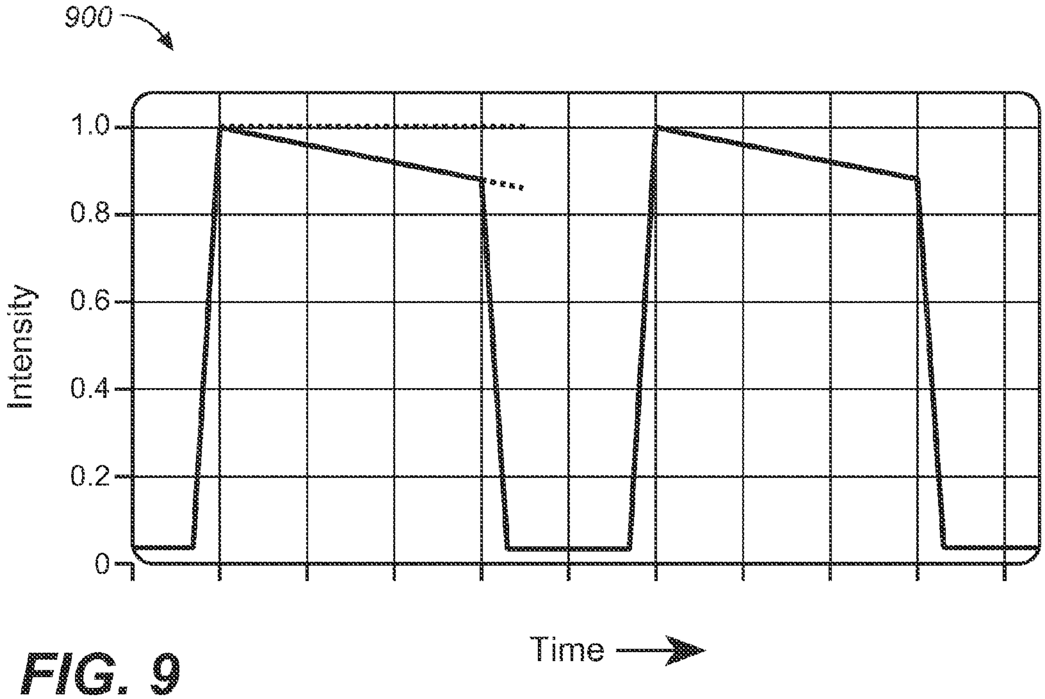
FIG. 9 is an illustration of an effect on Junction Temperature from Pulse Driving as may be utilized in designs according to an embodiment of the present invention.

Several drive methods have been employed to generate a suitable series of pulses, the most common of which is pulse width modulation. The very short pulses from any digital drive technique affect the stability of the LEDs. If the length of the on and off times of any pulse is longer than the time constant of the LED thermal package path, the junction will cool down in the off time to a temperature equal to the LED substrate, or PCB. If the PCB is maintained at a constant temperature, then during each pulse, the junction will start at roughly the same temperature and rise to a temperature that depends on the current and the thermal resistance of the LED package, making each pulse nearly identical. This is illustrated in FIG. 9 which is a graph 900 illustrating an exemplary effect on Junction Temperature from Pulse Driving.

For the same reason that the pulse itself is imperceptible to the human eye, this rapid change of the LED junction temperature is also imperceptible. However, constant thermal cycling of the LED shortens the lifetime of the LED by introducing thermal stresses. As the thermal interface between the LED diode and substrate weakens, the thermal resistance of the LED increases, leading to larger temperature gradients.

LED Selection

The LED package thermal path is the primary concern when selecting an LED for thermal performance. Lower thermal resistance, denoted by Rj-b, results in more stable performance under dynamic drive conditions.

The maximum operating temperature of the LED also plays some role in performance, but this is less significant than thermal resistance, as most LED diode materials have very similar maximum ratings. The maximum operating temperature quoted in manufacturer's specifications indicates the maximum temperature before the package will fail. In practice, it is necessary to maintain the junction at much lower temperatures, by selecting a point along the LED temperature/efficiency curve so that the LED will operate at a high efficiency.

Finally, many LEDs are equipped with a thermal pad to assist thermal conduction from the LED package to the PCB substrate. These thermal pads are most useful when they can be electrically connected with power or ground, as this allows them to be soldered directly to a large plane in the PCB to assist thermal spreading. LEDs with thermal pads that can be directly connected to a large plane are preferable to LEDs that require the thermal pad to be electrically isolated.

Electrical Design

The complexity of the electrical design depends on the control scheme for the backlight, as discussed in Backlight Control Schemes. A very simple control scheme could be implemented on as few as four layers, with the advantage of very low cost and design time, as well as flexibility of manufacturing techniques and materials. However, a more complex control scheme can require additional layers, to accommodate the necessary signal and power routing. For a Dolby HDR display, general PCB layout guidelines should be followed for specifying trace widths and clearances, and number of vias on signal lines. Issues specific to a Dolby HDR display include the length of clock lines due to the sheer size of the backlight, as well as the unique power requirements of driving many LEDs.

If implementing control schemes using serial data, clock traces are likely to be very long, as they will typically traverse the entire tile. Routing of all control signals, such as clock and data lines, should be designed according to standard signal integrity guidelines. For Dolby HDR, we recommend line buffers to read and re-create clock pulses for sustained integrity over long distances. Clock skew between drivers can be minimized by using a distributed clock tree. Ensure that all clock pins are terminated with a series resistor.

Turning on many LEDs simultaneously and at high frequencies can place significant demands on the power supplies. We strongly recommend that Dolby HDR displays are designed with large solid power and ground planes to provide good current source and sink capabilities. If possible, select drivers that support output skew, as discussed later in this section.

Sensors

Temperature sensors should be placed evenly across the surface of the backlight, to provide warnings of hot spots created by incorrect image processing or degradation of the thermal interface material.

Mounting

There are several considerations for mounting the backlight tiles into the display chassis. A thermal interface material should be installed between the PCB and the chassis to assist with cooling of the backlight. The purpose of the material is to increase the surface area of the thermal interface by filling the microscopic surface structures of both surfaces. This can significantly reduce the operating temperature of the backlight PCB and LEDs, hence increasing system efficiency, stability, and lifetime. We recommend TIM materials with fiber backings for ease of installation. Before installing the TIM, it is important to ensure that all surfaces are cleared of any burrs, grooves, or other manufacturing defects, and that they are thoroughly cleaned and degreased to ensure good contact of the thermal interface.

A second mounting consideration is the difference in thermal expansion between the LED PCB and the chassis. As the PCB warms up, it will expand at a different rate than the chassis, which is a different material that operates at a different temperature. Because of differences in the coefficients of thermal expansion (CTE), improper design can result in buckling and warping of the LED boards, openings, shorts, or a separation of the board from the thermal interface material. We recommend mechanically attaching the backlight tiles in many locations to prevent buckling, and using the thermal interface material to provide some flexibility in the mounting interface. All mounting locations must provide enough clearance to accommodate thermal expansion within manufacturing tolerances.

Mounting to a rigid chassis also places limitations on the placement of components. If installing the LED backlight tiles to a flat chassis or heat spreader, all electrical components must be located on the top side of the PCB. This may be complicated or impossible due to space availability on the top side of the board, so it may be desirable instead to have some components mounted on the bottom side of the PCB, and protruding through the chassis or into corresponding slots.

LED Drive Techniques

The selection of LED drive techniques can be divided into analog (constant current) and digital (pulse width, pulse code, and pulse density). This section describes and compares each method.

Constant Current

The output of an LED is dependant on the current applied across the junction. Higher current results in more photons being emitted. The voltage across an LED is logarithmically related to the current, so remains largely constant over the operating range of the LED. Hence, the light output of an LED can be controlled by limiting the current that is applied. This is commonly referred to as constant current control. For consideration of a Dolby HDR display, this type of analog control is difficult to implement, as it requires high-precision digital-to-analog converters and can be inefficient in regulating of the desired current. Additionally, the relationship between light output and current in an LED is highly nonlinear, requiring calibration to correctly display the desired luminance.

The primary advantage of this drive technique is that it results in low thermal and electrical stress to the LED due the relatively slow rate of change of the input signal when compared to digital techniques. The relative slow rate of change increases the expected LED lifetime, as discussed in Chapter 2, but does not necessarily improve the color or luminance stability.

Pulse Width Modulation

The most widely used drive technique for LEDs is pulse width modulation (PWM), which is supported by approximately 90 percent of LED drivers on the market. This technique uses a square wave whose length is modulated within a fixed period resulting in the desired average on-time value. The PWM drive signal is determined by PWM frequency f, or the period T=1/f, as well as the duty factor DF, which is the percentage of the period that the signal is on. The duty factor can be considered as a quantized version of an analog signal where the on-time value is substituted for voltage.

Figure 10:
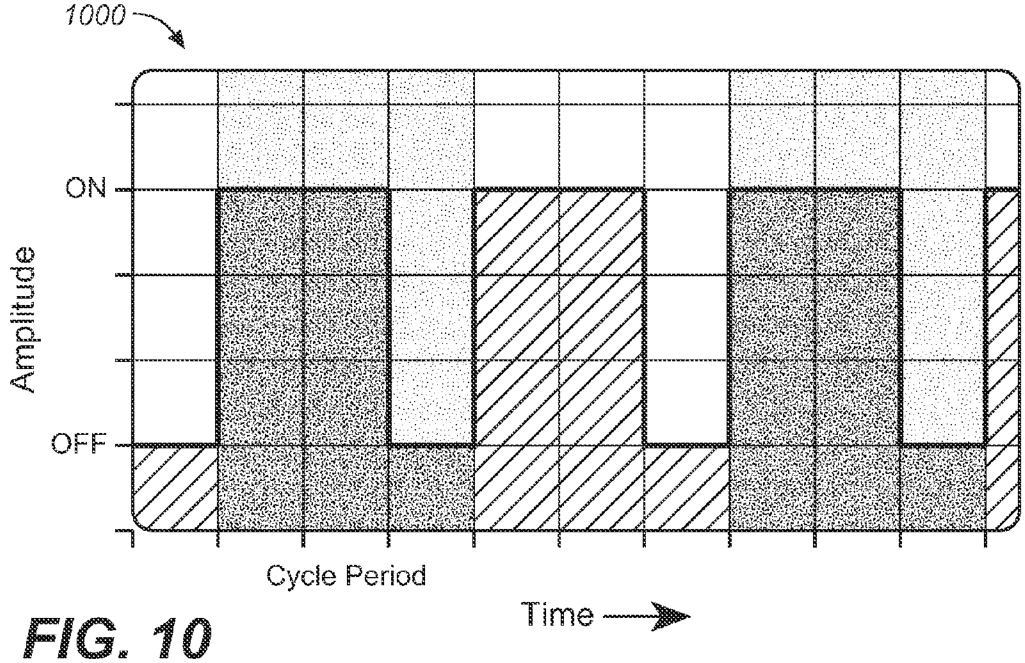
FIG. 10 is an illustration of PWM Encoding as may be utilized according to an embodiment of the present invention.

For a typical Dolby HDR display the duty factor is controlled according to the desired LED intensity. The primary advantage of the PWM drive over analog for LEDs is that the light output is nearly perfectly linear with respect to the input duty cycle. This is partly due to the very fast response time of LEDs, which, when controlled by a suitable driver, turn on nearly instantly in response to the digital drive signal. The binary nature of the PWM signal also makes it very easy to implement using digital switches that maximize efficiency by either being off (not conducting any current), or on while having minimal voltage drop across them, as shown in FIG. 10, which comprises an illustration of PWM Encoding 1000. Generating a PWM signal is optimized by widely available specialized hardware, typically using a counter that tracks the on time required for a given number of clock cycles.

When applying PWM for controlling a Dolby HDR display, it is important to consider the parameters defining the PWM signal. These are primarily the resolution of the duty factor and the PWM frequency. The duty factor resolution determines the precision to which the on-time value can be specified.

The number of bits required for a Dolby HDR backlight is determined by the maximum modulation of the backlight and the desired minimum brightness increment of an individual LED. For example, if the maximum LED modulation is 100 percent (that is, full-on through full-off) and the desired minimum step size is a 2 percent change in brightness, the number of required bits is shown below.

$$\log 2\left(\frac{100(\text{percent})}{2(\text{percent})}\right) = 12 \text{ bits}$$

The PWM frequency is determined to be greater than the minimum frequency that the human eye can perceive as a flicker. The Ferry-Porter law provides a critical fusion frequency, above which an average sample of the population does not perceive flicker. A human observer is much more sensitive to flicker in peripheral vision. To eliminate flicker in direct-lit displays, a minimum PWM frequency of 60 Hz is required when viewed directly (fovial vision), while a higher frequency of 300 Hz is typically required to eliminate flicker in peripheral vision. To allow for some variance, a Dolby HDR backlight should operate at PWM frequencies of 360 Hz or higher. In addition, it is convenient to have the PWM frequency a multiple of the video refresh rate.

Pulse Code Modulation

Figure 11:
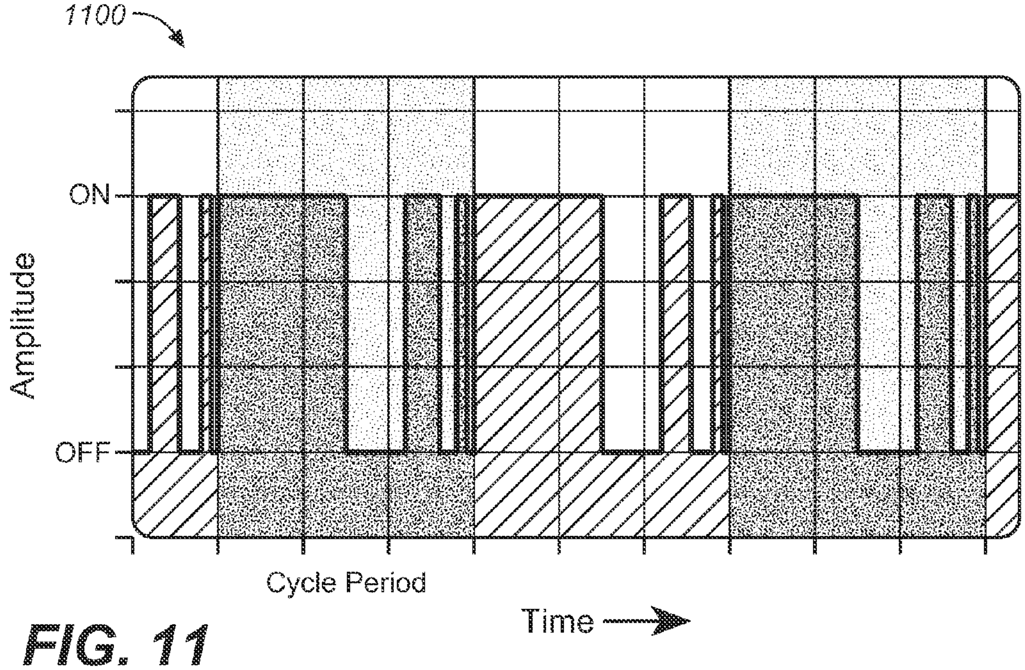
FIG. 11 is an illustration of PCM Encoding as may be utilized according to an embodiment of the present invention.

A second option for digital drive techniques is pulse code modulation (PCM). This technique employs a digital representation of an analog signal where the magnitude of the signal is sampled regularly at uniform intervals, and then quantized to a series of symbols in binary code. As such, PCM is completely digital as compared to the analog nature of the PWM duty factor. PCM is an alternative to PWM because of the reduced number of required operations per clock cycle when implemented in firmware (i.e., see Extended Parallel Pulse Code Modulation of LEDs: Ian Ashdown; copyright 2006, Society of Photo-Optical Instrumentation Engineers). This allows inexpensive controllers to independently control many LEDs. A secondary advantage of PCM is that the quasi-random sequence of pulses comprising each cycle tends to minimize the thermal cycling effects contributing to reduced LED lifetime. PCM encoding 1100 is shown in FIG. 11.

Pulse Density Modulation

Figure 12:
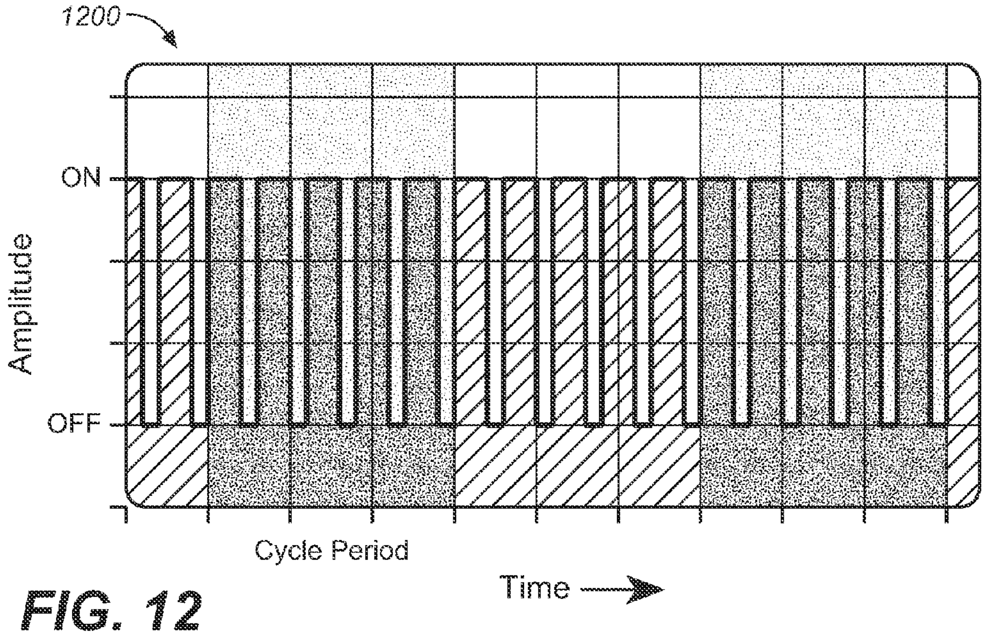
FIG. 12 is an illustration of PDM Encoding as may be utilized according to an embodiment of the present invention.

A third option for digital drive techniques is pulse density modulation (PDM), which is a digital equivalent of frequency modulation (FM). PDM sends the LEDs a very short pulse with a frequency that depends on the desired luminance. This control has several advantages over both PWM and PCM. For PDM, the on-time value for all of the LEDs on the backlight is spread evenly over each video frame, as shown in FIG. 12 (an exemplary illustration of PDM Encoding 1200). This results in a lower peak-power load than both PCM and PWM, which both turn on all LEDs at once at the beginning of each video frame. A secondary advantage is that depending on the drive level, the LED diode has more consistent off time, so it is driven at a more steady level. This same technique can be used to overdrive the LEDs with a brief pulse of current at a higher level than would be stable for long periods of operation, but doing so is not recommended for Dolby HDR displays due to the possible though unstudied effects on LED lifetime and stability.

LED Drivers

The selection of LED drivers is increasing rapidly as LED lighting is adopted by a growing number of industries. Choosing from the variety of features is difficult because of the complexities of available options. This section describes the features to consider when selecting a driver for a Dolby HDR display.

Number of Outputs

The number of LED driver outputs is crucial, as it determines the number of drivers required for a Dolby HDR backlight and therefore the total cost of the unit. The number of drivers required is the total number of LEDs divided by the number of outputs on each driver.

When comparing the number of outputs on a driver, it is also necessary to consider the output current and voltage, which may limit the number or type of LEDs that can be controlled by each output, requiring more than one output for each LED. The output current is also often related to the driver efficiency, which should be taken into account when determining power and thermal requirements.

Output Current

The output of most LED drivers is controlled as a current sink, meaning that it connects the LED cathode to ground. Each output will be able to sink a maximum current based on the limitation of dissipating power generated by current flowing through the driver. Higher current driver outputs require more physical space to dissipate the power, which requires either less outputs per driver or a larger physical package size, neither of which is desirable. Typically during design of a Dolby HDR display, the luminance and cost requirements of the design determine the type and number of LEDs needed. The LED current then determines the LED driver output current. When selecting the LED driver, be sure to account for reduced specifications for maximum current at increased temperatures that are common during operation.

Output Skew

The output skew (phase) is a useful feature of some LED drivers. Output skew represents the phase difference between each of the outputs of the LED driver. This phase difference acts to slightly stagger the turn-on time of each of the LEDs, greatly reducing the peak power load of the backlight, in cases when all LEDs are turned on simultaneously.

Clock Rate

The clock rate of the LED driver depends on the complexity of the calculations that it will perform. This will affect the maximum resolution of a PWM signal, as well as any more complex calculations such as onboard calibration, feedback, signal mapping, or serial communication. The control signal to the backlight of a Dolby HDR display typically requires two clocks: one for the serial stream and another for the PWM generator. The clock for the PWM generator can range from 30 kHz to 2 MHz, depending on the PWM frequency f (described in Pulse Width Modulation) and PWM bit depth. This is shown below.

$$PWM_{CLK}=2^n\times f$$

The LED serial clock must be fast enough to update each of the LEDs on the backlight during a single video frame. This clock is typically on the order of 130 kHz, as calculated below, but is highly dependant on the system architecture. The frame rate is the update frequency of the video frame, between 24 and 120 Hz. The LED bit depth m is the control resolution desired for the LED intensity, and the 110 percent is a typical margin to allow for some overhead.

$$LED_{CLK}=\text{framerate}\times m\times No_{clusters}\times 1.1$$

Diagnostics

Onboard diagnostics permit the controller to perform elegant failure modes or modify the LED control depending on the limitations of the system. Typical diagnostics are open- and short-circuit detection on LED outputs, due to LED failure, which could be compensated for by the LED control algorithm if correctly determined. Other diagnostics include temperature feedback for early warning of LED fault or unsuitable operating conditions of the drivers.

Communications

The communications of the LED drivers will greatly determine the architecture of the Dolby HDR control system, as discussed in the beginning of this chapter. Various options range from "dumb" LED drivers that accept a PWM-like digital drive signal and supply the desired current to the LED, to much more intelligent drivers that are able to accept LED color and intensity values from a serial stream and deliver precise control to the LED. For a Dolby HDR display, it may be necessary to control many LED drivers across the backlight. It is important to ensure that communications protocol can support an adequate number of drivers, while minimizing the complexity of the LED board layout.

Feedback

Several types of feedback can be incorporated into the LED driver to maintain LED stability over its lifetime. As the temperature of LED increases, the efficiency decreases and with it, the luminance output. The PWM drive signal to the LED can be adjusted to compensate for reduced output, limiting its ability to correctly display bright images, but also limiting the damage done to the LEDs.

The voltage of the driver output can also be monitored as a feedback mechanism. As the LED forward voltage is dependent on the temperature of the diode, monitoring the driver pin voltage can indirectly measure the temperature of the diode and hence the predicted output of the LED. A correction is applied to the LED drive signal to adjust the light output to the desired level.

A third but much more complex method of ensuring LED output stability is to measure the light output using one or more optical sensors. The sensors are coupled to the light output of the LED and are hence able to measure relative changes in light output. The sensors can be calibrated under known output conditions and their reading continuously measured and compared against the calibrated condition to estimate the actual output of the LED. The output is then compared against the desired level and adjusted accordingly. This method is the most complex to implement due to difficulties in ensuring that the light being measured is from a known source—that is, from the LED being controlled. In a Dolby HDR display, light from multiple LEDs is typically present throughout the backlight, making isolation of a single LED for measurement challenging. Isolation can be accomplished by ensuring that only a single LED is on at a time and synchronizing with the measurement.

Size and Placement

The size of the driver package determines if it will physically fit within the LED array, or if it must be located to the side of the array or on the bottom of the board. Mounting the driver package to the side of the board increases the capacitance, latency, and routing complexity. The underside location introduces challenges with mounting the LED board to the display chassis as well as with thermal design. We recommend selecting an LED driver with a small package size that will fit inside the LED array.

Timing and Synchronization

It is important to consider synchronization issues during design of a Dolby HDR display. This synchronization can be divided into video level, which is on the order of several video frames, and frame level, which happens during a single video frame.

Video Level Synchronization

Synchronization between the backlight and the LCD can directly affect the image quality of a Dolby HDR display. Since the LED drive levels and LCD correction are both dependant on the input image, it is important that both modulators are working together to display the same image at the same time. A loss of synchronization between the two modulators would result in noticeable visual artifacts, especially during rapidly moving video scenes.

Depending on the complexity of video processing conducted on the TCon, it is possible that the LCD image is delayed by as much as several frames. For best image quality, it is desirable to characterize the video delay on the TCon and compensate for the delay by buffering LED drive levels, or by matching the time required for calculation of LED drive levels with the system delay.

A second concern for synchronization is the audio component. Many display tuners are equipped with a method of synchronizing the audio and video streams, but delay must be taken into account when adding any additional streams into the processing pipeline for a Dolby HDR display.

Frame Level Synchronization

LEDs and drivers have very fast response times, typically close to 2 microseconds. LCDs have a slower response time, about 8 milliseconds (ms), or 4,000 times slower. This means that if the LEDs' values are refreshed at the same time as the LCD, the image will be incorrect for the period of time that it takes the LCD pixels to reach correct values. This effect results in image artifacts typically referred to as motion blur, but also causes colors to be misrepresented. For best image quality, we recommend that the backlight is turned off during the LCD pixel refresh for each frame. This is sometimes referred to as black point insertion. It has the undesirable effect of reducing the maximum brightness of the display, so becomes a design trade-off with quality.

In addition to the relatively slow response time of the LCD pixels, LCD panels typically have a specific update pattern for pixels on the screen. If using black point insertion to improve image quality, it is important to fully characterize the LCD pixel update pattern to ensure that the correct portion of the backlight is off depending on which pixels are being refreshed at any given time.

Depending on the features of the LED driver, it can also be possible to ramp up the LED intensities during each LED refresh to match the LCD refresh pattern, reducing the strain on the eye and improving the perceptual smoothness of motion.

Timing Measurements

Specific information relating to LCD panel frame delay, response time, and update patterns is often proprietary. It is therefore very useful to be able to fully characterize an LCD panel before committing to a design. This is most easily achieved by using a high-speed camera to image the entire panel at speeds of over 2 kHz, or at least double the specified LCD pixel refresh speed. The LCD panel is illuminated at this point with a constant backlight, to prevent any frequency interference that would occur for a PWM-controlled LED backlight. The LCD panel timing can then be measured by displaying a test pattern of vertical white stripes moving horizontally across the screen.

Power Requirements

The power supply for Dolby HDR is primarily dependant on the LED efficiency and the desired brightness. Other power requirements are for the video controller board and other electronics. As the specific power requirements are highly dependant on many design choices, this section focuses on recommending design guidelines for minimizing power consumption, and does not attempt to calculate the total power required for any given display configuration.

Voltage Matching

It is important to match the supply and demand voltage of each LED as closely as possible. The demand voltage VD is the forward voltage for each LED, the range of which depends on the range of forward voltage for each LED VF. The supply voltage is the power VS which is supplied to the LED by the driver at the LED drive current. The difference between the supply voltage and the demand voltage must be dissipated by the driver as heat, given by PE. This excess power increases the physical size and cost of the driver, so should be minimized during design. The methods for optimizing the design for a Dolby HDR display are the following:

Determine the minimum supply voltage of the LEDs' VS, taken from the maximum LED forward voltages. Depending on the LED, the range of forward voltage will be supplied in the manufacturer's specifications. It is often possible to select a bin of LEDs that have a forward voltage guaranteed to fall within a certain range for additional precision. If the forward voltage is provided for certain drive conditions, ensure that the forward voltage does not increase under the intended operating conditions. The maximum forward voltages for all LED gives the minimum required supply voltage VS. Ensure that the selected LED driver is able to provide the required VS at the LED drive current.

Determine the required power dissipation from the driver PE, as shown below. This is done by first calculating the minimum demand voltage as in step 1 but using the minimum LED forward voltage from the manufacturer's specifications. Subtracting the minimum demand voltage from the supply voltage gives the potential difference that will be dissipated by the driver. Multiplying the difference by the LED drive current ILEDs gives the power dissipated by the driver. Ensure that the selected LED driver is able to dissipate the required PE.

$$P_E = I_{LEDs}(V_S - \Sigma_n V_{FMin})$$

Some LED drivers are able to adjust their supply voltage according to the demands of the LED, to further minimize power requirements. These typically operate by incorporating a voltage boost that is controlled by a feedback loop from the current sink pin. These types of drivers can reduce the power requirements of a display, though they have limited availability.

Cables and Connectors

It is important to correctly design the cables used to interconnect the various modules in a Dolby HDR display. The following design guidelines will help to avoid potential problems that could be encountered from inadequate cable design and selection.

Shielding

Cables and connectors should be shielded for EMI and interference. Shields must be full coverage and connected to ground on both ends. Cables should also be formed of twisted pairs to minimize ground loop area and reduce EMI emissions. Signals should be LVDS (low voltage differential signal) to minimize noise and interference susceptibility and to improve signal integrity.

Termination

Signal cables must be correctly terminated for correct operation. Signal reflections must be minimized by ensuring excellent impedance matching at cable termination. Signal drivers must be chosen for adequate performance, and should be isolated.

Optics

This chapter provides an introduction to optical design considerations for a Dolby® HDR display. Presented first is the concept of the light spread function, which is dependent upon the optical elements described and which is the most significant determination of display quality. Then each optical element is quantified in more detail. In addition, the most important visual artifacts caused by the limitations of a physical display are presented.

Light Spread Function

Figure 14:
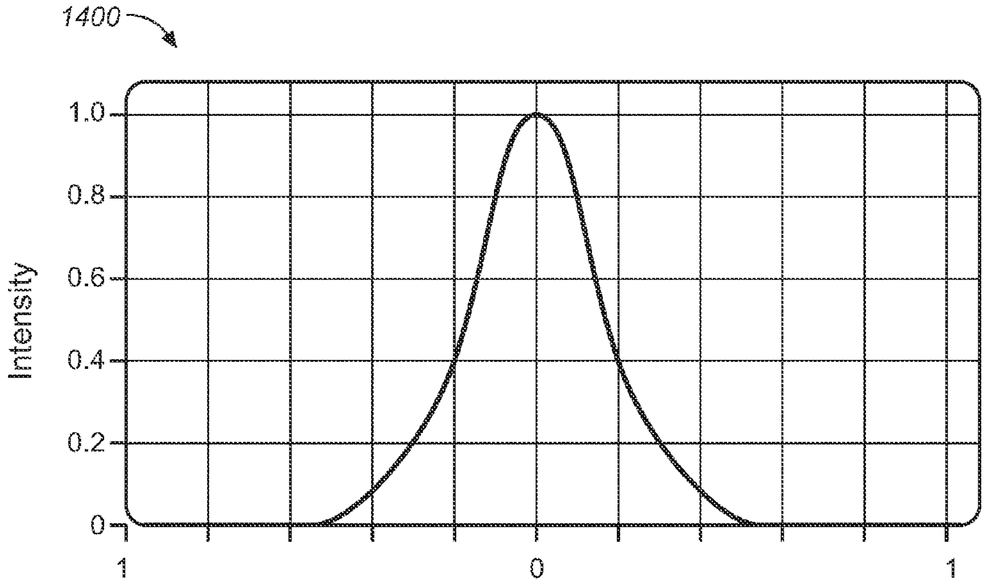
FIG. 14 is an illustration of a Cross Section of Light Spread Function according to an embodiment of the present invention.
Figure 13:
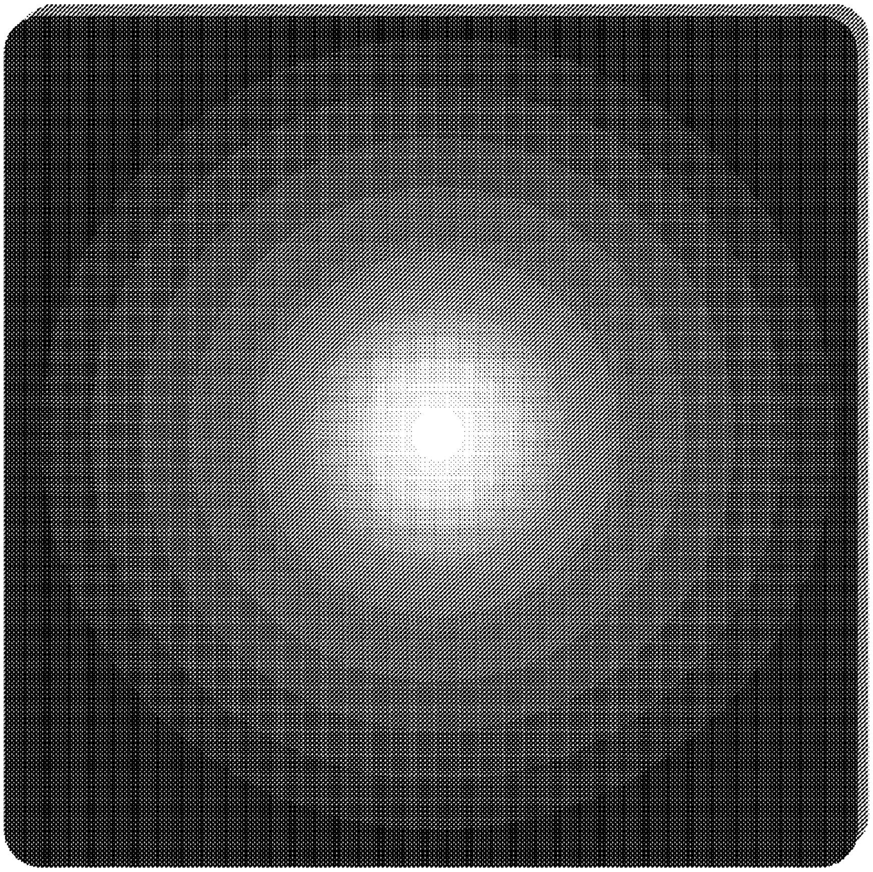
FIG. 13 is an Image of a Light Spread Function according to an embodiment of the present invention.

The light spread function (LSF) is the spatial spread of light emitted from a single LED as observed from the front side of the LCD panel with the LCD pixels fully open. As light is emitted from an LED and passes through the optical films, it is diffused and spreads from its source. FIG. 13 illustrates the LSF 1300 from a single LED through the LCD panel. FIG. 14 shows a corresponding cross section 1400.

On the rear side of the LCD panel, the luminance of the LSF falls off as a function of distance from the light source. The shape of the LSF is a key factor in the functionality of a Dolby HDR display. The LSF is affected by several factors, including the LED, the spacing between LEDs, and the optical characteristics of the backlight, such as cavity spacing and optical films. These parameters are discussed in more detail in this chapter.

LEDs

An LED is a semiconductor diode that emits light in a narrow spectral band. The LEDs used for a display emit light in the visible spectrum. For a Dolby HDR display, the emitted spectrum through the LCD must appear as a white light to a human observer, with a preferred correlated color temperature (CCT) of greater than 6,500K. The CCT of the display depends on both the spectral emission of the LEDs and the spectral transmission of the LCD filters.

A white LED is an LED that produces a fixed spectrum that is perceived by a human observer to be white light. Unlike color LEDs, a white LED only has a single controllable element that corresponds to the intensity of the white light.

Figure 15:
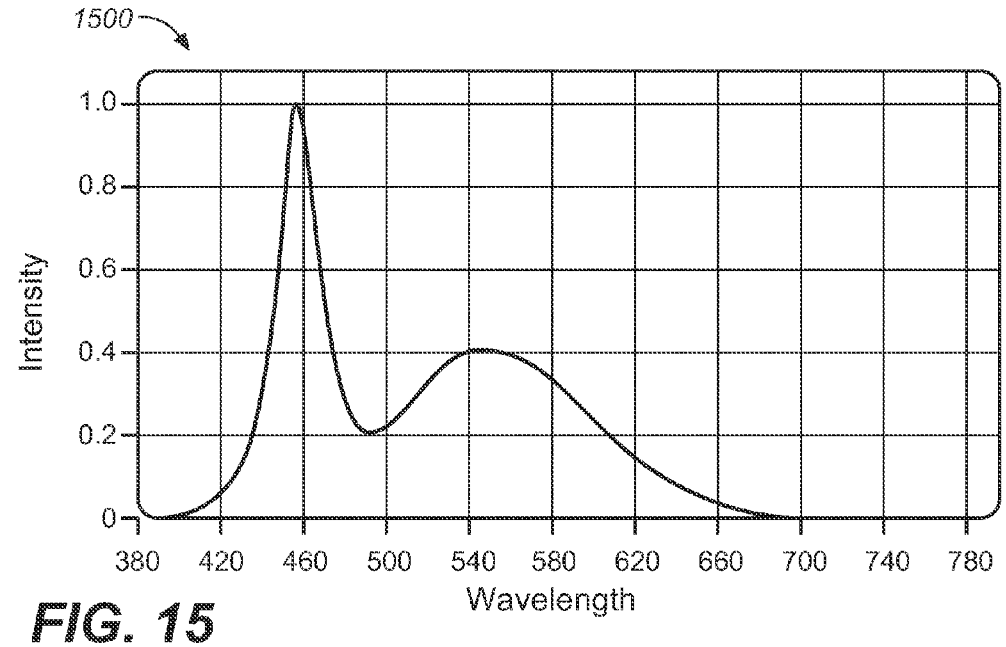
FIG. 15 is an illustration of a Spectrum of a White LED as may be utilized in designs according to an embodiment of the present invention.

The most common method of constructing a white LED employs a diode that emits blue light in a narrow spectral band, close to 460 nanometers, coupled to yellow phosphor coating that converts some of the blue light into a broad yellow spectrum centered around 580 nm. Because yellow light stimulates both the red and green receptors of the eye, the mixture of blue and yellow light gives the appearance of white to a human observer. The color of these LEDs is fixed during manufacturing, as the components are assembled on the factory floor. A typical spectrum 1500 of this type of LED is shown in FIG. 15.

Alternatively, it is possible to use an ultraviolet LED to excite a combination of red, green, and blue phosphors to produce the desired white light. The advantage of this method is a wider color gamut, but at a cost of reduced lifetime of the LED because of photo degradation in the LED package resulting from exposure to ultraviolet light. Other methods employ a blue-emitting diode on a substrate that simultaneously emits a yellow light, making the use of phosphor unnecessary.

Selecting LED Properties

The properties listed in this section should be considered when deciding on the LED suitable for a display. These properties should be quantified in-house, as the LED specification sheets are usually based on operating conditions different from that of the display.

Luminous Efficacy

The luminous efficacy of the selected LED is an important selection criterion for both maximizing display brightness and minimizing power requirements. The luminous efficacy of the LED is measured in lumens/watt (lm/W) and is a ratio of the total luminous flux to the input electrical power of the LED.

Total Lumens

The total amount of lumens emitted from the LED is important for display brightness. It is necessary to ensure that in addition to high efficiency, the selected LED is capable of generating a sufficient quantity of light at that efficiency. For example, a package that is extremely efficient but has very low total light output would require a very large number of LEDs to generate the required amount of light, which may not be possible due to cost or physical spacing requirements. The total lumens output of a package is usually determined by multiplying the LED efficiency by the maximum power dissipation of the LED.

Light Distribution

The distribution of light from an LED is affected by the packaging and/or lenses installed above the light-emitting area. The distribution of light affects the LSF from each LED. When using LEDs with a more collimated distribution, it may be necessary to either place more LEDs with closer spacing or increase the diffusion (and hence reduce the display contrast) to ensure that the individual LEDs are not visible.

Luminous Flux Binning

No two LEDs are identical as supplied by the manufacturer, due to a number of factors. These include diode inconsistencies from wafer to wafer, phosphor placement variation as well as amounts, and thermal path inconsistencies. The result is that LEDs from the assembly line have a wide range of potential luminous flux. This affects the quality of a Dolby HDR display, as the brightness is limited by the weakest LEDs, and the output levels of the strongest LEDs must be limited to match the capabilities of the weakest.

This challenge is partially addressed by most LED manufacturers, who measure the output of LEDs on the assembly line and sort them into groups of similar LEDs, known as bins (which contain groups of LEDs in a known performance range). LED manufacturers offer multiple bins, which vary in price according to the range of performance of the LEDs within each bin. For a Dolby HDR display, a bin should be selected to minimize cost while producing the desired light output.

In addition to the varying price of bins, it is important to consider the width of the bins, as they contain LEDs grouped according to performance similarity. The smaller the bins, the smaller the difference between the individual LED outputs, and the more uniform the resulting backlight. Because of supply-and-demand considerations, use of smaller bins corresponds to higher cost.

Most LED manufacturers test their LEDs for binning for very brief periods of time under conditions that may be very different from operating conditions in an actual display. It is desirable to test a sample of LEDs under their expected operating conditions, to confirm performance before finalizing selection.

Although initially the LEDs in a single, narrow bin may have very similar performance, they may still have different drift rates, so LEDs nominally the same in appearance may eventually become visually different in time.

Color Binning

It is important to consider color bins in LED selection. Non-uniformity in color across the display is likely to be more apparent to a viewer than non-uniformity in luminance. This problem is most significant when using white LEDs, as the CCT is highly dependent on phosphor consistency and placement, and there is no way to adjust the color during operation.

Color bins cost more as the quality range becomes more precise. The size of the bins should be verified under simulated operating conditions rather than during manufacturing.

Thermal Performance

Thermal performance, discussed in detail in Chapter 4, is important for LED selection. The main criterion for LED selection is a low thermal resistance.

Physical Package

The size of the LED package determines how tightly LEDs can be placed on the backlight. A LED package too large could require increased LED spacing. This ultimately can cause unwanted artifacts on the display, as discussed in more detail in LED spacing.

LED Spacing

Some LED packages do not support standard assembly techniques, either in placement or soldering. This is often due to fragile lens assemblies that are only loosely attached to the package because of optical and thermal constraints. Some lenses can be damaged during assembly or may not be able to withstand high-temperature reflow solder processes.

LED Lifetime

Figure 16:
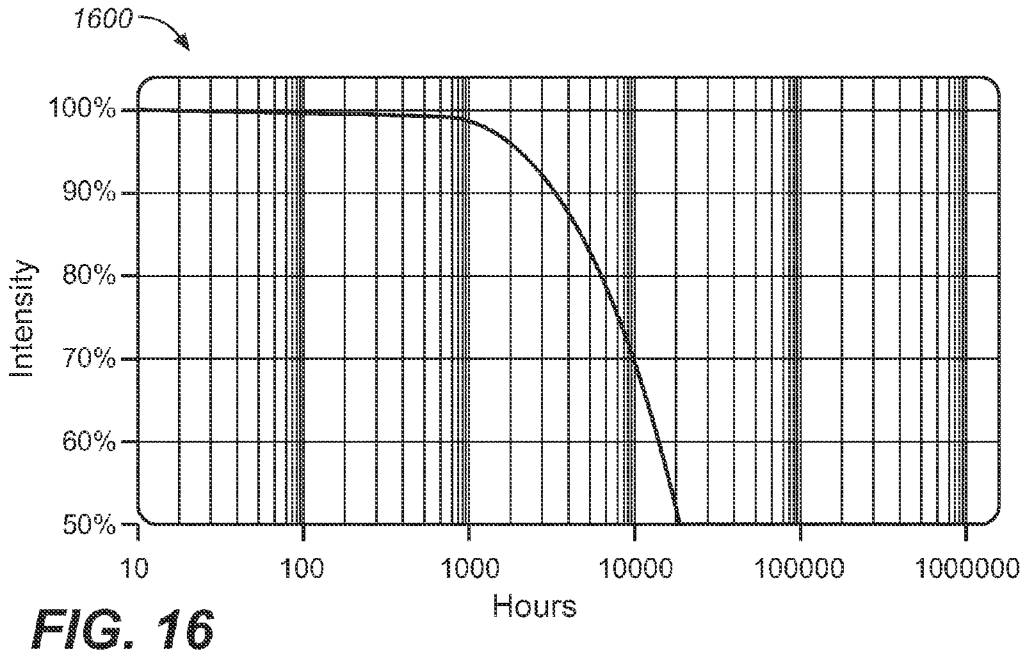
FIG. 16 is a graph of LED Luminance over Lifetime as may be utilized in designs according to an embodiment of the present invention.

The LED lifetime is an important criterion for long-term luminous and spectral output consistency for a Dolby HDR display. LED output can degrade significantly with associated wavelength shifts within the first 5,000 hours of operation in a 50 degrees (C.) ambient temperature. A typical LED lifetime 1600 is shown in FIG. 16. The known contributing components of these effects are the mechanical and crystalline structure overstress from thermal cycling, as well as the yellowing and refractive index mismatch of phosphor-based encapsulants with LED diodes from UV exposure and heat. These failures worsen the quality of a Dolby HDR display by increasing the non-uniformity in both color and luminance.

Engineers typically refer to mean time between failure (MTBF) as a guideline to consider lifetimes of conventional lamps, whether fluorescent or incandescent, which tend to fail catastrophically after a relatively short period of time. Unfortunately there is no existing industry standard to compare LEDs. So far, many LED manufacturers have been using conventional metrics to define LED lifetimes, which are inappropriate given an LED's gradual degradation behavior, or parametric failure. Lighting engineering committees such as CIE are currently working to standardize appropriate metrics for the LED industry. For LED selection in a Dolby HDR display, it is vital to understand LED lifetime behavior beyond the metrics defined for general lighting applications.

Figure 17:
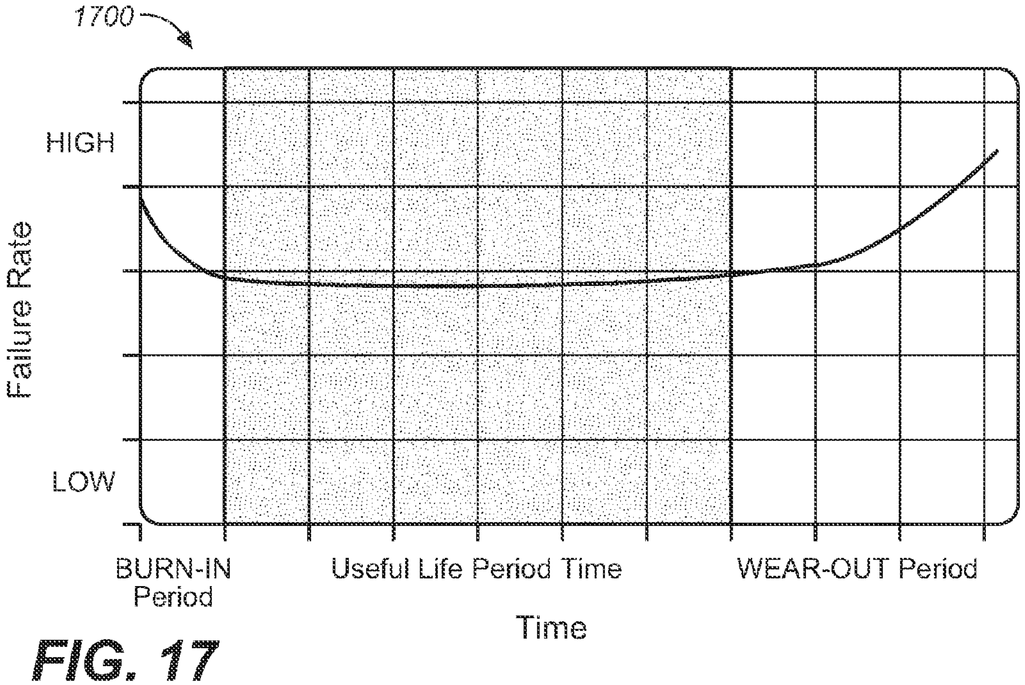
FIG. 17 is a illustration of LED Failure Rates as may be utilized according to an embodiment of the present invention.

There are two primary considerations for LED lifetime failures: catastrophic and parametric. When an LED ceases to emit light, this is described as catastrophic failure, caused typically by a short or open circuit due to complete failure of the LED package. Catastrophic failure is usually caught during the burn-in period in manufacturing quality assurance, and is rare in most LEDs under normal operation due to their solid-state nature. Parametric failure refers to the LED performance falling out of its specified range and is a much more significant concern. FIG. 17 shows the relationship 1700 between the failure rates over time. The most commonly adopted lifetime measurements for LEDs are de-rating curves for various operating temperatures, lumen maintenance percentages over time, and the Philips Lumileds B50/L70 metric. These metrics have been primarily created for the general lighting industry, but are insufficient to accurately predict LED lifetime under the operating conditions in a Dolby HDR display, as they assume that the LED is being controlled with a constant current. Controlling the LEDs in a dynamic manner results in significantly different drive conditions such that the common metrics cease to apply. There are also no current industry-standard methods to measure and predict the shift in LED wavelength over time. We recommend employing third-party testing houses or using in-house tests to verify and compare lifetime performance specifications for potential LED candidates under their desired operating conditions.

LED selection for the best and most consistent optical and mechanical integrity from the manufacturer is only a part of lifetime considerations. Thermal and electronic driving conditions have more of an impact on LED lifetime than the LED choice itself. LED lifetime specifications from manufacturers are typically quoted for constant current operation, which results in very stable diode temperatures. However, in most display applications, LEDs are driven with a digital drive signal to precisely control their brightness, resulting in much higher thermal stresses. In general, the display design should focus on minimizing long-term LED performance degradation by minimizing thermal cycling and avoiding electronic driving frequencies near the thermal time constant of the LED. Detailed design recommendations are discussed in Chapter 3.

LED Spacing

As the spacing between LEDs increases, the optical diffusion in the system must be increased to smooth the light field between LEDs, typically by increasing the spacing between the LEDs and the LCD. The diffusion of light must be significant enough such that the boundaries of the individual LEDs cannot be visually discerned.

Figure 18:
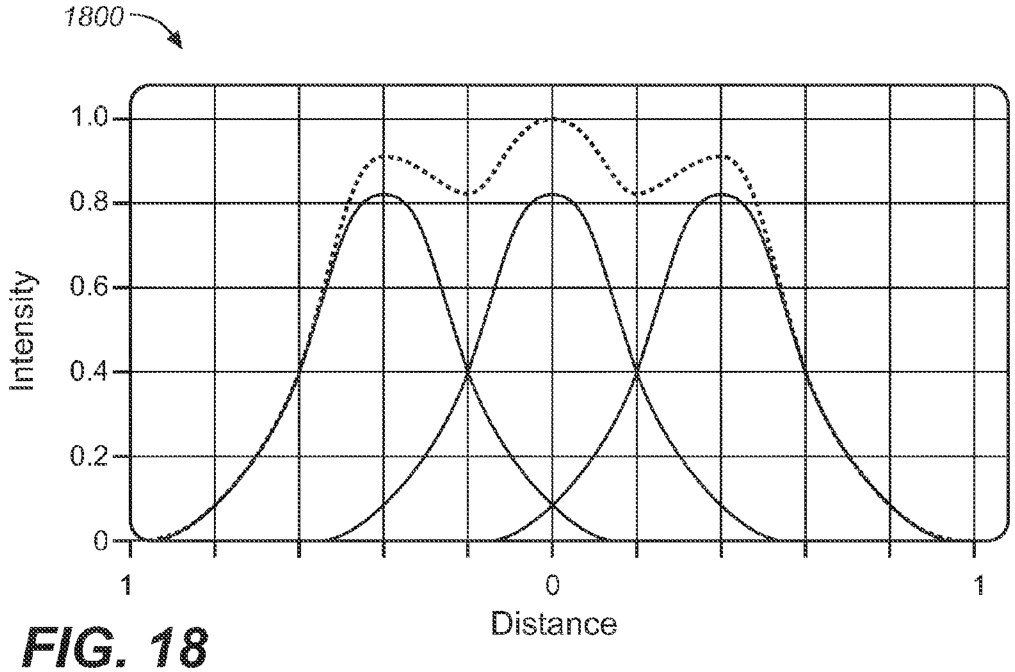
FIG. 18 is a diagram of LED Overlap as may be utilized by designs according to an embodiment of the present invention.

If LED spacing is too large, visible artifacts appear because the center of the LED is much brighter than the surrounding area. This is illustrated in FIG. 18, which shows the summation 1800 of the luminance of three adjacent LEDs. The sum of the LSFs from adjacent LEDs reveals valleys, or dark areas, between the peaks. If the difference between the peaks and valley is too large, then the individual LEDs will be visible. An artifact generated in this manner is much easier to observe at low luminance levels than at high levels. This is due to scattering properties of the eye, which mask contrast boundaries at high luminance levels. This is sometimes described as veiling luminance effects.

During design of a Dolby HDR display, the LSF of individual LEDs is optimized using the methods described in this chapter to hide this effect while maximizing the local contrast. For a Dolby HDR display, we recommend minimizing the spacing between LEDs within cost and physical constraints, while producing the required luminance.

Reflecting Optics

It is necessary for a Dolby HDR display, just as for any other display, to use a reflector on the light-emitting surface of the optical cavity. The reflector is necessary to recycle light reflected from the LCD optical films. A Dolby HDR display can employ either a flat or structured rear reflector.

Figure 19:
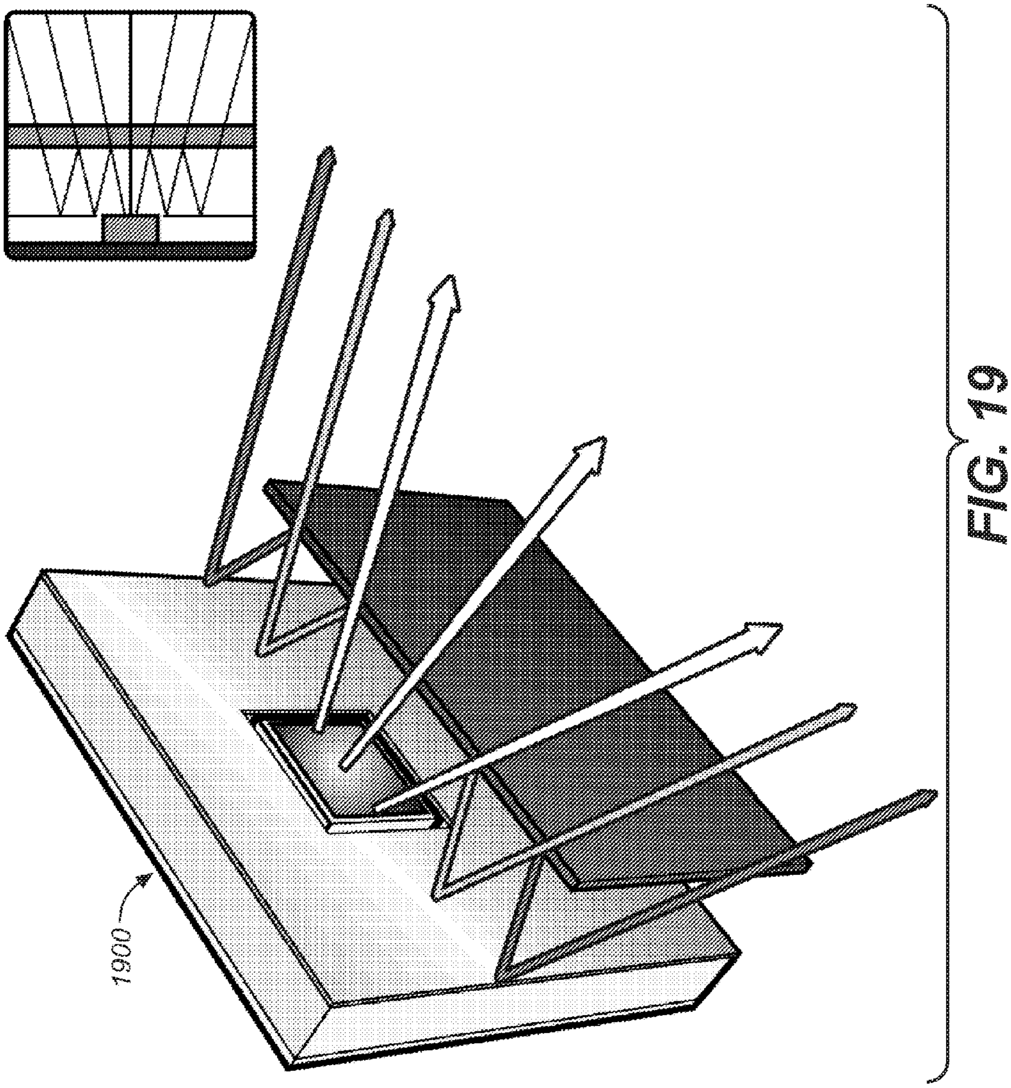
FIG. 19 is an illustration of a Rear Flat Reflector according to an embodiment of the present invention.

For a flat rear reflector 1900 in a Dolby HDR display, as shown in FIG. 19, a specular reflection is preferred over diffuse reflection, to minimize the spread of light inside the optical cavity. A specular reflector causes less light spreading (typically 10 percent) than the diffuse rear reflector, due to the non-lambertian reflection profile of the bulk diffuser.

Figure 20:
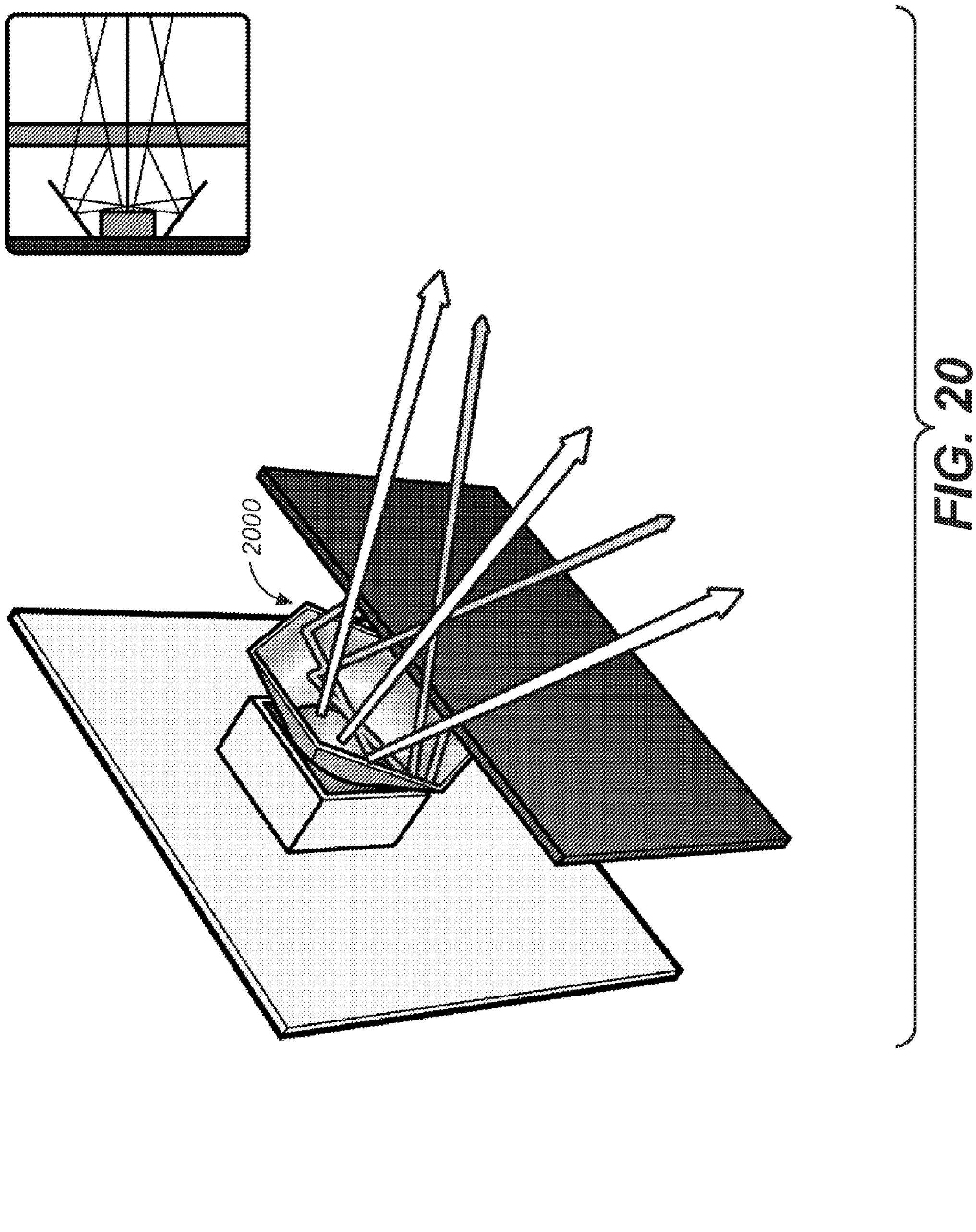
FIG. 20 is an illustration of a Structured Rear Reflector according to an embodiment of the present invention.

A Dolby HDR display can also employ a structured reflector 2000 (patent pending), as shown in FIG. 20, to optimize the light path from an LED to the LCD. Unlike a flat reflector, optimal performance for a structured reflector is achieved using a diffuse reflective surface, as this helps mask shadows and edges in the reflective structure.

Any reflector material and surface must be maximized for reflective efficiency because significant light is lost each time it is reflected in the optical cavity before passing through the LCD.

The light transmission T through the display optics can be approximated using the geometrical series listed below. The average transmission and reflectance of the optical stack are Ts and Rs, respectively, and the average reflectance of the backlight is Rb.

$$T=T_S\times(1+R_SR_B+(R_SR_B)^2+(R_SR_B)^2+(R_SR_B)^3+(R_SR_B)^4+\ldots)$$

A typical bulk diffuser is 60 percent transmissive and 20 percent reflective. Assuming that the rest of the films (thin diffuser, BEF, DBEF, and so on) are cumulatively 50 percent transmissive and 50 percent reflective, then the transmission and reflection of the entire optical stack are approximately 30 percent and 70 percent, respectively.

As shown below, the average reflectance Rb of the backlight is a combination of the area and reflectance of the reflector material, Areflector and Rreflector, as well as the area and the reflectance of the LEDs, ALED and RLED. The clearance of the rear reflector around each LED must be minimized within manufacturing tolerances to achieve the highest amount of reflective area possible. This is referred to as backlight fill factor.

$$R_b = R_{reflector}\times\frac{A_{reflector}}{A_{backlight}} + R_{LED}\times\frac{A_{LED}}{A_{backlight}}$$

Using this model, it can be seen that changing the reflectance of the rear reflector has a profound effect on the transmission of the entire backlight, and hence the efficiency. Comparison of Material Reflectance demonstrates that increasing the material reflectance from 90 percent to 98 percent increases the optical transmission from 69 percent to 77 percent, or roughly a gain of 11 percent in luminance.

The following example is based upon the values listed here:

$R_{reflector}$=98 percent $A_{reflector}/A_{backlight}$=70 percent $R_{LED}$=60 percent $A_{LED}/A_{backlight}$=30 percent $R_s$=70 percent $T_s$=30 percent Comparison of Material Reflectance

| Order | $R_{material}$=90% | $R_{material}$=98% |
|---|---|---|
| T0 | 0.300 | 0.300 |
| T1 | 0.170 | 0.183 |
| T2 | 0.096 | 0.111 |
| T3 | 0.055 | 0.068 |
| T4 | 0.031 | 0.041 |
| Sum | 0.69 | 0.77 |

In addition to high efficiency, the reflector material must not cause any discoloration in the reflected light, which would be perceived as a global change in display color temperature.

To prevent light from being lost at the edges of the display area, Dolby HDR displays employ additional reflectors to recycle any of this light back into the cavity. These edge reflectors can be angled to avoid spreading light too far into the cavity. The edge reflectors should be positioned at a distance of ½ of the LED spacing from the center of the nearest LEDs, to simulate a "virtual" LED conforming to the existing pattern.

Optical Films

Figure 21:
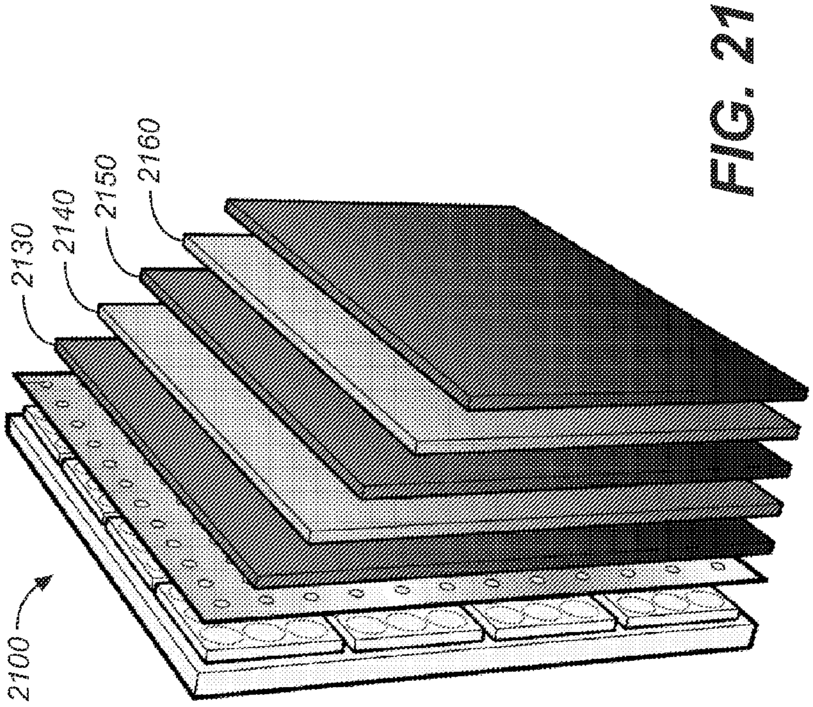
FIG. 21 is an illustration of Optical Films according to an embodiment of the present invention.

Above the LED backlight in a Dolby HDR display, there is an optical stack 2100 typically composed of the elements listed in this section and illustrated in FIG. 21. Note that all of the films (e.g., LED array 2110, reflector 2120, and LED Panel 2170 in combination with films Bulk Diffuser 2130, Thin Diffuser 2140, BEF 2150, and DBEF 2160) should be physically unconstrained to avoid any warping issues due to thermal expansion.

Bulk Diffuser

Figure 22:
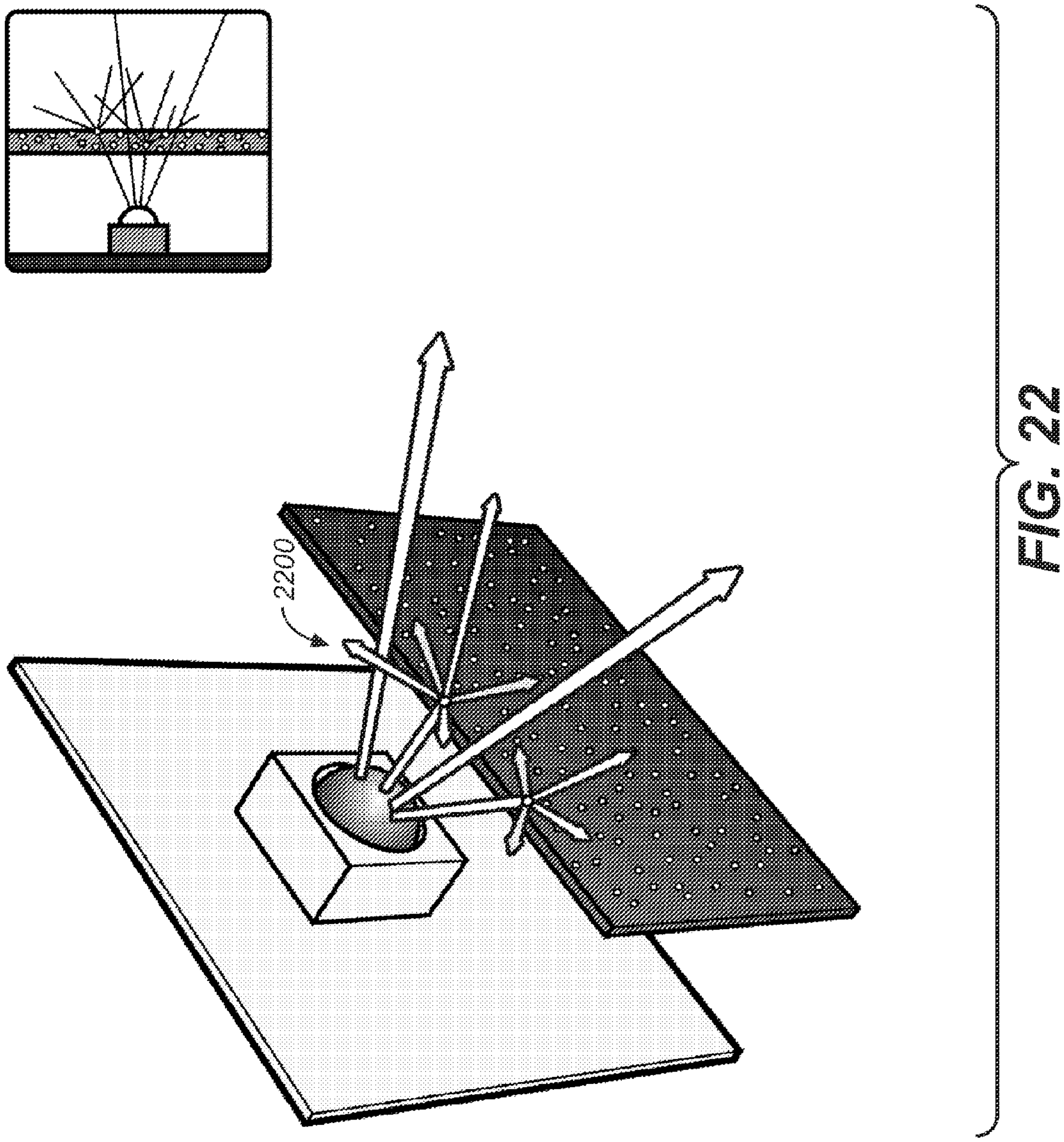
FIG. 22 is an illustration of a Bulk Diffuser according to an embodiment of the present invention.

The bulk diffuser is the component of the optical stack most responsible for the light spread. The bulk diffuser is commonly an acrylic sheet doped with titanium dioxide particles (Varying concentrations of particles are added to a material to change its diffusion properties). When light encounters a titanium dioxide particle, it is scattered in all directions, as shown by scattered light rays 2200 in FIG. 22. The rate of transmission, reflection, and absorption for a typical bulk diffuser is 60 percent, 20 percent, and 20 percent, respectively.

In a Dolby HDR display, light from the LEDs is reflected multiple times due to the recycling characteristics of the optical film stack (the optical films reflect roughly 60 percent back into the bulk diffuser) and backlight reflector. Absorption (approximately 20 percent on the first pass) is exponentially increased as the number of passes through the diffuser increases, causing significant luminance loss.

Thin Holographic Diffuser

Figure 23:
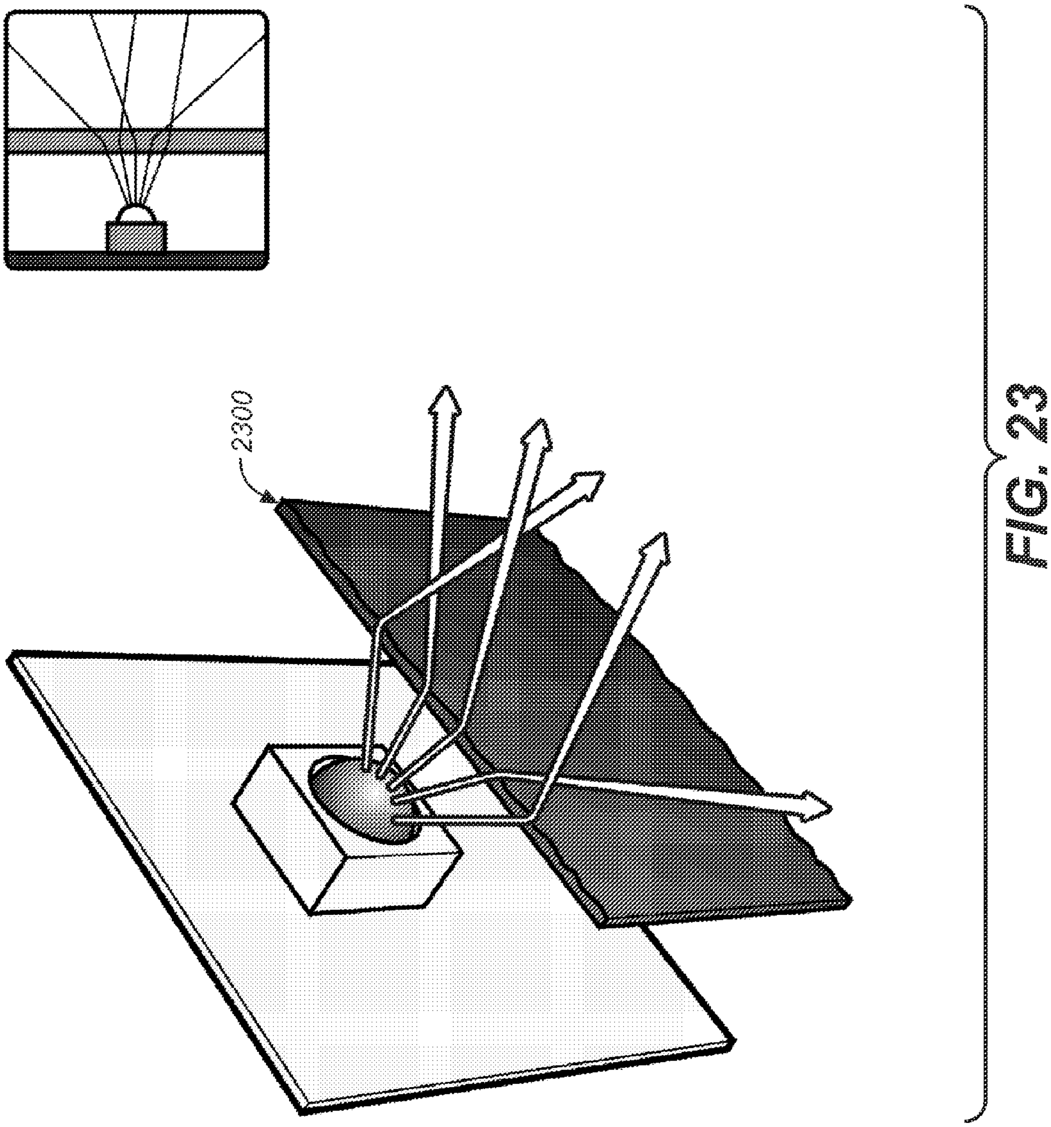
FIG. 23 is an illustration of a Holographic Diffuser according to an embodiment of the present invention.

In addition to the bulk diffuser, there may be an additional thin holographic diffuser. Unlike the bulk diffuser, this diffuser is a surface diffuser. It is commonly a clear sheet of plastic with one surface textured with a rough micro-structured surface, which acts as a surface diffuser. This results in additional light spreading, but without the absorption that occurs with the bulk diffuser. Because this is a surface scattering film, an air gap must be present between the structured surface of this film and the bulk diffuser. FIG. 23 is an illustration of a Holographic Diffuser 2300 according to an embodiment of the present invention.

Brightness Enhancement Film (BEF)

The purpose of BEF is to increase the forward brightness, seen by viewing a display from a perpendicular vantage point, at the expense of reduced brightness at wider viewing angles. BEF is a micro-structured plastic film consisting of an array of 90-degree angle prisms, shown by 2400 in FIG. 24. The size of the BEF prisms is about ten microns.

Figure 24:
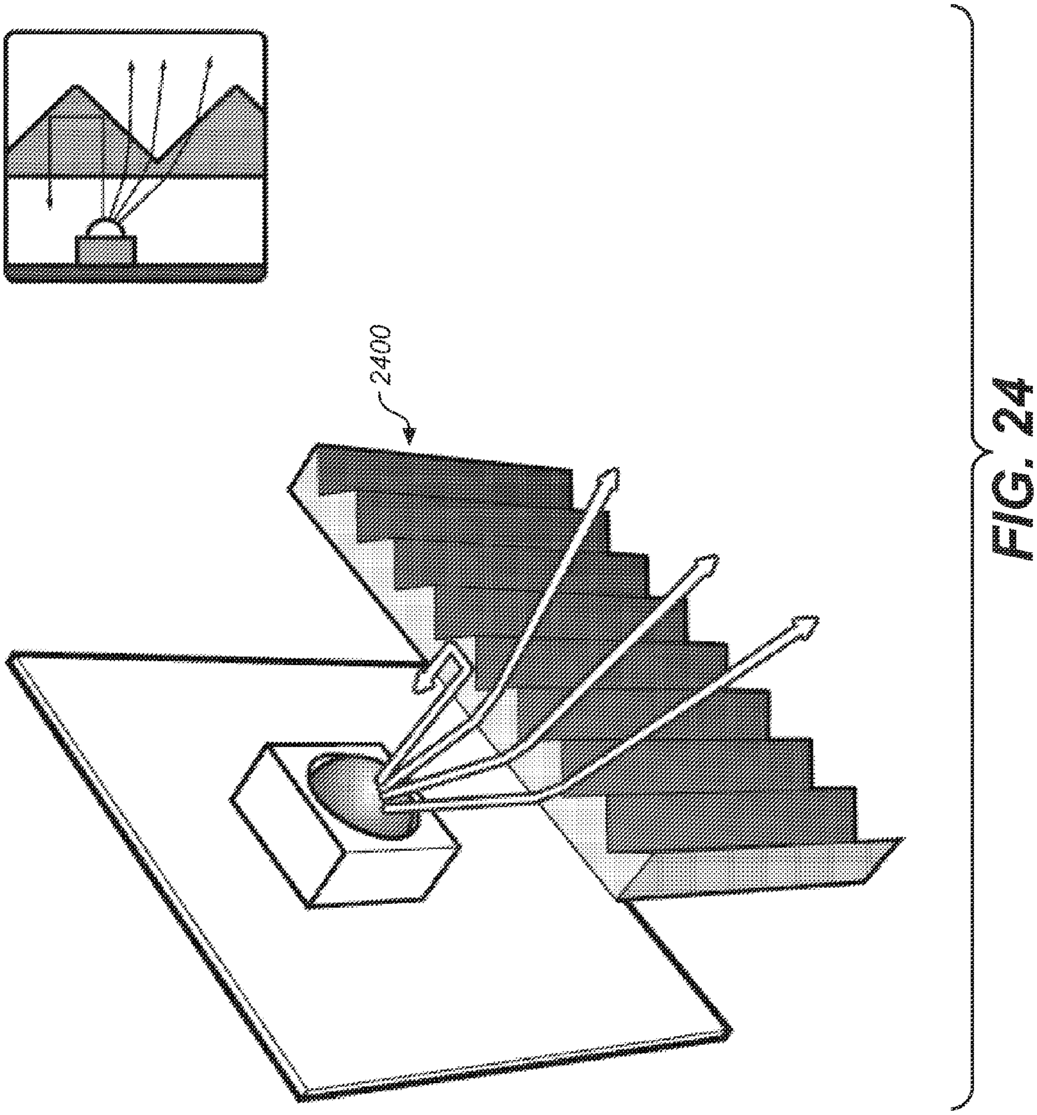
FIG. 24 is a diagram of an Brightness Enhancement Film according to an embodiment of the present invention.

Because BEF is a refractive film, an air gap between it and the next optical film is required for the BEF to function correctly. BEF refracts outgoing light at wide viewing angles to a more forward direction. As shown in FIG. 24, Ray 1 is recycled back into the backlight system by means of total internal reflection. Rays 2 and 3 are refracted to the forward viewing angle. Ray 4 remains mostly unaffected by the BEF. An increase in forward viewing angle brightness can only be accomplished if there are a fewer number of photons in Ray 1 than the sum of photons from Rays 2 and 3. This condition is true for backlight systems with a wide distribution of light. Photons in Ray 1 that are recycled by the BEF are scattered as they pass through the thick diffuser, increasing their chances of passing through the BEF on the next reflection.

A consideration of this film is the decreased viewing angle, which is typically limited to approximately a 35-degree half angle, the point at which the luminance drops to 50 percent of the maximum of the normal. In comparison, a lambertian source falls off to 50 percent luminance at a 60-degree half angle.

Typically, due to the one-dimensional nature of the BEF prisms, this viewing angle limitation is mostly in the vertical plane of view. Two films can be used with prisms at 90-degree angles with one another to increase brightness at the cost of viewing angle in both the horizontal and vertical axis, depending on the requirements of the display.

Because this film is based on the principle of refraction (and the index is wavelength dependent), some color separation does occur. Fortunately, this effect is hidden by other components in the optical stack.

Currently BEF is one of the more expensive components of the optical stack. Because of this, as well as the other issues mentioned in this section, use of a BEF setup is not recommended when additional brightness is not required.

A moiré pattern can be seen occasionally because of interference effects between the regularly spaced structures of the BEF prisms and the LCD pixels. This can be partially masked by the DBEF layer between the BEF and LCD.

Because of the nature of the BEF structure, asymmetries in the LSF will be introduced. BEF contributes to spreading of the LSF because it reflects some light back into the optical cavity. Light reflected by BEF will encounter the bulk diffuser again causing further spread in the LSF, before leaving the display.

Dual Brightness Enhancement Film

Despite the similarity in nomenclature, DBEF has different optical properties than BEF. Randomly polarized light, found in current backlight displays, can have its polarization broken down into two perpendicular polarization components. These two components are called s and p polarization.

Figure 25:
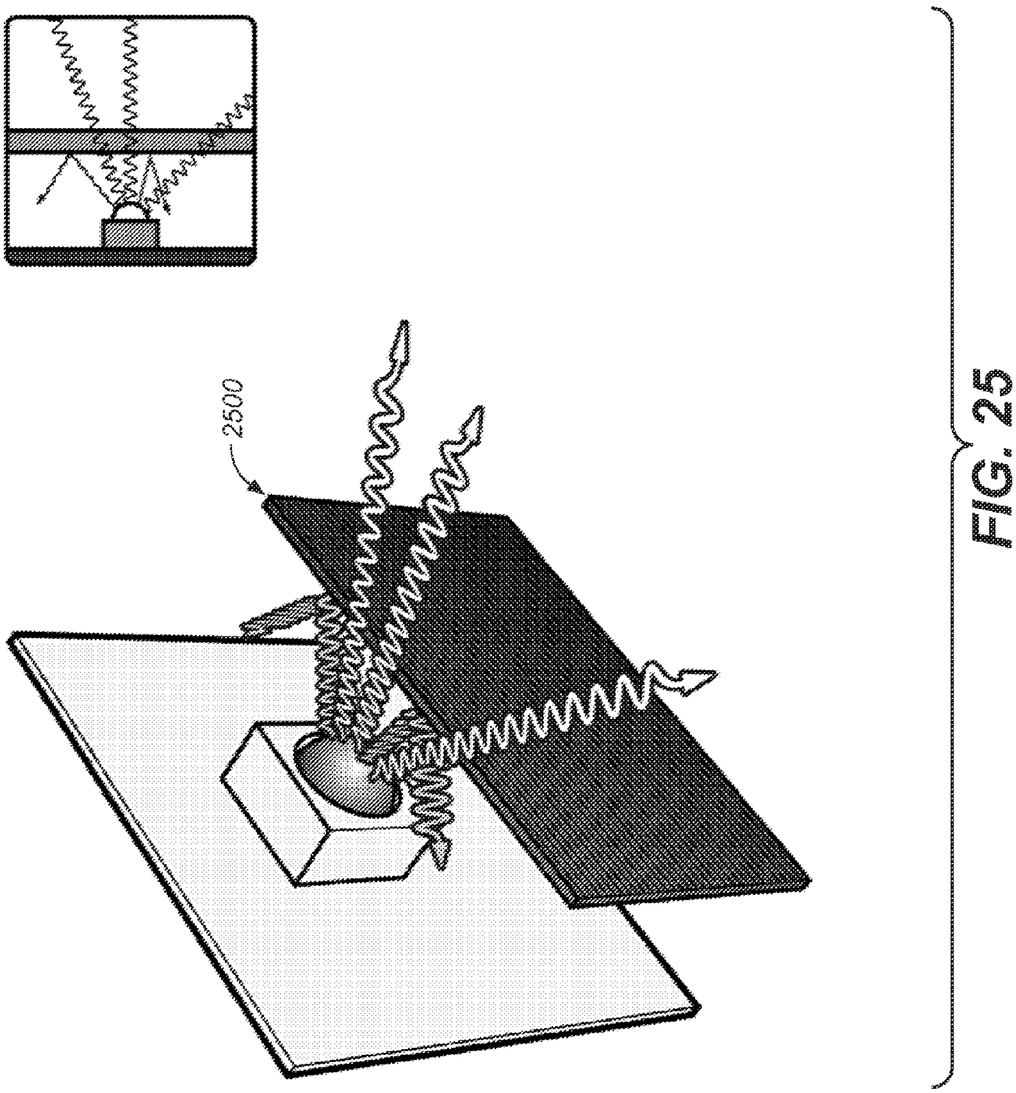
FIG. 25 is an illustration of a Dual Brightness Enhancement Film according to an embodiment of the present invention.

DBEF is multilayer polarizing film that allows p-polarized light to be transmitted while reflecting s-polarized light. This is important because LCDs allow only light of one polarization to pass through. The other polarization component is absorbed by the LCD panel. By placing DBEF 2500 in front of the LCD and matching the orientation of the p-polarization transmission axis of the DBEF to the polarization transmission axis of the LCD, the non-transmitted s-polarized light can be recycled back into the backlight instead of absorbed by the LCD, as shown in FIG. 25. The polarization of this recycled light is then randomized by the bulk diffuser and the process repeats.

The increase in brightness due to the inclusion of DBEF is typically on the order of 35 percent, assuming a transmission efficiency of 80 percent transmission of p-polarized light and 80 percent reflection of s-polarized light, with the remaining light being absorbed. The exact increase in brightness is based on the optical characteristics of the backlight unit.

Similar to BEF, light that is recycled by the DBEF will encounter the bulk diffuser at least twice before leaving the system. These encounters will scatter the light, thus contributing to the spread of the LSF.

Liquid Crystal Display

There are several types of LCDs. The three most common are twisted nematic (TN), vertical alignment nematic (VA), and in-plane switching (IPS). There are also several variants amongst these three types. Providing precise definitions of these types is beyond the scope of this document.

Figure 26:
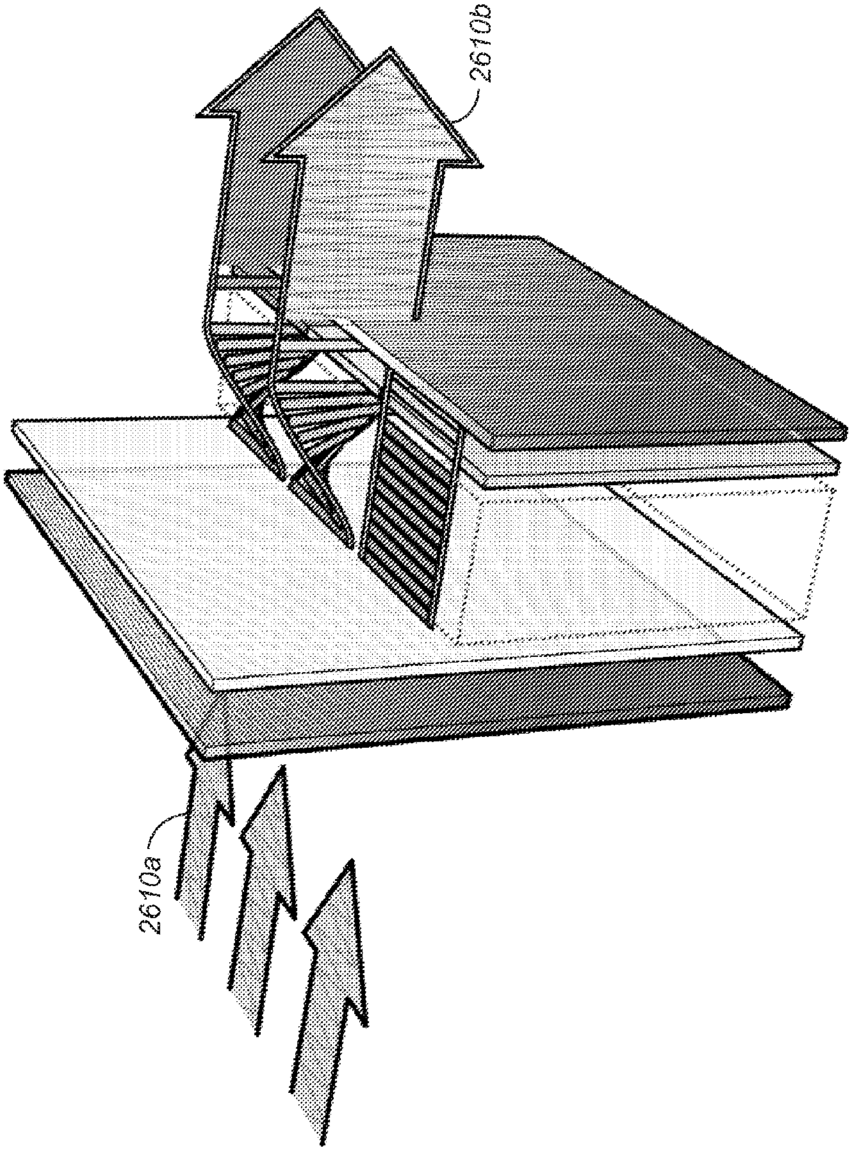
FIG. 26 is an illustration of a Liquid Crystal Display.

In all three types, a polarizer is laminated to each side of a layer of liquid crystal material (2610*a* and 2610*b*). The transmission axes of the two polarizers are misaligned to prevent light from passing directly through the display. For light to pass through the LCD, light passing through the first polarizer can be altered by the liquid crystal to align to the transmission axis of the second polarizer, as shown in FIG. 26. This is accomplished by electrically controlling the state of orientation of the liquid crystals.

Important parameters to consider when comparing LCDs are static contrast, response time, and resolution, as well as luminance and spectral transmission as a function of viewing angle. This list is not exhaustive. The selection of LCD for a Dolby HDR display requires a compromise between these parameters and cost. It is assumed that the reader is familiar with the operation and limitations of an LCD and so the details of each parameter are outside the scope of this document.

Cavity Height

The cavity height of the display is internally defined as the distance from the emission plane of the LED to the back of the first layer of the LCD optical stack.

From an optics point of view, this cavity height affects the amount of spatial diffusion from the LED, and thus affects the shape of the PSF. As the cavity height increases, then, on average, the optical path of the LED light rays increases, allowing more spread and increasing the PSF. The PSF in turn affects the contrast and full-screen uniformity of the display.

The required cavity height is dependent on the density of LEDs in the system, the target uniformity and contrast values, as well as the target thickness and cost of the display. Since some of these dependencies are in direct conflict with each other, tradeoffs must be allowed. For example, if a thin display is desired, then the required cavity height must be small, leading to a tight PSF, which will allow for high contrast but create a non-uniform display. The non-uniformity can be reduced by increasing the density of the LEDs, which would increase the cost of the system.

Note that for the same optical stack and same LED, in order to maintain uniformity, a display with lower LED density will always have a larger cavity height, and hence a larger PSF and lower contrast.

Edge Reflectors

Figure 27:
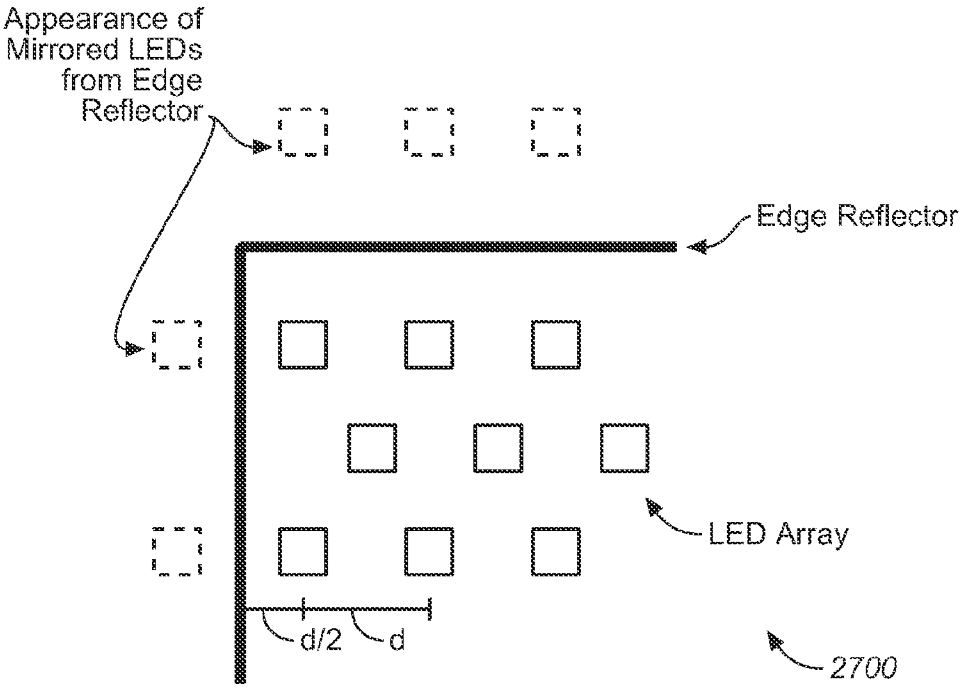
FIG. 27 is a Schematic diagram of an Edge Reflector according to an embodiment of the present invention.

Edge reflectors are reflectors at the edges of the display. Without them, light that could potentially be recycled through the display area will be lost. However, having these edge reflectors in the system will affect the shape of the PSFs of LEDs at or near the edges of the display. As a starting point, it is recommended to put the edge reflectors at exactly half of the distance from LED to LED, as shown by 2700 in FIG. 27.

The reason for this is to maintain symmetry as much as possible in terms of the mirrored LEDs in relation to the LED array itself. It is understood that this symmetry is not perfect (for example, at the corners in a hexagonal configuration of LEDs). It is also understood that this symmetry may sometimes not be feasible. For example, there could be algorithm requirements or physical limitations within the optical cavity which prevents this from occurring.

Color Space

The color space of the HDR display as a system depends primarily on the spectral characteristics of the color filters of the LCD and the spectral characteristics of the light emitting from the LEDs.

Figure 28:
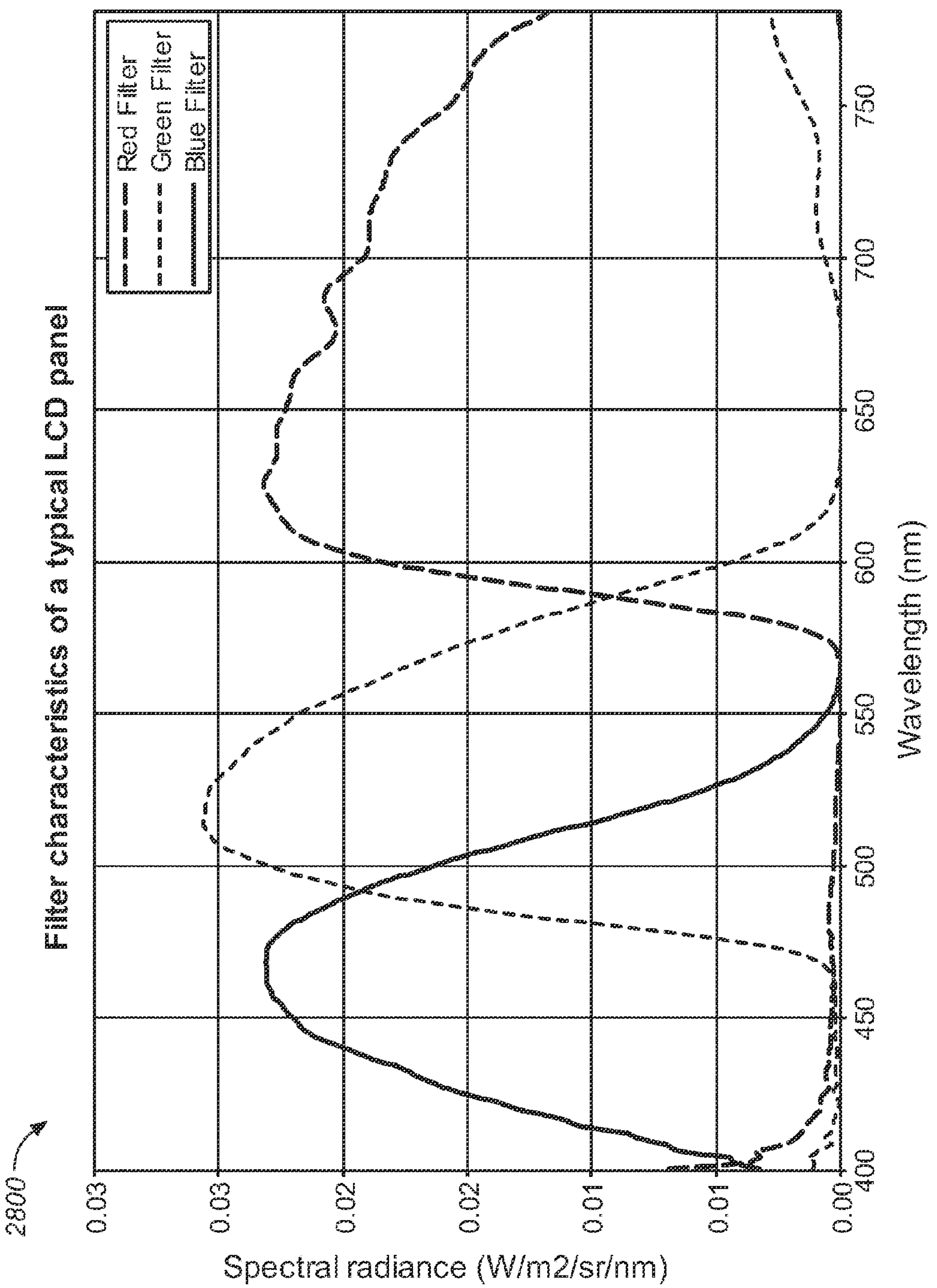
FIG. 28 is a graph of Filter Characteristics of a Typical LCD Panel as may be utilized by designs according to an embodiment of the present invention.

Filters currently found in conventional LCD panels are fairly broadband and exhibit overlap with each other. FIG. 28 comprises a graph 2800 that is representative of a set of R, G, and B color filters on an LCD panel. Note that this transmission data is through not only the filters, but also through the rest of the optical film stack of the LCD, including diffusers, BEF, and DBEF.

Figure 29:
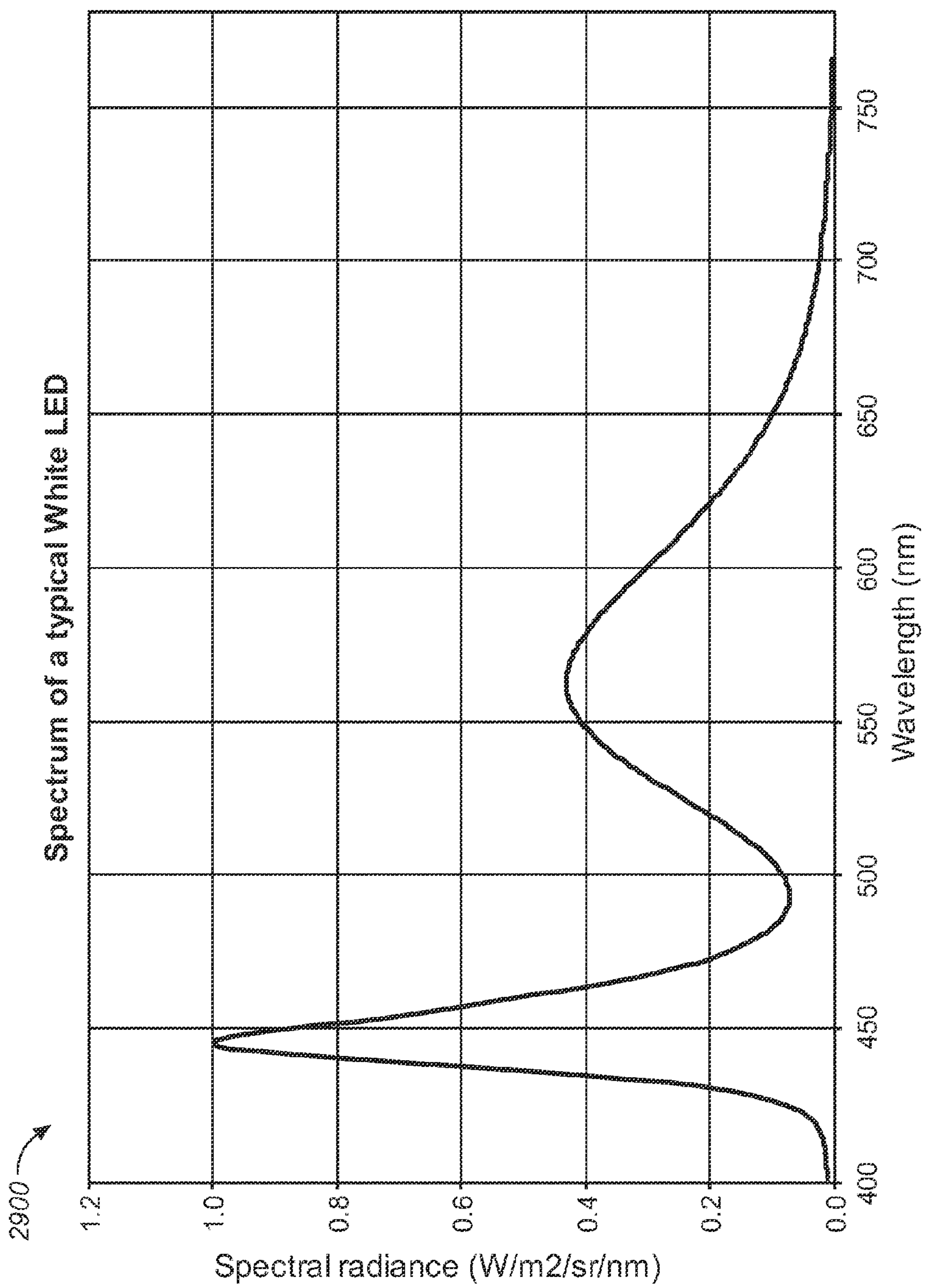
FIG. 29 is an illustration of Spectrum of a Typical White LED as may be utilized by designs according to an embodiment of the present invention.

White LEDs are essentially broadband emitters (a blue LED with a yellow phosphor) as shown by graph 2900 in FIG. 29.

Figure 30:
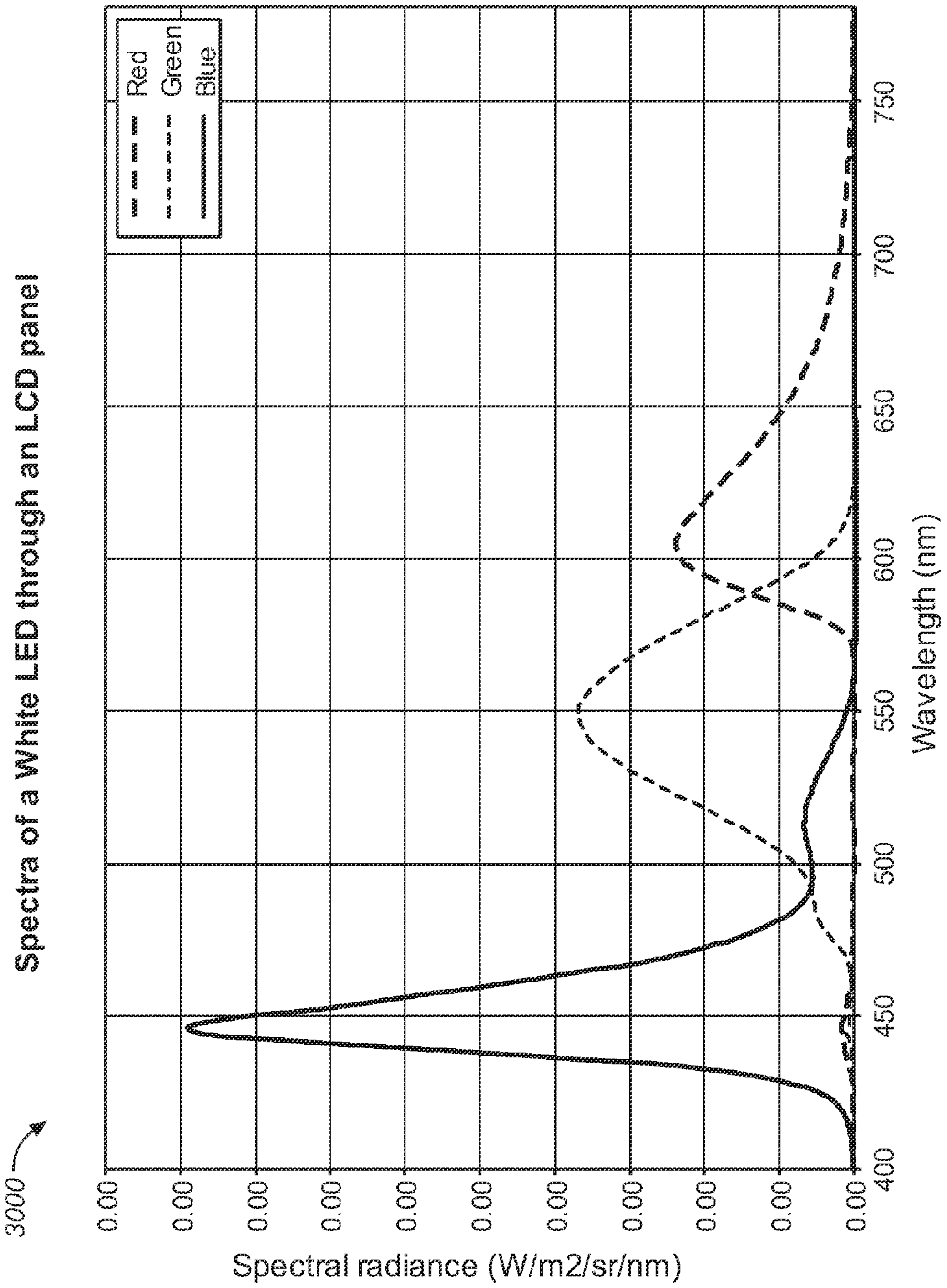
FIG. 30 is an illustration of Spectra of a White LED through an LCD panel as may be utilized by designs according to an embodiment of the present invention.

If you multiply the LED spectrum with the individual spectra of the RGB filters, then you get the spectra shown by graph 3000 of FIG. 30. Calculations based on these spectra can be done to determine the 3 points of the triangle that define the color gamut of the display. Essentially, the width of these 3 spectra will determine the color purity of the 3 RGB primaries of the display.

Figure 31:
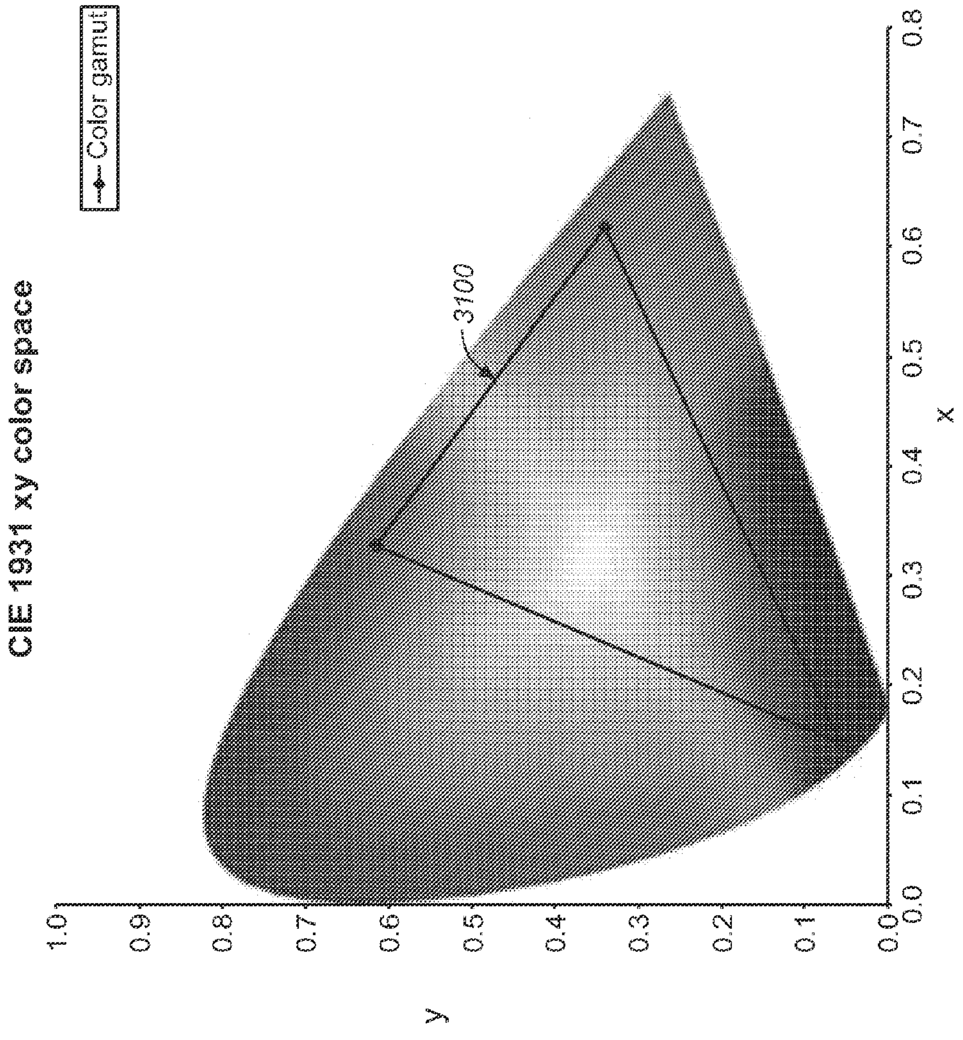
FIG. 31 is an illustration of Color Space of White LED through LCD as may be utilized by designs according to an embodiment of the present invention.

The color space of the above 3 spectra 3100 are shown in FIG. 31. The wider these 3 spectra are, the more desaturated the colors of the three primaries will appear, which in turn means these three primaries will be further away from the spectral locus. For example, since the blue spectrum is the narrowest, it appears closest to the spectral locus and, correspondingly will also be perceived as the most saturated color.

If the width of each of the combined LCD/LED spectra above becomes more narrowed, this will directly lead purer, more saturated colors, and hence, an increase in color space. This could be accomplished by in the following ways. First, the filters of the LCD could be narrowed while keeping the LED as a white, broadband source. However, this comes at the expense of overall luminance of the system. As the filters become narrower, more energy from the LED is absorbed and less is transmitted. Second, the RGB primaries of the LED could be narrowed (for example, switching from a single phosphor white LED to a multi-phosphor or RGB LED). Note that for both solutions, observer metamerism, in which observers perceive color differently due to differences in observer color matching functions, starts to become more important as color purity increases.

White Point

Figure 32:
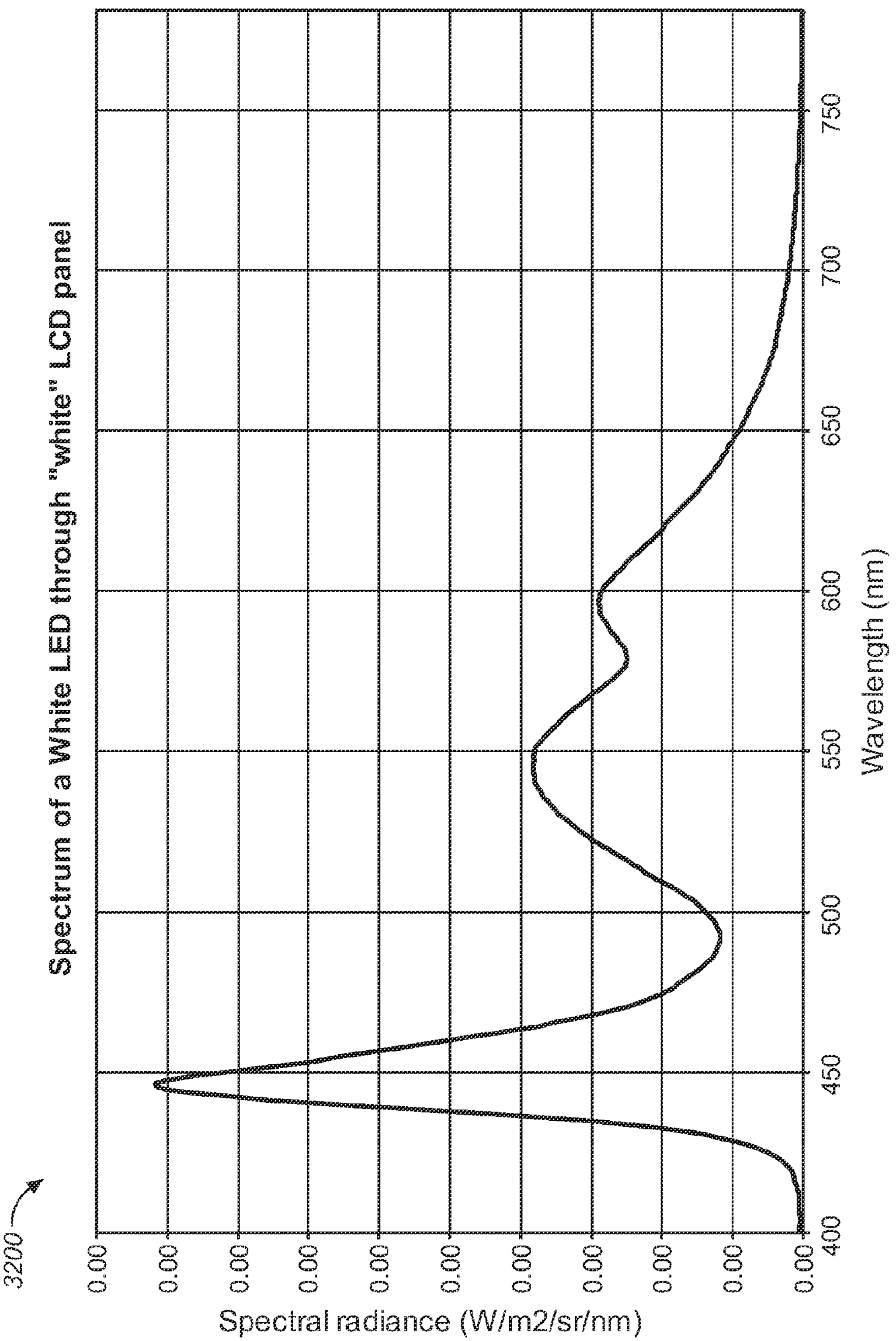
FIG. 32 is an illustration of a Spectrum of White LED through "White" LCD (RGB channels of LCD at level 255) as may be utilized by designs according to an embodiment of the present invention.

Note that the LCD/LED spectra combination also affects the "native" white point of the display, which is the white point of the display when the pixel values of the R, G, and B channels are set at maximum transmission (255, 255, 255). FIG. 32, graph 3200, shows the "native" white point spectra, which is a sum of the spectra of FIG. 30.

Theoretically, this "native" white point can be altered by changing the pixel values of the R, G, B channels. For example, if the "native" white point appears too yellow with a CCT of 5500K, you could reduce the levels of transmission of the red and green channels (e.g. from 255 to 200), with the result being a "whiter" white point with a CCT of 7000K. However, this comes at the expense of effectively reducing the bit depth of the red and green channels as well as reducing the luminance of the display. Also, using the LCD to correct the "native" white point would not take into account that the color characteristics of LCD panels change as a function of viewing angle.

Artifacts

As with all display technologies, a modulated backlight introduces some artifacts to a display. The most significant artifacts are discussed in this section as well as the proprietary techniques that Dolby HDR employs to minimize or eliminate them.

Parallax

Figure 33:
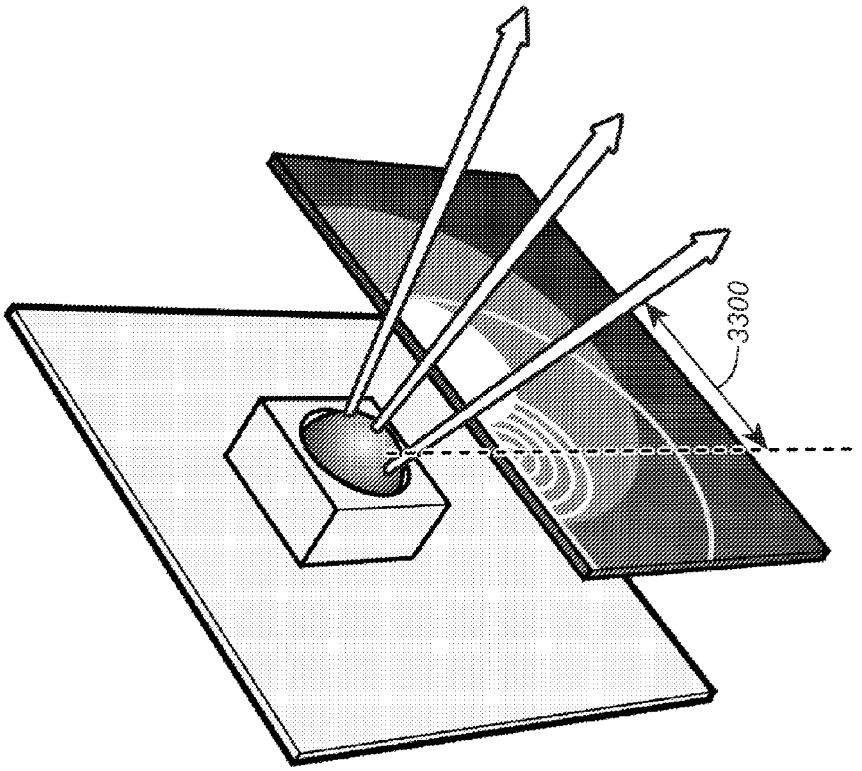
FIG. 33 is an illustration of Parallax.

Parallax occurs when a light source is perceived to exist in an incorrect location, due to off-axis viewing of an image, as illustrated in FIG. 33 (see parallax 3300).

Collimation

Figure 34:
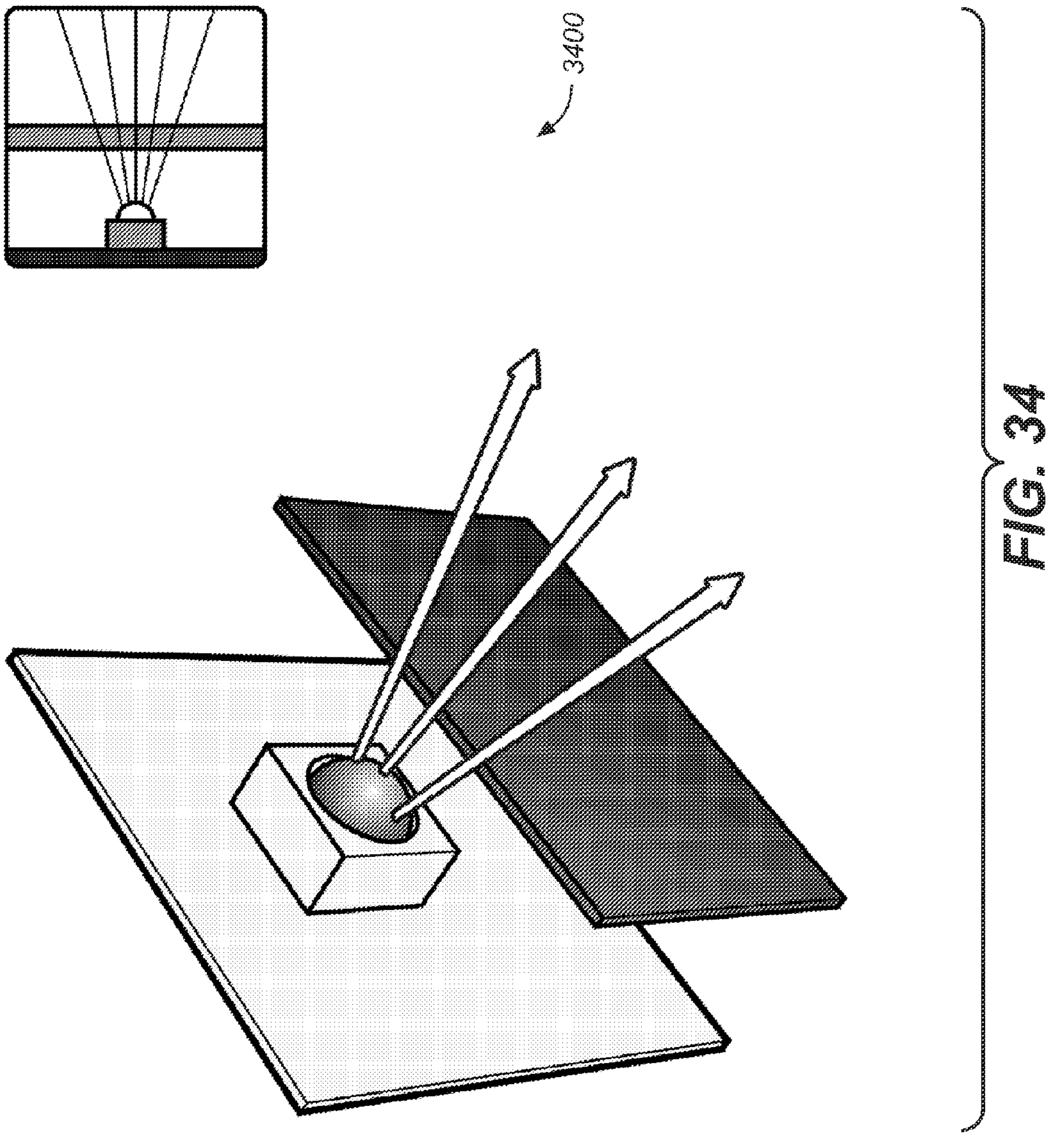
FIG. 34 is an illustration of Light Collimation Using Lens according to an embodiment of the present invention.

Dolby HDR displays employ two techniques for reducing parallax. The first method involves reducing the solid angle of the outgoing light from the light source, as shown by illustration 3400 in FIG. 34. The effectiveness of this technique depends on how much the solid angle is reduced, or by how well light from the source is collimated.

One option for collimating light is to use a lens mounted directly to the LED. This reduces parallax by reducing the solid angle of light emitted from the LED. The more collimated the LED, the greater the reduction in parallax. However, there is a practical limit to the amount of collimation. If the source is too collimated, then there is insufficient light spreading through the optical films, and the LED pattern becomes visible in the image. A highly collimated light source will also not work with a standard brightness enhancement film (BEF) present in the optical stack, as this film reflects collimated light.

Figure 35:
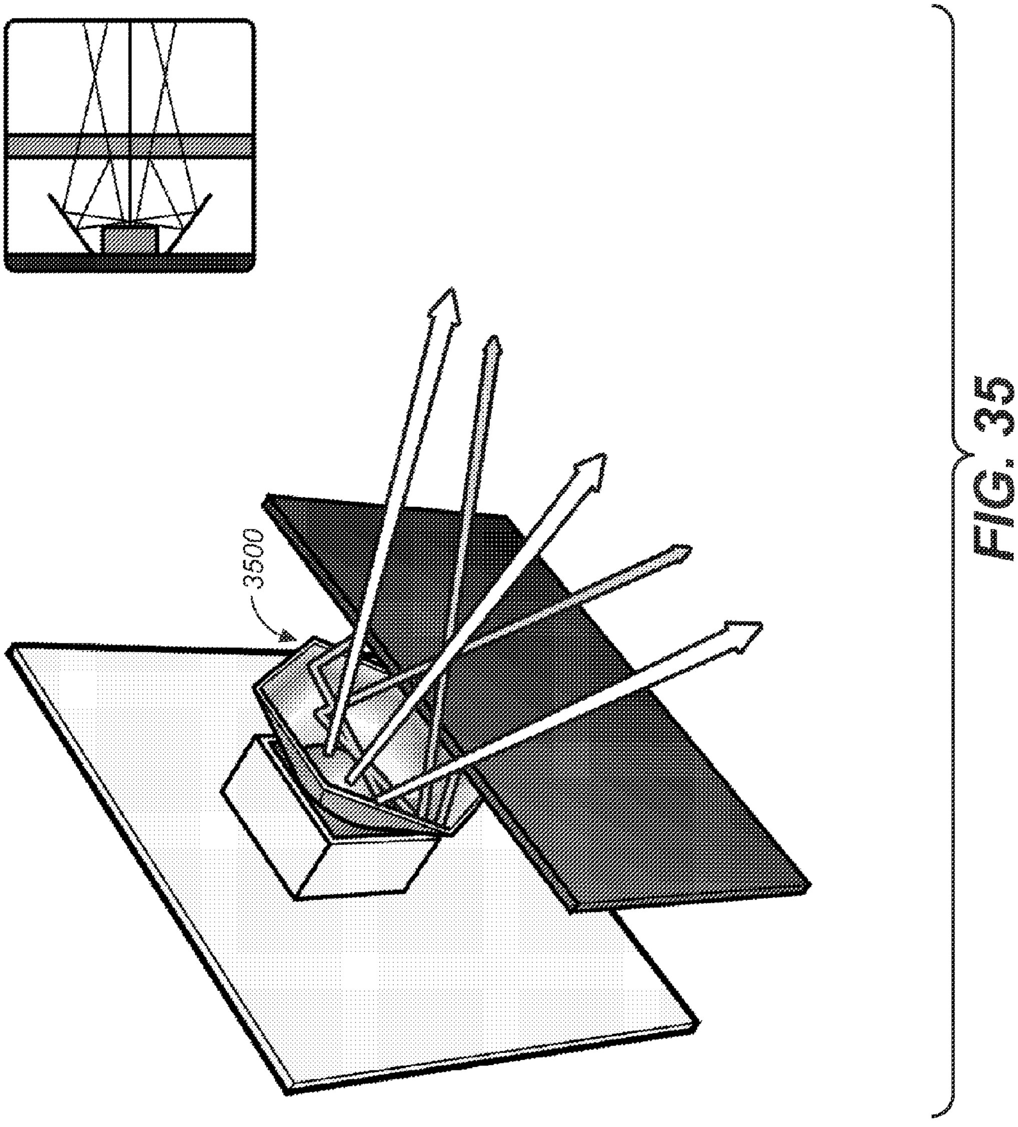
FIG. 35 is an illustration of Light Collimation Using Reflector according to an embodiment of the present invention.

A second option for collimating light employs a reflective structure surrounding each LED. The structures reduce parallax by collimating light leaving the LED, and also by containing and re-collimating reflected light from the optical films. The net effect is to contain light within a specific solid angle relative to the light source, determined by the angle of the reflector walls. This is illustrated in FIG. 35. The design of the structured rear reflector (patent pending) 3500 is optimized using optical design tools for the particular requirements of the display.

Diffusion

Parallax can also be reduced by removing the directionality of light emitted at the LCD. Light passing through optical diffusers and films in conventional backlight displays is still highly directional when it strikes the LCD. Adding additional diffusion to the optical films increases scattering, thereby reducing the directionality of the light striking the LCD and minimizing parallax. However, additional bulk diffusion, either by increased thickness of the diffuser or increased density of diffusing particles, results in a significant drop in luminance of the display from increased light absorption. It is possible to increase diffusion while not increasing absorption by texturing both surfaces of the standard thick diffuser. This can be done by sanding to introduce surface roughness. Light is then randomly refracted as it passes from the high-refractive-index material (the standard thick diffuser) to the low-refractive-index material (air). This provides additional diffusion and scattering, eliminating the directionality component of the outgoing light, without adding the diffuse particles to the light path that results in light absorption.

Figure 36:
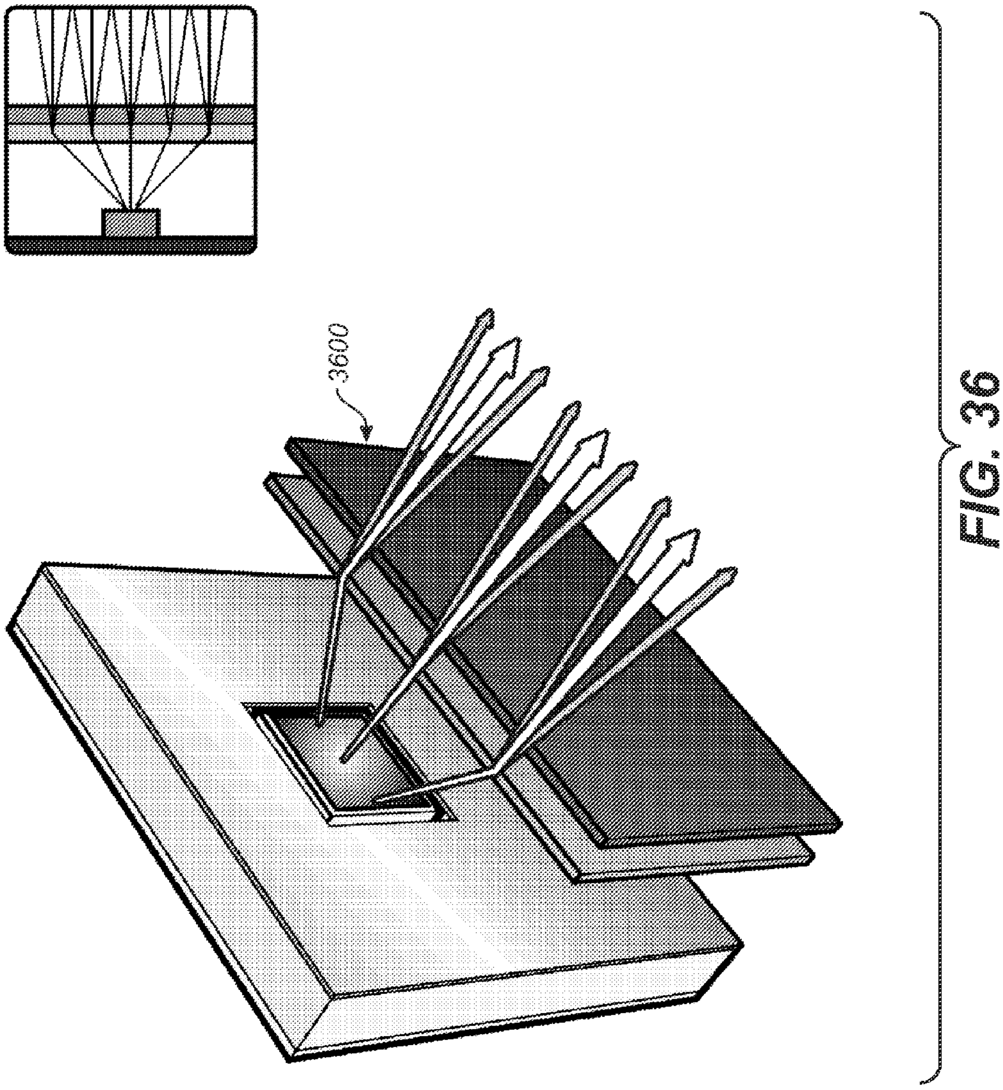
FIG. 36 is an illustration of Parallax Mitigation by Additional Diffusion according to an embodiment of the present invention.

FIG. 36 is an illustration of Parallax Mitigation by Additional Diffusion 3600 according to an embodiment of the present invention.

Combination

Figure 37:
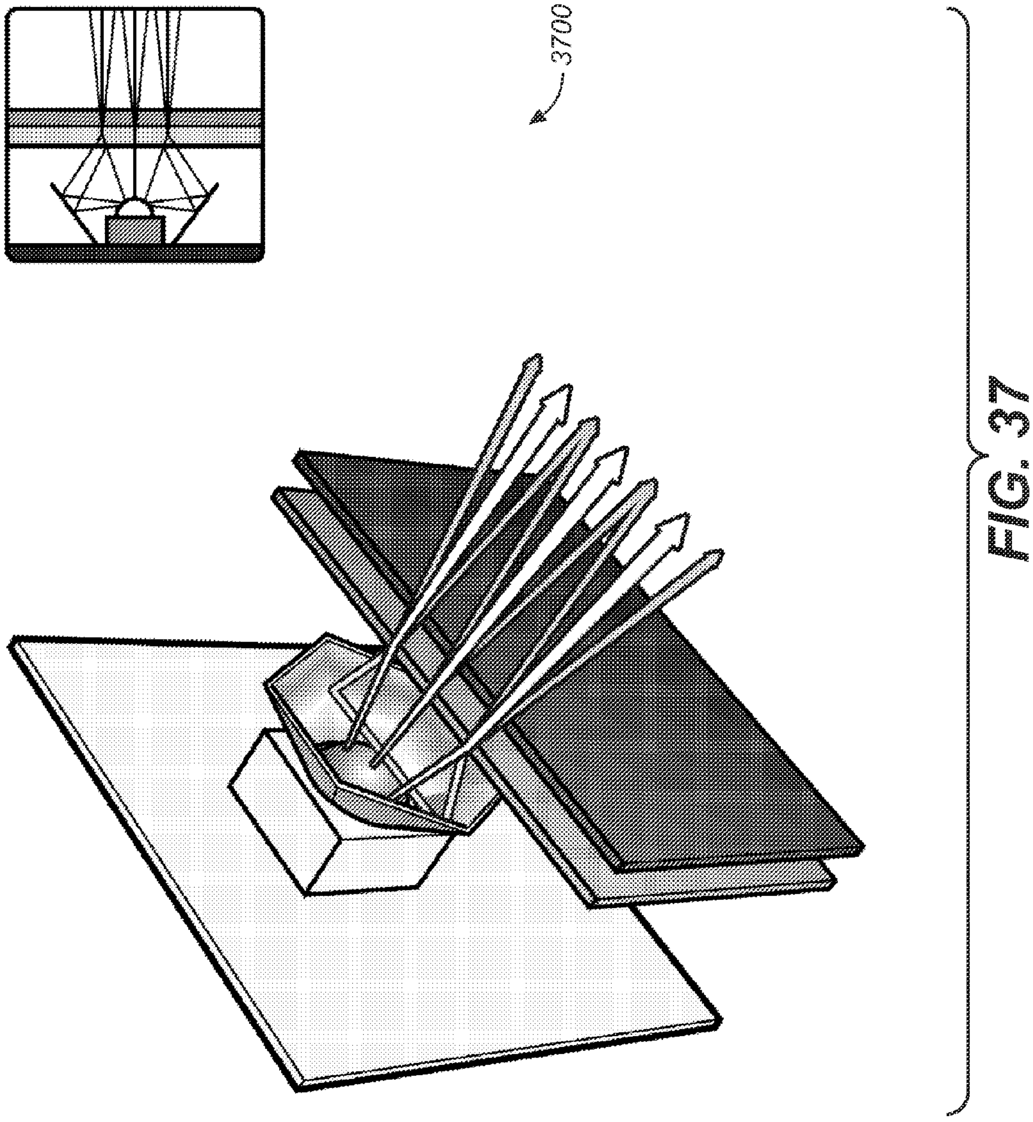
FIG. 37 is an illustration of an example Parallax Mitigation in a Dolby HDR Display according to an embodiment of the present invention.

In a Dolby HDR display, a combination of both methods 3700 is used to provide a significant reduction in parallax, as shown in FIG. 37.

Veiling Luminance and Halos

Veiling luminance occurs when light scatter takes place within the eye itself. The scattered light stimulates adjacent receptors in the eye, with the result being a perceived halo that masks local high-contrast boundaries. This is most obvious when looking at a bright source directly beside a dark, well-defined surface.

Figure 38:
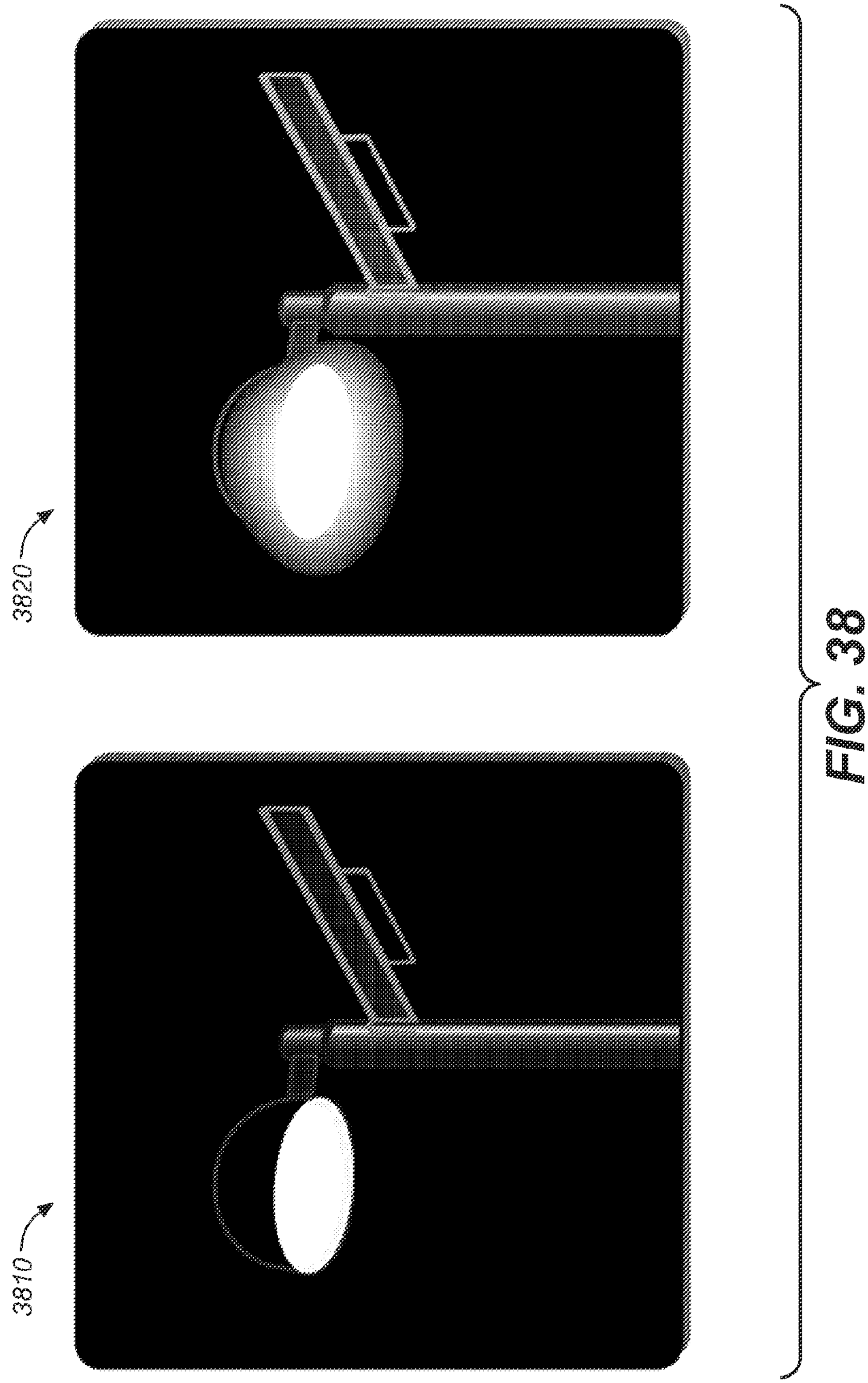
FIG. 38 is an example of an Actual (Left) and Perceived (Right) Object.

FIG. 38 shows an example: a street lamp at night 3810. The area beyond the light source is still illuminated in the image. Likewise, in the human visual system, the additional luminance from light scattering in the eye acts to diffuse the sharp contrast boundary between the light source and the dark boundary. The perception of local contrast is therefore limited.

As the capability of an LCD panel to block light is limited, some light leaks through the dark pixels of an LCD. On displays with a constant backlight, the light leaking through the dark LCD pixels is constant over the entire screen, resulting in the black level being raised to a dark gray. However, as the local contrast of a display is increased above the native contrast of the LCD panel, gradients in the brightness, or halos, appear at the boundary between bright and dark portions of the screen because the LCD is incapable of blocking sufficient light from the backlight.

A Dolby HDR display uses the concept of veiling luminance to hide display artifacts. If the light that leaks through a black LCD pixel is less than the perceptual limitations caused by veiling luminance (e.g., see veil 3820), then the contrast limitations of the display will not be observed. The design of a Dolby HDR display maximizes local contrast while ensuring that light leakage (halos) is less than the veiling luminance.

Measurements

The light spread function is best measured with a calibrated digital camera such as a photometer or colorimeter. This measurement generates a 2D image of the light spread as perceived by a human viewer.

Video Processing

The Dolby® HDR Core video processing algorithm resides on the video processor as described in section 2. The algorithm accepts up to a 120 Hz incoming video stream and decodes and converts it into a convenient working format. The algorithm then determines the backlight drive levels to generate the light field of the backlight depending on image content. The original image is adjusted to an optimal display on the LCD given the corresponding light field. We adjust the original image:

- To prevent dark areas in the LCD from appearing too dark because the backlight has generated very little light
- To darken areas on the LCD where too much light is generated from the backlight Each step of the processing is performed at the minimum resolution to operate within memory and computational requirements, without compromising the visual benefits of Dolby HDR technology.

Dolby Core Algorithm Overview

Figure 39:
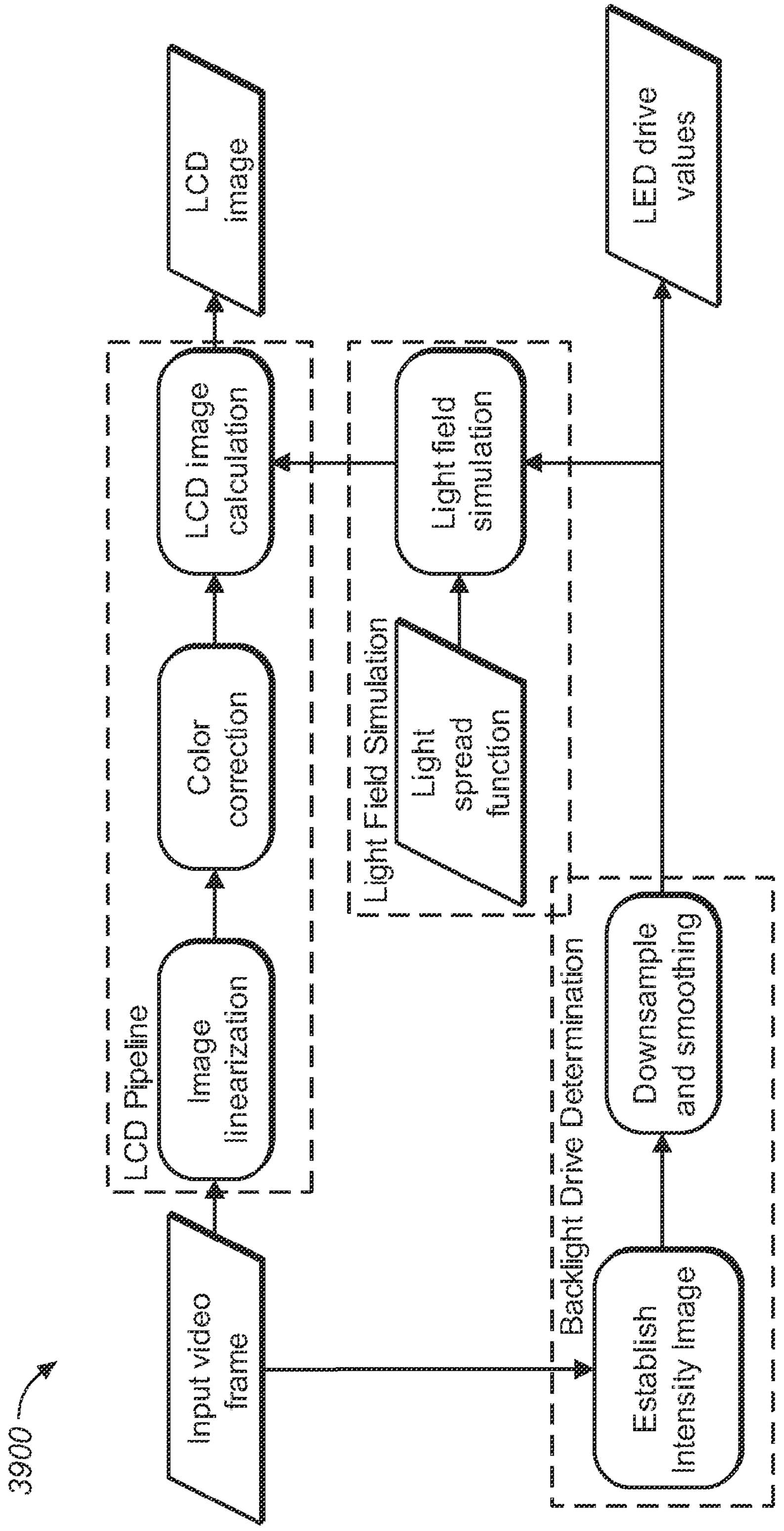
FIG. 39 is an illustration of an example of Video Processing with the Dolby HDR Core Algorithm according to an embodiment of the present invention.

The high-level functions performed by the Dolby HDR Core video processing engine 3900 are shown in FIG. 39. The Dolby HDR Core algorithm is broken down into three major components:

- Backlight drive determination
- Light field simulation
- LCD pipeline

A Dolby HDR display uses two physical modulators to produce the final image. The light output from the first (lower resolution) modulator is optically multiplied by the second modulator to create the resultant image. To generate the desired input image, it is necessary to distribute the required luminance between the first and second modulator, in a way that will re-create the desired image when the two are recombined optically. We accomplish this by downsampling and smoothing to solve for backlight drive values, then simulate luminance output to establish how to adjust the LCD to obtain the desired image.

We briefly discuss the goals and challenges of such an approach before providing a more detailed description of the Dolby Core algorithm.

The video output of a dual-modulation Dolby HDR display is configured to:

- Output an image as perceptually close to the desired image as possible
- Provide a perceptually stable backlight:
  - a. Preserve light energy of moving features
  - b. Avoid flicker caused by motion of high contrast edges
- Maintain the center of mass of the backlight coincident with a moving feature
- Ensure non-zero backlight for areas of small non-zero energy
- Achieve a balance between high simultaneous (in-scene) contrast and minimal motion artifacts
- Display an appropriate white point
- Consume minimal computational and memory resources The algorithms:

- Reduce or eliminate unintended halos of light
- Compensate or eliminate Backlight motion artifacts
- Provide white point corrections A further description follows.

Unintended Halos

Unintended halos primarily stem from the inability of an LCD to completely block light. Since the backlight is at a lower resolution than the LCD, light from the backlight may leak through the "off" state of the LCD in areas where we desire no light. For example, the illumination of a small bright feature surrounded by a darker area will cause a potentially visible dim halo around the feature. The contrast just beyond the edge of the feature is limited to the contrast ratio of the panel.

Both the optical construction of the HDR display and the Dolby HDR Core algorithm work to hide this effect by attempting to reduce the luminance of the halo to less than the veiling luminance in the human eye (lower than the threshold humans can detect), as described above. However, it is difficult to completely hide the halo for bright objects when attempting to increase the in-scene contrast ratio beyond what is capable by the LCD panel alone.

The halo itself is not necessarily too distracting for still images, as human perception is adjusted to such static halo effects. However, if the halo is not symmetric, the effect may become more noticeable.

Motion Artifacts

Figure 40:
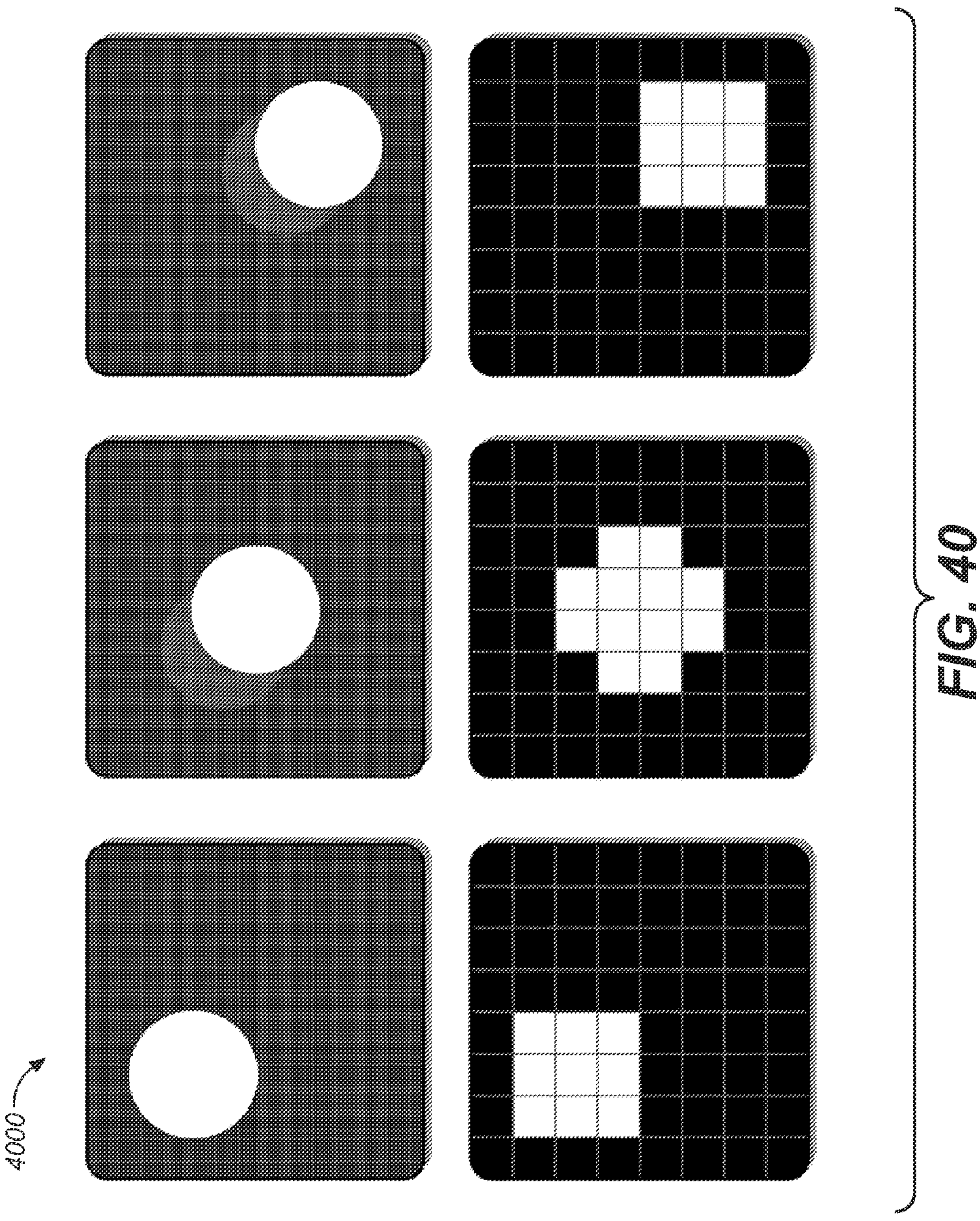
FIG. 40 is an illustration of an example of Backlight Motion Aliasing.

Halo artifacts are exacerbated as an object moves as the halo changes shape and does not follow the exact motion of the object. This challenge is caused not only by light leakage through the LCD, but also by the resolution difference between the backlight and the LCD. The halo can be perceived to stick on the background as the object moves, dragging behind, then suddenly jumping ahead of the object before starting to drag behind again. The change in shape of the backlight can become apparent during motion as well, as illustrated in the series 4000 of FIG. 40 which comprises an illustration of an example of Backlight Motion Aliasing.

This image artifact can be especially noticeable if the power of the backlight is not preserved for the moving feature, as it will tend to pulse and dim as well. The root cause of this "walking" effect can be traced to spatial aliasing in the backlight signal.

To minimize this effect, the Dolby Core algorithm strives to compute the backlight drive levels in a manner that is stable with respect to small changes in the feature position, orientation, and intensity, in a single frame as well as over time. To minimize the noticeable effects of the difference in resolution between the backlight and the LCD, the LED cluster drive values should not vary spatially by large amounts as the input image features move.

White Point Corrections

Color filters on LCDs manufactured today have been optimized for the color of conventional backlights for LCD televisions. When white LEDs are used as the backlight, the difference in color from the conventional approach causes an effective white point color shift, often towards yellow.

If the effective white point of the display is no longer acceptable, a global color compensation option is available in the algorithm. This correction adjusts LCD values appropriately to shift the global white point to the desired color.

Dolby Core Algorithm Details

Figure 41:
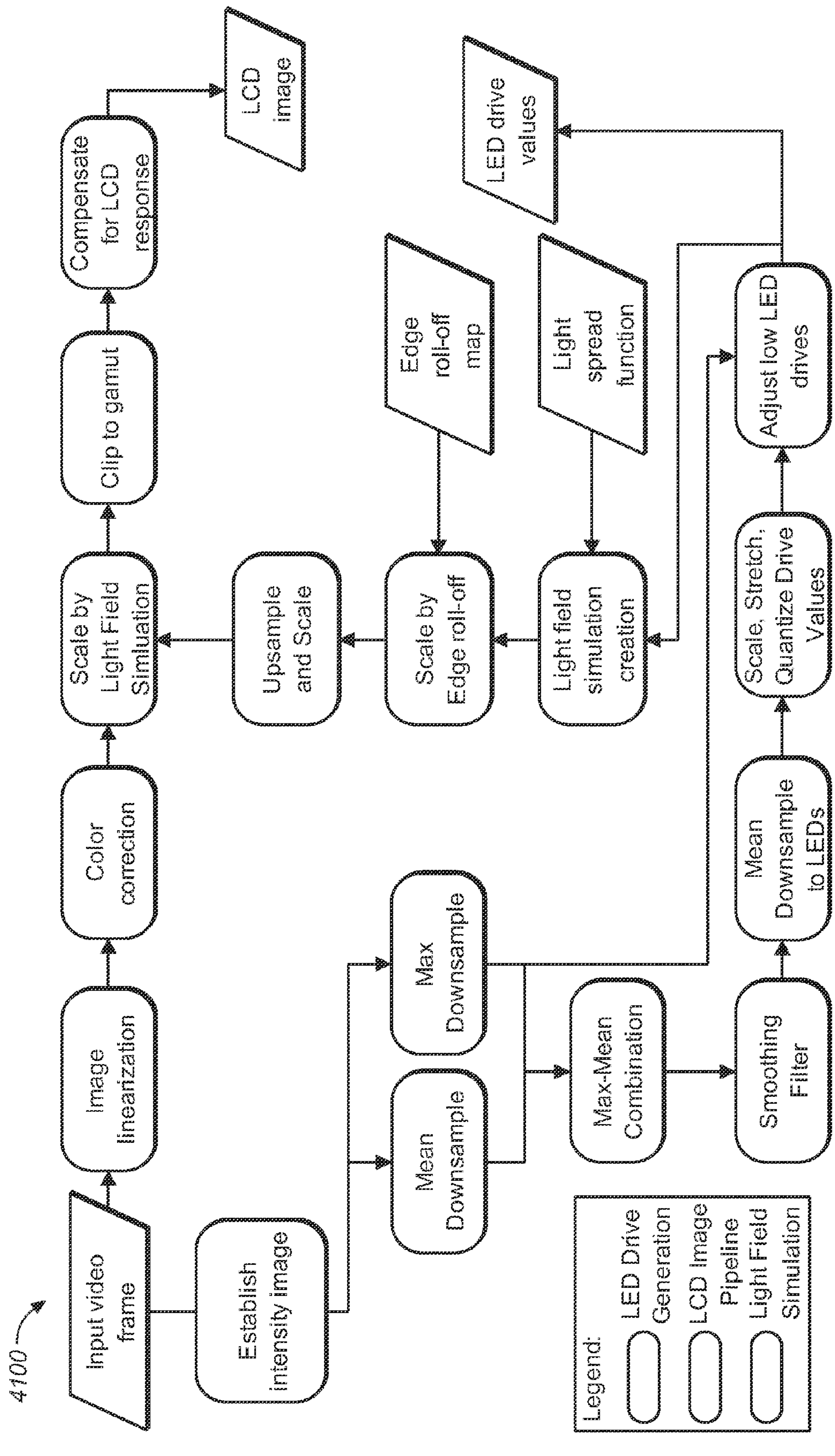
FIG. 41 is a Detailed Process Flow for an example of a Dolby Core Algorithm according to an embodiment of the present invention.

FIG. 41 shows a more complete process diagram 4100 of the Dolby Core algorithm, color-coded by the three major elements: LED drive generation, Light field simulation, and LCD image pipeline.

The following sections elaborate on each portion of the algorithm, briefly describing the implementation. The configuration parameters required for the algorithm are described in the next section, and further details are available in the Dolby Core Algorithm source code package.

LED Drive Generation

Figure 42:
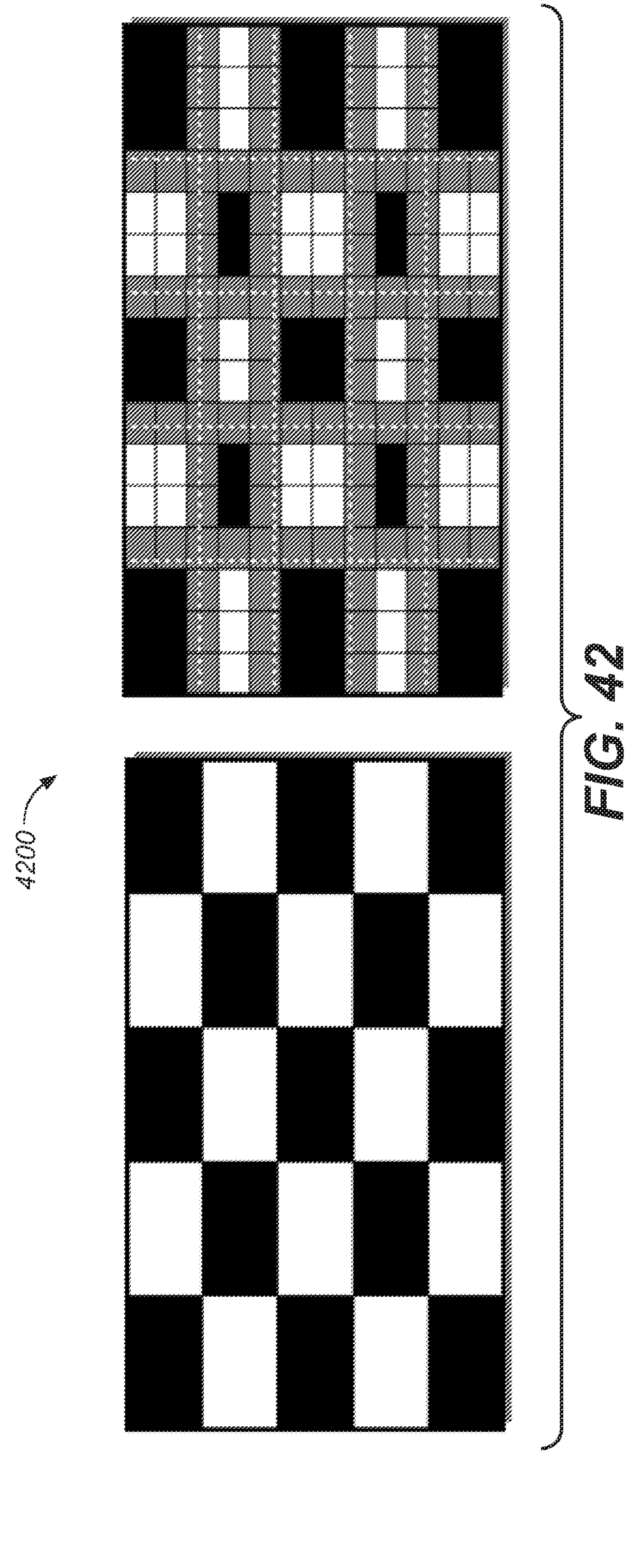
FIG. 42 is an illustration showing an example resulting backlight drive level from a standard ANSI checkerboard pattern as may be utilized by designs according to the present invention.

The LED drive generation portion of the algorithm focuses on maximizing simultaneous contrast and minimizing artifacts. It begins with establishing an intensity image to use as input to the downsample and filter portion of the algorithm, and contains a maximum value bypass to ensure that the backlight is not turned off when input data is non-zero. FIG. 42 shows an example resulting backlight drive level 4200 from a standard ANSI checkerboard pattern.

Establish Intensity Image

The input video stream for a Dolby HDR display contains three color channels: red, green, and blue. However, for a typical backlight using white LEDs, color information is not required for backlight drive generation. Memory and processing requirements can be minimized by using only the intensity information from the original image. Reducing the input video stream from three channels to a single channel decreases the processing and memory requirements of the hardware by roughly two-thirds.

The Dolby Core video processing engine converts the color input image to an intensity image by using the maximum of the red, green, and blue input values L per pixel:

$$L_{intensity}=\max(L_{red}, L_{green}, L_{blue})$$

This is not a conversion to luminance, luma, or brightness, but a straight maximum of the original RGB channels. In a dual modulation system, the goal of backlight generation is to ensure that there is enough light for each of the individual RGB channels. By using the maximum of each channel to solve for backlight drive values rather than a linear combination of channels, the algorithm can better attain this goal.

By working in the encoded space rather than a linear space, we economize the bit depth required to represent the data during processing.

This maximum channel image is the input to the rest of the LED drive generation portion of the algorithm.

Max and Mean Downsample

To reduce computational requirements, the intensity image is first down-sampled to two lower working resolution images $L_{max}$ and $L_{mean}$ by taking the maximum and mean of lower resolution regions respectively. A pixel i in the lower resolution image is therefore the max or mean of the corresponding ith region in the intensity image $$L_{max}(i)=\max(L_{intensity}[\text{region}_i])$$

$$L_{mean}(i)=\text{mean}(L_{intensity}[\text{region}_i])$$

The region taken from the original image is determined by the ratio between the resolutions of the input image and working resolution. The regions must not overlap to ensure that the total light generated by the backlight remains constant as a feature moves. The Dolby Core algorithm uses a minimum working resolution of approximately twice the backlight cluster resolution.

Max-Mean Combination

If the upcoming filtering step only considered the maximum low resolution image, temporal instabilities would be likely. If it only considered the mean low resolution image, small bright features surrounded by darker regions would be lost.

The Dolby Core algorithm therefore uses a linear combination of both max and mean images to form a combination image, Lcombo, as input into the filtering step:

$$L_{combo}=aL_{max}+bL_{mean}$$

where a and b are weight coefficients. In the current Dolby Core algorithm solution, a is set to 0.25 and b is set to 0.75.

Smoothing Filter

Spatial aliasing is addressed by applying a lowpass spatial filter to the combination image. This smoothes the backlight gradients, spreading the halo symmetrically about the object. The size of the filter can be adjusted to optimize the balance between backlight contrast and backlight aliasing for a particular implementation. For example, an approximate 2D Gaussian distribution as filter kernel is used:

$$L_{filtered} = \frac{1}{16}\begin{bmatrix} 1 & 2 & 1 \\ 2 & 4 & 2 \\ 1 & 2 & 1 \end{bmatrix} \otimes L_{combo}$$

Mean Downsample to LEDs

The filtered backlight image $L_{filtered}$ is further downsampled to the resolution of the backlight clusters to establish the drive values. A mean bilinear downsample is applied to smooth the backlight image. The filtered image is at twice the resolution of the cluster image, so a 2×2 region is used for this process:

$$L_{LEDs}(i) = \text{mean}(L_{filtered}[\text{region}_i])$$

In implementation, input values, though in encoded space, range from zero to one, which are converted to LED drive values ranging from zero to one. The following two steps can alter these drive values before they are output.

Scale, Stretch and Quantize Drive Values

To increase flexibility in the algorithm for backlight LED response, an optional multiplier and/or a power function can be applied to $L_{LEDs}$. This is where the display "brightness" and "contrast" controls are implemented. To decrease the brightness, a multiplier m less than one is applied to the drive values, and to boost contrast, a power p greater than one is applied:

$$L_{drive} = mL_{LEDs}^{P}$$

Multiple scale and stretch values can be stored in a lookup table and referenced when a user requests a change in brightness or contrast.

Drive values are then quantized based on the specified number of drive bits available in the backlight.

Adjust Low Drive Values

The downsampling and filtering can cause the backlight cluster behind a very small feature to be zero once quantized despite non-zero input. To mitigate this, the maximum of each region in the downsample is retained at the backlight cluster resolution. If the output backlight cluster drive is zero, but the maximum for that cluster is non-zero, the drive value is set to the first (lowest) drive level.

Light Field Simulation

The light field simulation (LFS) predicts the light field projected onto the LCD. Armed with this simulation, the algorithm can establish the LCD values required for the desired output image. Optical properties such as the light field (PSF) of each LED and edge effects are considered for this simulation step.

Light Field Simulation Creation

The light field simulation is created using an internal model of the light spread function from each backlight element, with the LED drive levels calculated in a previous step. The light spread function applied is measured as described in section 3, and compressed to a low-resolution matrix stored in display memory. The backlight simulation is generated by scaling the intensity of the light spread function by the LED drive levels, and taking the sum of the total. This is typically done at a lower resolution than the final image to reduce computational expense.

Scale by Edge Roll-Off Map

The light field is modified to account for a physical loss of light near the edges of the display. Unlike the center of the display, the edges are not illuminated by surrounding light, resulting in less light along display periphery. The resulting loss of light is highly dependent on the specific geometry of the Dolby HDR display implementation.

More significantly, the input images are not modified on the edges to account for this loss of light but the LED PSF alone. In using the most accurate light field simulation with lower intensity on the edges, the algorithm will attempt to compensate by allowing more light through the LCD. This often results in a clipped image resulting in decreased image quality.

To mitigate this effect, the algorithm effectively boosts the modeled luminance from the edges, even though this may not physically be the case. It accomplishes this by dividing the light field simulation by an edge roll-off map, which is the true luminance distribution of the display with backlight fully on. This removes the edge luminance drop-off and prevents the algorithm from over compensating on the edges.

In implementation, the algorithm calculates the inverse of the light field simulation and therefore divides the edge roll-off map by the light field simulation:

$$invLFS = \frac{1}{LFS_{roll-off}} = \frac{L_{edgeroll-off}}{L_{LFS}}$$

In the LCD pipeline, the data needs to be divided by the light field simulation output. By performing the division at this step in low resolution, the algorithm can minimize computational and memory requirements.

Upsample and Scale

The resulting (inverse) light field is finally upsampled using a bilinear method to the full LCD resolution. The final light field simulation should contain smooth contours that closely match the observed light field of the backlight.

It is possible that with the given backlight drive values, not enough light is output for the LCD to properly compensate. In this case, the LCD attempts to allow more light through than is possible and results in clipping in the bright portions of the image. To help mitigate this, a scale factor between zero and one is applied to the inverse LFS output calculated in the previous step. This scale parameter c needs to be optimized based on the specific LCD panel and backlight unit used in the display, and typically varies from 0.65 to 1.0.

$$invLFS_{final} = \text{upsample}(c \cdot invLFS)$$

The final inverse of the light field simulation upsampled to the LCD resolution is used in the LCD processing pipeline.

LCD Pipeline

The LCD processing pipeline consists of setting LCD output values that produce the desired overall light output and white point. This is accomplished by applying a color correction, dividing the values by the light field simulation output, and correcting for gamut and LCD response.

Image Linearization

Input video streams for HDTV are encoded according to Rec. 709. This is a simple encoding method that takes advantage of the human eye's nonlinear response to light intensity. It is also traditionally convenient as older CRT monitors had a natural response with typical gamma of 2.2 so did not require decoding of the signal.

Unfortunately, the Rec. 709 standard does not specify a decoding method, and we have found that simply inverting the encoding equation does not result in a good picture in high dynamic range. The most commonly used method of regenerating the linear input video stream is raising the encoded input image to a power γ of close to 2.2. This results in a per-pixel operation on the input video stream:

$$L_{linear}=L_{encoded}^{\gamma}$$

In addition to this power of 2.2, the algorithm applies a "gamma boost", making the overall γ in the range of 2.5-2.7. This is needed because of the dynamic range differences between the input content and the Dolby HDR display which leads to an incorrect perceptual luminance distribution. By applying this gamma boost, the change in contrast provides a more realistic experience. When HDR content is available, this boost will no longer be needed.

The implementation of this linearization is performed via a look-up table to save computational requirements.

Color Correction & Scale by Inverse Light Field Simulation

The LCD image must be adjusted to regenerate the input image when illuminated by the non-uniform backlight. This step generates the corrected LCD image by dividing the input image by the simulated light field. When the light from the backlight is optically multiplied by the new, corrected LCD image, the result is the original input image.

$$L_{LCD}=\frac{L_{input}}{L_{backlight}}$$

In this context, the color correction step serves two major purposes:

To convert from input RGB space into a luminance image suitable for scaling by the light field simulation To account for the native color temperature of the HDR display (white point correction) and produce correct RGB out for the display Conceptually, color correction and scaling LCD values by the light field simulation are performed by:

1. Converting $RGB_{in}$ vectors to Yxy chromaticity space (with the option to shift towards or away white point to control "saturation" here)
2. Scaling the luminance values Y by the light field simulation value for that pixel, s.
3. Converting to display $RGB_{out}$ vectors, preserving appropriate white point and primaries of the display.

However, this order of operations would mean several matrix multiplications sandwiched around the light field simulation scaling step for each pixel vector in linear RGB space (RGBin). Thankfully, these equations can be simplified so that only one matrix multiplication is performed, since scaling Y in the Yxy space is equivalent to scaling all three dimensions in the XYZ, or RGB color space.

$$RGB_{out}=M_2[s(M_1\cdot RGB_{in})]$$

where $M_1$ is the conversion matrix from input RGB (sRGB) to XYZ color space, and $M_2$ is the matrix to convert from XYZ to the output display RGB color space. This output RGB space will vary based on the selection of the backlight color and LCD color filters. This can be further simplified if $M_3=M_2\cdot M_1$ to a single matrix multiplication to the input data:

$$RGB_{out}s\cdot M_3\cdot RGB_{in}$$

In determining the appropriate LCD image, the algorithm divides the luminance by the simulated backlight luminance. Each input pixel is therefore multiplied by the inverse light field simulation value previously calculated to obtain the output pixel RGBout:

$$RGB_{out}=\text{invLFS}_{final}\cdot M_3\cdot RGB_{in}$$

The matrix $M_3$ now only serves for color correction and saturation changes and is an optional but recommended step.

The "saturation" control of the display can be implemented by saving several $M_3$ matrices. The $M_1$ matrix can be altered to effectively shift the primaries closer or further from the white point. If the user requests increased or decreased saturation, an alternate pre-calculated matrix $M_3$ can be used in this calculation.

Clip to Gamut

The step to correct for color temperature and to scale by the light field simulation can request colors that are out of gamut for the system. The algorithm performs a clipping to gamut edges by individually clipping each RGB channel back to boundary. Since the input image was set to a scale from zero to one, the algorithm clips back to this range in this step:

$$\text{if } R_{out}>1 \text{ then } R_{out}=1$$

$$\text{if } R_{out}<0 \text{ then } R_{out}=0$$

The same is performed for the green and blue channels.

Compensate for LCD Response

Before the LCD image can be output to the panel it is necessary to ensure that the output stream from the Dolby Core algorithm video processing is the correct format. The LCD/TCon expects the input video stream to be encoded in the same manner as the incoming video stream in the image linearization step. For an ideal panel, the algorithm would encode the LCD image using a per-pixel operation according to:

$$L_{gamma}=L_{linear}^{1/\gamma}$$

Unfortunately, the LCD response is not very accurately modeled by the pure power function shown above. The algorithm therefore has the option to use a per-channel look-up table (LUT) for encoding the video stream. This LUT is populated by measuring the LCD panel response at some number of equally spaced drive values between full black and full white. This LUT is stored in display memory and the needed output values are interpolated between these measurements. If a simple power function is desired, the appropriate data can also be input into the LUT.

Configuration Parameters

The Dolby Core algorithm requires several parameters that describe the hardware platform plus several parameters that are tuned according to hardware specifications. These values are described in more detail in the code package documentation. Some important configuration parameters are listed below.

| Parameter | Description |
|---|---|
| LCD pixel resolution | Horizontal and vertical pixel resolution of the LCD. Typically, LCD resolution is 1980 × 1080. |
| Content gamma (γ) | The gamma parameter with which the content was encoded Typically this is 2.2. |
| Gamma boost | The parameter used to add contrast to LDR images input to the HDR display. Typical range is 1.1 to 1.3, and default value is 1.25. |
| LED resolution | Horizontal and vertical resolution of the controllable elements (LEDs) forming the backlight |
| Light spread function | The shape of light spread from a single LED, as described in section 3. |
| Edge rolloff map | A map applied to the light field simulation which emulates the natural decrease in luminance of a display near the edges. |

-continued

| Parameter | Description |
|---|---|
| LCD response | The nonlinear response of the LCD panel, input either as a power, or as a text file with the measured response. |
| LED drive scale factors | A series of factors used to control the "brightness" of the display. This factor ranges from 0.1 to 1.0. |
| LED drive stretch factors | A series of factors used to control the "contrast" of the display in the form of a power function. Typical range is 0.5 to 2.0. |
| Color matrices | A series of matrices formed by multiplying the display specific matrix to transform from XYZ to display RGB color space with a series of matrices to convert from input RGB to XYZ. The matrices have different scales in the input gamut to vary "saturation" of the display. |
| LFS scale factor | The scale parameter specific to the display that mitigates clipping on the LCD. Typical range is 0.6 to 1.0. |

Although the present invention has been described herein with reference to specific requirements, those requirements should be considered as recommendations. In describing preferred embodiments of the present invention, specific terminology is employed for the sake of clarity. However, the present invention is not intended to be limited to the specific terminology so selected, and it is to be understood that each specific element includes all technical equivalents which operate in a similar manner. For example, when describing alighting source, such as an LED, any other equivalent device, such as OLEDs, conventional light sources, or other devices having an equivalent function or capability, whether or not listed herein, may be substituted therewith. Furthermore, the inventors recognize that newly developed technologies not now known, or uncommonly used, may also be substituted for the described parts and still not depart from the scope of the present invention. Such newly developed technologies include, for example, variations or designs of nanotubes that produce or modulate light. All other described items, including, but not limited to LEDs, LCDs, algorithms, electronics, software, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, steps of the processes described herein, and the display, storage, or communication of results according to the processes of the present invention.

The present invention may suitably comprise, consist of, or consist essentially of, any element of the invention (e.g., any of the various parts or features of the invention and their equivalents). Further, the present invention illustratively disclosed herein may be practiced in the absence of any element, whether or not specifically disclosed herein. Obviously, numerous modifications and variations of the present invention are possible in light of the above teachings. This application includes one draft claim. However, the invention covers more details of the "claimed" concept, and other concepts described in detail hereinabove. It is therefore to be understood that within the scope of the appended claim and all additional claims to be appended to one or more a later filed utility patent application(s) (including any continuations, divisionals, continuations-in-part, or other counterpart domestic or foreign applications), the invention may be practiced otherwise than as specifically described herein.

What is claimed and desired to be secured by Letters Patent of the United States is:

1. A high dynamic range display, comprising:

an LCD panel;

a set of LEDs disposed behind a plane of the LCD panel and positioned to backlight the LCD panel with an approximation of an image;

a controller coupled to the set of LEDs configured to energize the set of LEDs so as to produce the image approximation, the controller energizing the set of LEDs with a Pulse-Width Modulation signal for each of individually controllable LEDs or groups of LEDs of the set of LEDs, the Pulse Width Modulation signal calculated based on an image signal comprising a desired image at a resolution lower than a resolution of the LCD panel;

a power supply coupled to the set of LEDs and configured to maintain a supply voltage to the coupled LEDs in a range that provides a minimum amount supply voltage sufficient to cover peak demands of the set of LEDs when energized without creating a potential difference between the supply voltage and power utilized by the display which is greater than a maximum power dissipation capability of the power supply;

a stack of optical films disposed between the set of LEDs and the LCD panel in an unconstrained manner so as to allow for heat related expansion, the stack of optical films comprising at least one diffuser that causes light from each of the individually controllable LEDs or groups of LEDs to spread into light from adjacent LEDs or groups of LEDs in an overlapping manner such that it causes the illumination on the LCD panel to vary smoothly, the light of the set of LEDs or groups of LEDs having a point spread function being mainly attributable to diffusion caused by the optical films stack;

the controller coupled to the LCD panel and configured to energize the LCD panel based on an image signal comprising the desired image and accounting for the illumination on the LCD panel via a calculated or simulated illumination of the LCD panel; the LCD energization causing the LCD panel to further modulate the image approximation to produce the desired image;

wherein the calculated or simulated illumination of the LCD panel is at a resolution equal or less than the resolution of the LCD panel.

2. The high dynamic range display according to claim 1, wherein the controller is further configured to energize the set of LEDs to maintain a "center-of-gravity" of illumination around bright features of the desired image.

3. The high dynamic range display according to claim 1, wherein the stack of optical films comprises a bulk diffuser and a brightness enhancement film, wherein the bulk diffuser is upstream of the other films such that reflections are directed toward the bulk diffuser.

4. The high dynamic range display according to claim 1, wherein the set of LEDs comprising a backlight and the simulated illumination comprises components corresponding to illumination originating from edges of the backlight.

5. The high dynamic range display according to claim 1, wherein the set of LEDs comprising an array of LEDs spaced apart a distance d and a reflector surrounding the set of LEDs together comprising a backlight, wherein the LEDs closest to the surrounding reflector are spaced a distance d/2 from the surrounding reflector.

6. The high dynamic range display according to claim 5, wherein the array of LEDs comprises rows of LEDs wherein alternating rows of LEDs are offset by distance of approximately d/2.

7. The high dynamic range display according to claim 6, wherein the set of LEDs are fixed on a plurality of substrates fitted together to form the backlight.

8. A method, comprising the step of:

backlighting an LCD panel from a set of LEDs disposed behind a plane of the LCD panel;

wherein the set of LEDs are positioned to backlight the LCD panel with an approximation of an image;

the method further comprising the step of energizing the LEDs with data from a controller coupled to the set of LEDs and configured to energize the set of LEDs so as to produce the image approximation, wherein the controller is further configured to energize the set of LEDs with a Pulse-Width Modulation signal for each of individually controllable LEDs or groups of LEDs of the set of LEDs, the Pulse Width Modulation signal calculated based on an image signal comprising a desired image at a resolution lower than a resolution of the LCD panel;

the method further comprising the step of providing power from a power supply coupled to the set of LEDs and configured to maintain a supply voltage to the coupled LEDs in a range that provides a minimum amount supply voltage sufficient to cover peak demands of the set of LEDs when energized without creating a potential difference between the supply voltage and power utilized by the display which is greater than a maximum power dissipation capability of the power supply;

wherein the set LEDs and LCD panel are arranged with a stack of optical films disposed between the set of LEDs and the LCD panel in an unconstrained manner so as to allow for heat related expansion, the stack of optical films comprising at least one diffuser that causes light from each of the individually controllable LEDs or groups of LEDs to spread into light from adjacent LEDs or groups of LEDs in an overlapping manner such that it causes the illumination on the LCD panel to vary smoothly, the light of the set of LEDs or groups of LEDs having a point spread function being mainly attributable to diffusion caused by the optical films stack;

wherein the controller coupled to the LCD panel and configured to energize the LCD panel based on an image signal comprising the desired image and accounting for the illumination on the LCD panel via a calculated or simulated illumination of the LCD panel the LCD energization causing the LCD panel to further modulate the image approximation to produce the desired image; and wherein the calculated or simulated illumination of the LCD panel is at a resolution equal or less than the resolution of the LCD panel.

9. The method according to claim 8, further comprising the step of energizing the set of LEDs to maintain a "center-of-gravity" of illumination around bright features of the desired image.

10. The method according to claim 8, wherein the stack of optical films comprises a bulk diffuser and a brightness enhancement film, wherein the bulk diffuser is upstream of the other films such that reflections are directed toward the bulk diffuser.

11. The method according to claim 8, wherein the set of LEDs comprising a backlight and the simulated illumination comprises components corresponding to illumination originating from edges of the backlight.

12. The method according to claim 8, wherein the set of LEDs comprising an array of LEDs spaced apart a distance d and a reflector surrounding the set of LEDs together comprising a backlight, wherein the LEDs closest to the surrounding reflector are spaced a distance d/2 from the surrounding reflector.

13. The method according to claim 8, wherein the array of LEDs comprises rows of LEDs wherein alternating rows of LEDs are offset by distance of approximately d/2.

14. The method according to claim 8, wherein the set of LEDs are fixed on a plurality of substrates fitted together to form the backlight.

15. The method according to claim 8, wherein the step of energizing further comprising the step of processing the pulse-width modulation signal for the set of LEDs in a manner that reduces artifacts in the image displayed on the LCD panel.

16. The method according to claim 15, wherein the step of processing comprises producing the pulse-width modulation signal so as to maintain a "center-of-gravity" of illumination around bright features of the image being displayed.

17. The method according to claim 16, wherein the illumination maintains a "center-of-gravity" of the illumination around bright features displayed on the LCD panel.

18. The method according to claim 8, further comprising the step of maintaining an illumination from the LEDs around bright features of the image being displayed on the LCD panel.

* * * * *